US008219513B2

(12) United States Patent
Covannon et al.

(10) Patent No.: US 8,219,513 B2
(45) Date of Patent: Jul. 10, 2012

(54) SYSTEM AND METHOD FOR GENERATING A CONTEXT ENHANCED WORK OF COMMUNICATION

(75) Inventors: Edward Covannon, Ontario, NY (US);
Kevin M. Gobeyn, Rochester, NY (US);
Stacie L. Hibino, San Jose, CA (US)

(73) Assignee: Eastman Kodak Company, Rochester, NY (US)

( * ) Notice: Subject to any disclaimer, the term of this patent is extended or adjusted under 35 U.S.C. 154(b) by 777 days.

(21) Appl. No.: 12/340,216

(22) Filed: Dec. 19, 2008

(65) Prior Publication Data
US 2010/0161541 A1    Jun. 24, 2010

(51) Int. Cl.
*G06F 17/00* (2006.01)
*G06F 3/00* (2006.01)
*G06N 5/02* (2006.01)
(52) U.S. Cl. ............................ 706/47; 715/716; 715/731
(58) Field of Classification Search .................. None
See application file for complete search history.

(56) References Cited

U.S. PATENT DOCUMENTS

| 5,621,874 | A | 4/1997 | Lucas et al. |
| 7,694,226 | B2 * | 4/2010 | Covannon et al. ............ 715/731 |
| 7,779,014 | B2 * | 8/2010 | York et al. .................... 707/748 |
| 7,908,273 | B2 * | 3/2011 | DiMaria et al. .............. 707/736 |
| 2003/0217121 | A1 | 11/2003 | Willis |
| 2007/0124291 | A1 | 5/2007 | Hassan et al. |
| 2007/0168315 | A1 | 7/2007 | Covannon et al. |
| 2007/0179946 | A1 | 8/2007 | Wissner-Gross |
| 2007/0204209 | A1 * | 8/2007 | Truelove et al. ............ 715/500.1 |
| 2008/0170084 | A1 * | 7/2008 | Miyazawa et al. ............ 345/660 |
| 2008/0235216 | A1 * | 9/2008 | Ruttenberg ....................... 707/5 |
| 2009/0282336 | A1 * | 11/2009 | Lindley et al. ................ 715/716 |
| 2010/0037169 | A1 * | 2/2010 | Beaty et al. .................... 715/772 |

FOREIGN PATENT DOCUMENTS
EP          1 176 520 A2     1/2002

OTHER PUBLICATIONS

Ramesh Nallapati et al.: "Multiscale Topic Tomography", Proceedings of the 13th ACM SIGKDD International Conference on Knowledge Discovery and Data Mining, [Online], Aug. 12, 2007-Aug. 15, 2007, pp. 520-529, XP-002574205, San Jose, California, USA, ISBN: 978-1-59593-609-7, Retrieved from the Internet: URL:http://doi.acm.org/10.1145/1281192.1281249> [retrieved on Mar. 19, 2010] the whole document.

(Continued)

*Primary Examiner* — Kakali Chaki
*Assistant Examiner* — Daniel Pellett
(74) *Attorney, Agent, or Firm* — Raymond L. Owens

(57) ABSTRACT

A system for selecting, managing, sharing and displaying narrative data files in a manner that takes into the account the contextual significance of said narrative data files to a narrative, an author(s) and an audience. A system that is able to place an absolute and relative value upon the significance of a media object is able to assist in stimulating the recollection of the author and audience, thus making every aspect more memorable and enhancing by improving the ease of use and the quality of the final result of the use of the system of this invention.

8 Claims, 41 Drawing Sheets

OTHER PUBLICATIONS

Ata Kaban et al.: "A Dynamic Probabilistic Model to Visualise Topic Evolution to Text Streams", Journal of Intelligent Information Systems, [Online], vol. 18, No. 2-3, Mar. 2002, pp. 107-125, XP-002574206, Hingham, MA, USA, ISSN: 0925-9902, Retrieved from the Internet: URL:http://www.springerlink.com/content/h57803203870q3v6/fulltext.pdf> [retrieved on Mar. 19, 2010], the whole document.

Covannon, E. et al., "System and Method for Generating a Work of Communication with Supplemental Context", U.S. Appl. No. 11/324,681, filed Jan. 3, 2006.

Covannon, E. et al., "Facilitating Identification of an Object Recorded in Digital Content Records", U.S. Appl. No. 11/866,626, filed Oct. 3, 2007.

Lawther, J. S. et al., "Method for Image Animation Using Image Value Rules", U.S. Appl. No. 11/866,636, filed Oct. 3, 2007.

Freire M. et al.: "A Graph-Based Interface to Complex Hypermedia Structure Visualization", Proceedings of the Workshop on Advanced Visual Interfaces AVI, XX, XX, May 25, 2004, pp. 163-166, XP002405638, the whole document.

* cited by examiner

| KNOWLEDGE BASE | |
|---|---|
| UNIQUE ID | A UNIQUE ID FOR THIS INDIVIDUAL |
| GROUPING ID | A UNIQUE ID ASSIGNING THIS PERSON TO A GROUP |
| NAME (OR NAME HISTORY IF MORE THAN ONE) | |
| ADDRESS / TELEPHONE HISTORY | LINKS |
| BIRTH DATE / LOCATION | LINKS |
| NATIONALITY / CITIZENSHIP | LINKS |
| GENDER / SEXUAL ORIENTATION | LINKS |
| RACE | LINKS |
| CREED / BELIEF HISTORY | LINKS |
| MARITAL HISTORY | LINKS |
| MARITAL PARTNER | LINKS |
| CHILDREN | LINKS |
| PARENTS | LINKS |
| OTHER RELATIONS n+1 | LINKS |
| COWORKERS n+1 | LINKS |
| FRIENDS n+1 | LINKS |
| PROFESSION n+1 | LINKS |
| EDUCATIONAL HISTORY | LINKS |
| MILITARY HISTORY | LINKS |
| MEDICAL HISTORY | LINKS |
| WORK HISTORY | LINKS |
| PROFESSIONAL SOCIETIES | LINKS |
| HOBBIES / ACTIVITIES | LINKS |
| EVENTS / HONORS n+1 | LINKS |
| PERSONAL DATABASES (ONLINE AND PHYSICAL) | LINKS |

FIG. 7

| | |
|---|---|
| CONTENT DATA FILE DATABASE (210) | |
| UNIQUE ID (212) | A UNIQUE ID FOR THIS OBJECT (216) |
| GROUPING ID | A UNIQUE ID ASSIGNING THIS OBJECT TO A GROUP OF OBJECTS FOR THIS NARRATIVE (214) |
| SUBGROUP ID #1 | A SUBGROUPING OF THE NARRATIVE |
| SUBGROUP ID n+1 | |
| OBJECT MEDIA TYPE | IMAGE, SOUND, TEXT AND FILE FORMAT OF SAME |
| OBJECT SPECIES | RELATIONAL, EPOCHAL, ICONIC |
| DEGREE OF SIGNIFICANCE | DEGREE (DISTANCE X IMPORTANCE X DURATION) OF SIGNIFICANCE TO THE PERSONAL – AFFIXING THE OBJECT IN A HIERARCHY |
| RELATIONSHIP DEGREE n+1 | |
| EVENT TYPE #1 | SPORTING, RELIGIOUS, POLITICAL, CULTURAL, SOCIOLOGICAL, ENTERTAINMENT |
| EVENT TYPE n+1 | |
| CONTENT #1 | PERSON, GROUP, OBJECT(S), CONDITION(S), ENVIRONMENT(S) OF INTEREST IN THE IMAGE |
| CONTENT n+1 | |
| PHYSICAL ASPECTS | SIZE, RESOLUTION, COLOR OR B/W, ORIENTATION (PORTRAIT/LANDSCAPE), MODIFICATIONS |
| DATES | DATE TAKEN, DATE RESTORED, DATE ACCESSED, DATE BACKED-UP |
| POSITION / ORIENTATION | LOCATION WHERE TAKEN, ORIENTATION OF CAMERA |
| USAGE / OWNERSHIP | RIGHTS OF OWNERSHIP, STORAGE LOCATIONS, RIGHTS OF ACCESS, COSTS, TIME AND USAGE LIMITS, ACCESS LIST, ACCESS HISTORY |

FIG. 8

| DESIGNATED CONTENT DATA FILES DATABASE | |
|---|---|
| UNIQUE ID | A UNIQUE ID FOR THIS OBJECT |
| GROUPING ID | A UNIQUE ID FOR THE GROUP CONTAINING THIS OBJECT |
| SUBGROUP ID #1 | |
| SUBGROUP ID n+1 | |
| OBJECT SPECIES | RELATIONAL, EPOCHAL, ICONIC |
| DEGREE OF SIGNIFICANCE | DEGREE (DISTANCE X IMPORTANCE X DURATION) OF SIGNIFICANCE TO THE PERSONAL – AFFIXING THE OBJECT IN A HIERARCHY |
| EVENT TYPE #1 | WORK, FAMILY, EDUCATION, PASTIMES/HOBBIES, ENTERTAINMENT/LEISURE |
| EVENT TYPE n+1 | |
| CONTENT #1 | PERSON, GROUP, OBJECTS(S), CONDITION(S), ENVIRONMENT(S) IN THE IMAGE |
| CONTENT n+1 | |
| PHYSICAL ASPECTS | SIZE, RESOLUTION, COLOR OR B/W, ORIENTATION (PORTRAIT/LANDSCAPE), MODIFICATIONS |
| DATE | DATE TAKEN, DATE MODIFIED, DATE LAST ACCESSED |
| POSITION / ORIENTATION | LOCATION WHERE TAKEN, ORIENTATION OF CAMERA |
| USAGE / OWNERSHIP | OWNER OF THE IMAGE, |

FIG. 9

| | | |
|---|---|---|
| PRODUCT DATABASE | PRODUCT UNIQUE ID #1 | N + 1 |
| PRODUCT ID | UNIQUE ID FOR THIS PRODUCT | |
| CUSTOMER | CUSTOMER FOR THIS PRODUCT | |
| CREATOR | CREATOR OF THIS PRODUCT | |
| CUSTOMER CRITERIA #1 | THE NARRATIVE FOCUS FOR THIS PRODUCT (PERSON, RELATIONSHIP, EVENT, LOCATION) | |
| CRITERIA n+1 | OTHER FOCI, FUNCTION OF THIS PRODUCT | |
| LINKS DATABASE | THE STORAGE ADDRESS FOR THE LINKS TO OBJECTS FOR THIS PRODUCT | |
| PRODUCT MEDIA TYPE | PRINT, ELECTRONIC – IF ELECTRONIC – FILE FORMAT | |
| INTERACTIVE FLAG | IS PRODUCT INTERACTIVE – IF SO – OPERATING SYSTEM AND LANGUAGE | |
| PRODUCT FORMAT | SIZE, LENGTH, RESOLUTION, COLOR/BW, PORTRAIT/LANDSCAPE | |
| PRODUCT STORAGE LOCATION(S) | LOCATION OF PRODUCT MASTER | |
| RIGHTS USAGE | COPYING PERMITTED, AMOUNT OF COPYING, FOR WHAT TYPES OF MEDIA AND BROADCAST DISTRIBUTION | |
| BASIC PRICE | | |
| ADDITIONAL SERVICES | ARCHIVING, USAGE MONITORING, SECURITY, SHIPPING (MEANS AND LOCATION), PACKAGING | |
| FINAL PRICE | | |
| | | |
| | | |
| | | |

FIG. 10

| LINK DATABASE | LINK ID #1 | N+1 |
|---|---|---|
| LINK ADDRESS | A UNIQUE STORAGE LOCATION ASSOCIATED WITH THIS OBJECT | |
| GROUPING ID | A UNIQUE ID ASSIGNING THIS OBJECT TO A GROUP OF OBJECTS FOR THIS NARRATIVE | |
| SUBGROUP ID #1 | A SUBGROUPING OF THE NARRATIVE | |
| SUBGROUP ID n+1 | | |
| OBJECT MEDIA TYPE | | |
| RELATIONSHIP DEGREE/TYPE | DEGREE OF SIGNIFICANCE FROM THE PERSONAL – AFFIXING THE OBJECT IN A HIERARCHY | |
| EVENT TYPE #1 | SPORTING, RELIGIOUS, POLITICAL, CULTURAL, SOCIOLOGICAL, ENTERTAINMENT | |
| EVENT TYPE n+1 | | |
| EVENT SIGNIFICANCE | RELATIVE SIGNIFICANCE OF EVENT TO NARRATIVE | |
| CONTENT #1 | PERSON, GROUP, OBJECT(S), CONDITION(S), ENVIRONMENT(S) IN THE IMAGE | |
| CONTENT n+1 | | |
| CONTENT SIGNIFICANCE | RELATIVE SIGNIFICANCE OF THE CONTENT TO NARRATIVE | |
| PHYSICAL ASPECTS | SIZE, RESOLUTION, COLOR OR B/W, ORIENTATION (PORTRAIT/LANDSCAPE), MODIFICATIONS | |
| DATES | DATE TAKEN | |

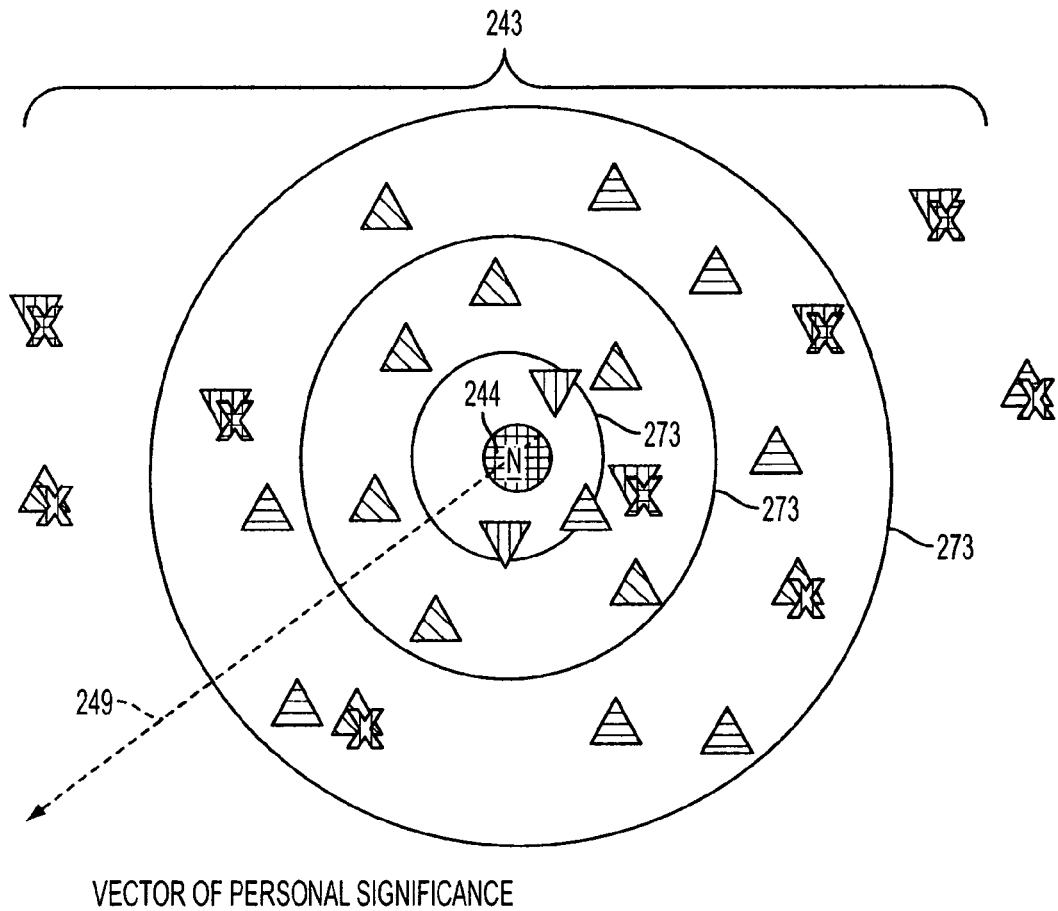
VECTOR OF PERSONAL SIGNIFICANCE
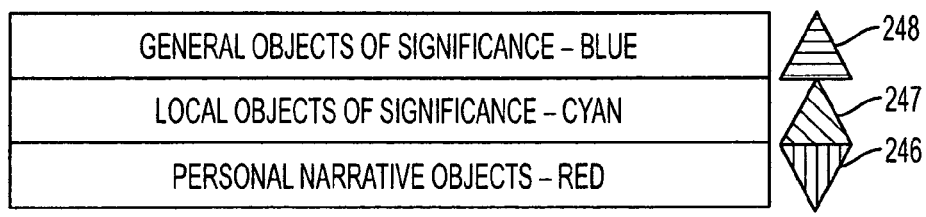
FIG. 14A

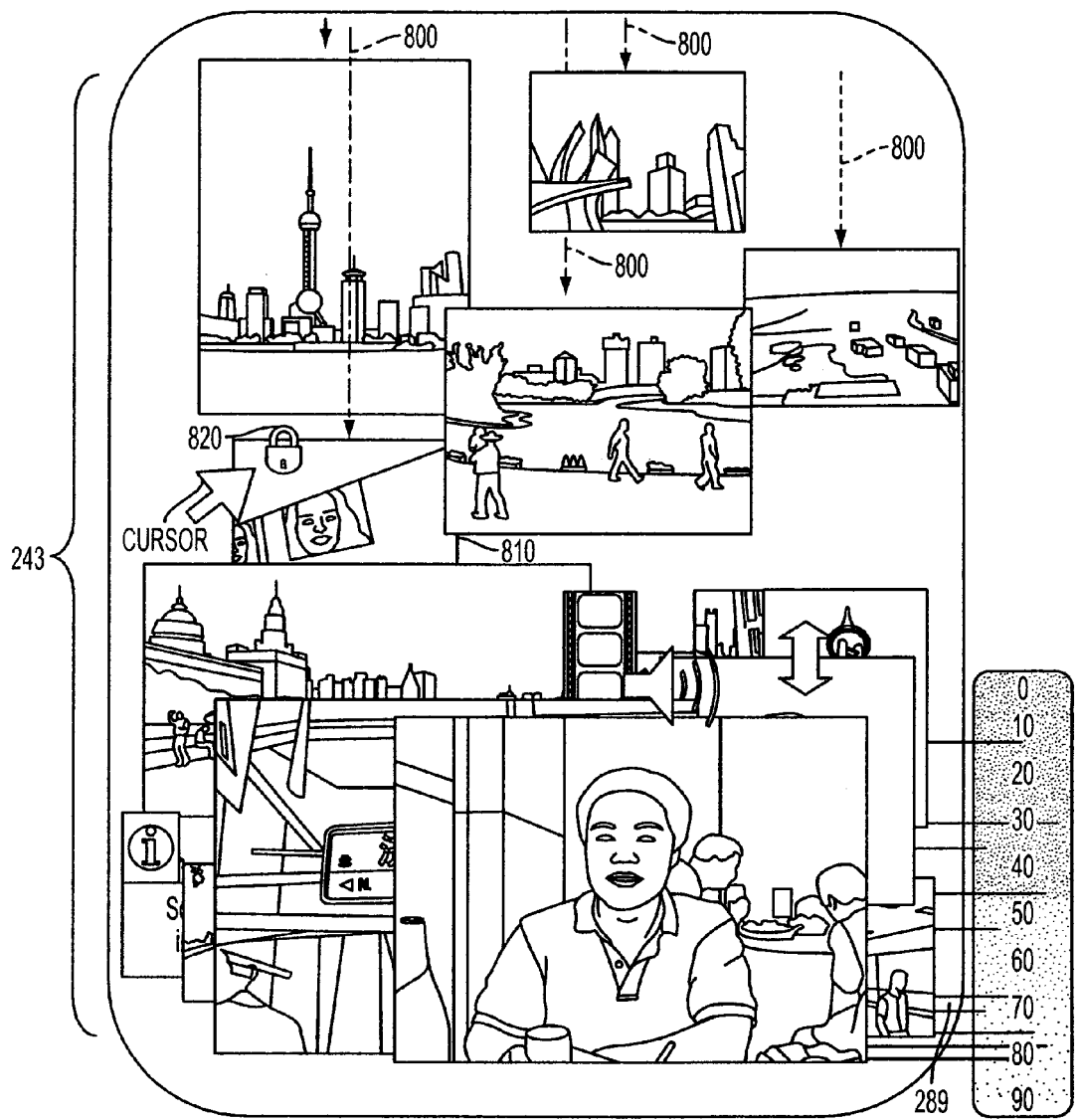
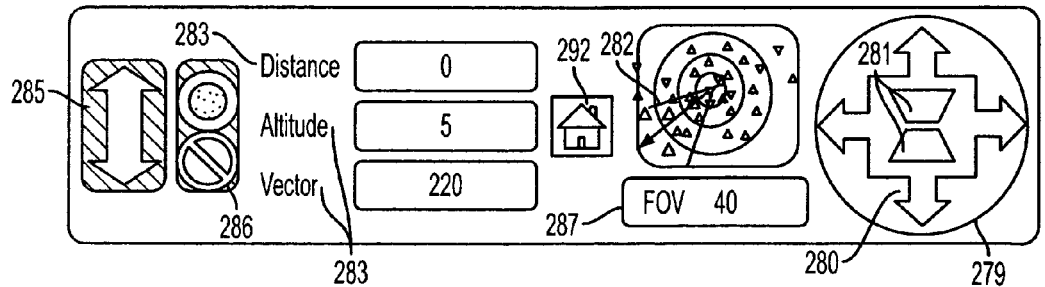
FIG. 24

SYSTEM AND METHOD FOR GENERATING A CONTEXT ENHANCED WORK OF COMMUNICATION

FIELD OF THE INVENTION

The present invention relates to the field of authoring works of communication, and in particular the creation, sharing and editing of works of communication and, in particular, to a system for selecting, managing, sharing and displaying narrative data and contextual data according to the contextual significance of narrative nodes and narrative and contextual data of the work with respect to each other and to one or more of an author, a character in the work or one or more audience members.

BACKGROUND OF THE INVENTION

There is a constant, common and critical need to communicate information of a wide range of types and for a wide range of purposes and through a wide range of media. While the types of information that are communicated, the reasons and purposes for which it is communicated, the forms in which it is communicated and the means by which it is communicated are effectively unlimited, the effectiveness of a given communication is, as is well known, fundamentally dependent on the structure and content of the communication.

For example, and briefly considering communications in general, all communications, whether comprised of text, images, video or audio data of any form or any combination thereof, generally take the form of one or more narrative nodes wherein each narrative node contains, at a minimum, a narrative content that comprises the minimum essential information that is to be conveyed by that node. The nodes are in turn arranged according to a structure, referred to as a narrative that defines the relationships between the nodes and thus arranges the narrative contents of the nodes into a coherent presentation of the content of the narrative. The information contained in a given communication is then conveyed to a recipient in a coherent meaningful form when the recipient traverses the nodes of the communication along the paths or linkages comprising and defined by the narrative.

The bare narrative structure described above is often sufficient for certain communications, specifically those communications wherein the possible range of meanings that can be attached to the narrative contents is very restricted and known to both the author and the recipient of a communication. Examples of such may include, for example, mechanistic communications such as data or control/command communications between computer systems. It is well known, however, that in general the information conveyed is significantly increased, the chances of ambiguity or misunderstanding significantly reduced and the information is made significantly more meaningful if the communication contains further information essentially defining the meaning or possible meanings of the narrative contents to the author and recipient.

Such additional information is generally referred to as contextual information and is information that is generally not strictly necessary to convey the narrative content of the communication but provides additional information that assists in understanding of the basic narrative and involves the audience more deeply into the narrative while providing a richer and more detailed narration. Suitably chosen and employed contextual information, for example, provides additional information and details to a recipient both directly and indirectly, that is, by direct narration of the information and by allusion, association and indirect reference to invoke the emotions, memories and personal knowledge and experiences of the members of the audience.

It is noted that the problems of seeking out, locating and accessing information pertinent to a work have been significantly reduced by contemporary information resources, including the internet and electronically accessible database and such facilities and tools as contemporary search engines. There remains a significant problem, however, with respect to the organization and selection of contextual information appropriate to the desired goal of enhancing a given work, which is often further compounded by the flood of contextual information that has become readily available through contemporary information search and recovery methods. That is, given the vast amounts of contextual information that may be available to an author, it is often difficult for the author to determine just what contextual information is available, the significance of the available contextual information and the relationships and degrees of relevancy between the contextual information and between the contextual and narrative information.

The present invention provides a solution to these and related problems of the prior art.

SUMMARY OF THE INVENTION

The invention is defined by the claims. An important aspect of the present invention resides in the value of combining social networks and narrative networks and then visualizing the subsequent relationships from within the network as a 3-D landscape where significance functions as perspective. In some of the broader aspects of the invention a method and a system are provided for authoring a work of communication comprised of one or more narrative nodes wherein each narrative node includes narrative content and wherein the narrative content of each node is stored in one or more narrative data files associated with the node. Narrative content will typically include a range of types or classes of information and data related to the subject matter of the node. For example, a narrative data file may include information pertaining or related to any subject, e.g. work, school, vacations, weddings, family, infancy, childhood, sports, games, and military service. In a presently preferred embodiment of the present invention, a narrative data file will typically contain a single type or class of narrative content data and closely related types of information. For example, a given narrative data file 12C may contain information of the type or class designated as "fun", and will then typically contain information pertaining to play, sports, music, puzzle solving, gaming, hunting and so on.

By way of a more specific example, the present invention provides a unique method and structure for producing a highly manageable and pertinent narrative and contextual work for presentation and communication of a desired topic or subject matter. The disclosed method and structure provides an efficient tool which allows an author or a presenter of the topic or subject matter to easily select, organize and modify the work for presentation to a group, or just for the author's own use. An exemplary topic for better understanding the present invention could be a historical work relating to the Presidents of the United States. The topic could of course cover a single President, a specific period of time including several Presidents or even a continuous history of all the Presidents in relation to U.S. history and their time in office.

Choosing for this example to create a broad work including all the Presidents for presentation to an audience, say a college history class, the elements of the work might be initially organized by defining each narrative node as encompassing each President's term in office. The narrative content of each node can then include various types of media corresponding to that President, for example photos, video clips, newspaper and periodical articles relating to the President's background, family situations, political affiliations, congressional experience and occurrence's, etc. Other media could include for example voice-over audio relating milestones, accomplishments and failures of the President's administration in the context of general historical events occurring during the President's term. All of this narrative information is of course maintained in narrative data files associated with the narrative node, although the narrative data files can be flexibly associated with any narrative node for example those narrative nodes defining another President's term should the need arise.

An important aspect of the work is the "perspective" of the work. This perspective, or view as classically defined, could be that of an author, a performer, an audience or group of people or interests. This perspective can be defined and controlled by a virtual perspective space represented by a multi-dimensional polar coordinate space about an origin defining narrative node. An example of such a perspective is a radar view as discussed with respect to FIGS. 14-18 herein, including numerous perspectives.

In the present example, the polar coordinates could be accordingly defined according to major political parties of the time period. Using Abraham Lincoln and his term of office as the exemplary narrative node, the polar coordinates for a perspective view of this time period in a political context could be appropriately segregated into four (4) major parties of the time period, Whigs, Know-Nothings, Republicans and Democrats. Where the Whigs and Know-Nothings parties faded away early after Lincoln's election to his first term (or even before), these fields of view would be particularly narrow and not include many objects of significance. The larger fields of view in this radar view would of course be the Democrat and Republican fields of view. Other fields of view might be related on the same or different radar view, the economic and political tendencies of the U.S. as it was regionally motivated, for example North, South and Western States could have field of views of Lincoln, his policies and the war which might overlap with one another or even the political party's fields of view.

The radial spaced rings of this radar view represent proportionally decreasing significance as they extend farther from the origin narrative node. In this way objects of significance which are represented by an appropriate icon are aligned throughout the polar coordinate system according to a view point of the object of significance, for example the differing views regarding slavery by Democrats and Republicans. The icons representing these objects of significance can relay both an absolute significance represented by the size of the icon relative to other icons, as well as a personal significance to the author which is conveyed via the proximity of the icon to the origin. Because slavery was such a critical issue in Lincolns' presidency, these objects of significance icons containing differing view points regarding slavery are extremely large compared to other icons, and maintained closer to the origin where they are considered highly significant. Objects of interest such as Mary Todd Lincoln and their children might be represented by smaller icons and because this would be of slightly less interest in the context of U.S. history, such family relations icon would thus be depicted with a smaller sized icon indicating their lower absolute significance. Narrative content for the slavery issues would include photographs, contemporary articles for and against slavery, personal accounts recorded in audio voice-overs.

If for instance, the field of view selected was that of the Lincoln's Republicans, then objects of significance to this party such as the Lincoln-Douglas debates and objects intending to stop the spread of slavery to the western states would be considered highly significant and thus placed closer to the narrative node center within the Republican field of view. On the other hand, seen through the Democratic field of view, the Dred Scott case would be an object of high significance for supporting their position with regards to states rights and slavery.

A vector of personal significance may be used to align and define a specific point of view within a desired field of view. A slider control can define the ranges of relative significance of the objects of significance along this vector as well as selecting a desired object of significance. For example assuming a vector of personal significance in the Republican field of view extends through objects of interest including critical battles of the civil war. The slider can assist in selecting a range of the critical battles which represent the turning point in the war from the Republican (or North) point of view. The user would adjust sliders to select a range including the battles of Vicksburg and Gettysburg and filtering out the other battles in this case.

In general, in this example, the transition from one narrative node to the next could be linear, i.e. Lincoln's narrative node to Andrew Johnson's narrative node. Alternatively, it is to be appreciated that transitions do not have to be linear. Lincolns' narrative could be transitioned for example into more contemporary presidents involved with civil rights, for example the John F. Kennedy narrative node, and the civil rights act.

Also, different fields of view (i.e. perspective) may be used within the same narrative nodes to relate two sides of a portion of the narrative. In other words, the categorization of media is not restricted to any single perspective. Two different perspectives can access the same media where appropriate. For instance the Lincoln-Douglas Debates would relate two different views of states rights and slavery. Here, Douglas' view and object of significance would be allocated in the Democratic field of view and Lincoln's would of course be found in the Republican field of view. Both the Democratic and Republican field of view are categorized separately but of course accessible by the perspective allocated to the author, actor or audience of the work. The radial view could be used to show relationships between media and perspectives by, for example, highlighting the same media item in all fields of view when a user selects that media item from one field of view (e.g., hovering the mouse cursor over an editorial on slavery in the Republican field of view could use color highlighting to indicate where that same media item is located in each of the other fields of view, where the distance of each highlighted item from the center of the narrative node would indicate the relative significance of that item within the corresponding field of view perspective—that is, relative significance to the Republicans versus to the Democrats versus the Whigs versus the Know-Nothings.

As can be appreciated by the above example, this narrative and authoring structure would allow a tremendous amount of flexibility in regards to both the authorship and audience. Besides the broad example above, the Author can drill down into the narrative nodes for more specific data. For example, the Author may produce the work solely for the Author's own benefit in the case of academic research to support a proposition about the Union Army under Lincoln's overall command. For instance, attempting to prove the proposition that Lincoln's was well-liked by the soldiers but his own General's in the Union Army had little respect for his skills as Commander in Chief. The fields of view could be changed between that of the different commanders and the sliders could filter media based upon a selected range of significance where the soldier's and General's own diaries, letters and correspondence are the significant objects of interest.

In another embodiment, the radar view can be adapted to an alternative GUI or virtual world metaphor where the Author can view and traverse this GUI defining specific fields of view just as with the radar example. For example the GUI might be a topographical representation of the Gettysburg battlefield and how Lincoln's orders affected the Generals in their respective positions and actions throughout the battlefield. An avatar could move across the battlefield and among the commanders attaining their perspectives and fields of view according to the significance that the avatar wants to place on any given General's perspective. The virtual world is not limited to geographically related nodes. In a more general sense, from any given location the avatar can be turned in any direction to alter the field of view, and the avatar can be moved in a direction or along a vector that changes the range of significance of that view as well. Considering the virtual world to be a view of Lincoln's presidency, moving the avatar in any given direction could point the narrative towards different political perspectives, Democrats, Republicans, Whigs, etc., and moving the avatar in a particular direction would change the relative significance of the political perspective in the narrative.

It is to be appreciated that the flexibility of the described method and system for developing and presenting a narrative for any given subject lends itself to being a valuable tool in any potential collaborative aspect between an author and a performer, and author and an audience, or any combination of the same. By way of example, a starting narrative structure guided by the author with regards to initial narrative content of the work may be based on the personal knowledge and viewpoint of the author, but the narrative can be easily altered according to content considered to have greater, or different, significance from the point of view of a performer and/or an audience. This results from the relationship between the available narrative content and the person's, i.e. author, performer audience, associations with developing the work containing the narrative content. In a view of Lincoln's presidency initiated by an author, a performer may identify different possible combinations and correlations between information in the databases which were not considered by the author because of the performer's unique relationship in interacting with the work. A performer, as opposed to an author, might more readily realize the compassionate, peaceful and family oriented nature of Lincoln's personality. The performers insight might raise the significance of this aspect or point of view of Lincoln in relation to the political and military aspects of his presidency. This insight could correlate to and reveal insights regarding Lincoln's reconciliation and reconstruction policies which allowed the North and the South to move forward politically, socially and economically despite the divisive war and Lincoln's assassination.

This present invention relates specifically to a method of presenting information on a display, the method comprising the steps of identifying an audience to which information is to be displayed, accessing from a storage medium first information having a first relative significance to the audience and accessing from the storage medium second information having a second relative significance to the audience different than the first relative significance, identifying a point-of-view from which the audience will view at least the first information and the second information, determining a first distance from the point-of-view for the first information based at least upon the first relative significance, determining a second distance from the point-of-view for the second information based at least upon the second relative significance, displaying the first information and the second information on the display in a manner that reflects the first distance and the second distance.

The present invention also relates to a method and system for structuring a work of authorship for presentation on a visual display, the method comprising the steps of defining a plurality of narrative nodes for receiving narrative content data stored in at least one narrative data file in a data storage medium, associating desired narrative content data by a link with at least one narrative node to provide the at least one narrative node with pertinent subject matter relating to the work of authorship, arranging the narrative nodes in a desired sequence to provide an organizational structure for the work of authorship; and displaying the work of authorship to a recipient, which includes an author, performer, audience or any such person or group receiving and/or interacting with the work, on the visual display.

The present invention still further relates to a method and system of generating a work of authorship for presentation on a visual display, the method and system comprising the steps of designating one or more narrative content items that are to be included in the work of authorship, retrieving the narrative content items from at least one of a narrative content storage location and data file, filtering the retrieved narrative content according to predetermined criteria to obtain a desired range of narrative content compatible with an intended framework of the work of authorship; and incorporating the desired range of narrative content into the work of authorship by associating the content with at least a respective content node positioned in sequence with a plurality of other content nodes defining the framework of the work of authorship.

BRIEF DESCRIPTION OF THE DRAWINGS

FIG. 7 shows a knowledge database for an associated person;

FIG. 8 shows a criteria and related fields of data associated with a narrative data file, said criteria and data fields being useful in providing a database having similar criteria and data fields for other narrative data files;

FIG. 9 shows criteria and related data fields associated with one narrative data file from a set of narrative data files designated for use in a work of communication; said criteria and data fields being useful in providing a database having similar criteria and data fields for other of the narrative data files from the designated set of narrative data files;

FIG. 10 shows criteria and related data fields associated with one possible output work, said criteria and data fields being useful in providing a database having similar criteria and data fields for other possible output works;

FIG. 11 shows a linkage database;

FIG. 14A shows a schematic figure illustrating the relationship between the narrative data files and nodes in the narrative to create a polar coordinate virtual perspective;

FIG. 24 illustrates a graphical user interface for moving from narrative line 245 to narrative line 352.

DETAILED DESCRIPTION OF THE INVENTION

Figure 1:
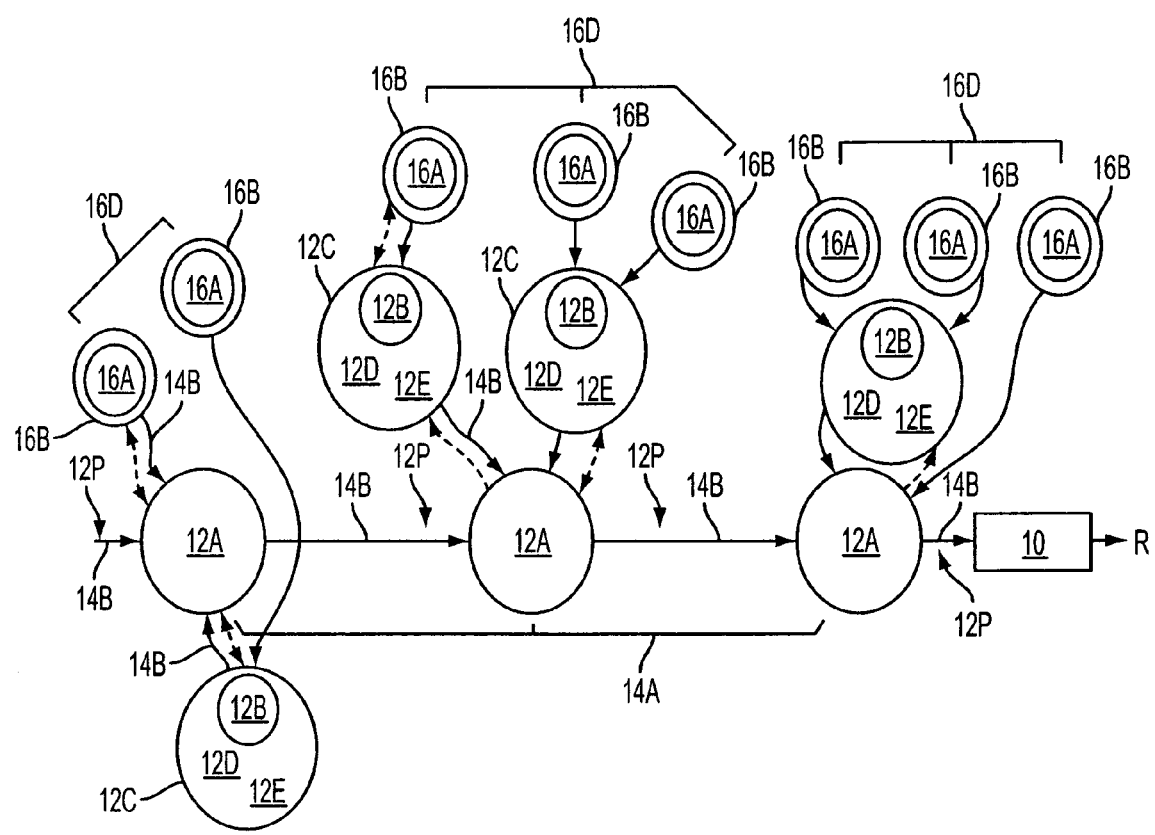
FIG. 1 is a diagrammatic illustration of the structure and elements of a work of authorship.

The following is a detailed description of preferred embodiments of the invention, reference being made to the drawings in which the same reference numerals identify the same elements of structure in each of the several figures.

The following will first describe a method and system for organizing and structuring a work of authorship comprised of a narrative structure that includes narrative nodes containing both narrative content and contextual content relating to the narrative content the narrative. As will be described, the relative significance of narrative content to the narrative structure and of the contextual content to the narrative content and narrative structure are adaptable to characteristics of the author and the intended audience of the work to maximize the effectiveness of the work. The following will then describe a system for seeking, locating, accessing and retrieving narrative and contextual content for a work of authorship and for selecting the contextual content to be incorporate into a work according to the goals of the work and the characteristics of, for example, the author and the intended audience.

A. Introduction and Elements of a Work of Authorship (FIG. 1)

(a) Narrative Nodes, Narrative Content and Narrative Data Files

Referring to FIG. 1, therein is illustrated the elements and structure of a work 10 of authorship comprised of one or more narrative nodes 12A wherein each narrative node 12A includes narrative content 12B and wherein the narrative content 12B of each node 12A is stored in one or more narrative data files 12C associated with the node 12A. Narrative content 12B will include, at a minimum, the minimum essential information that is to be conveyed by the associated node 12A but will typically include a range of types or classes of information and data related to the subject matter of the node 12A. For example, a narrative data file 12C may include information pertaining or related to work, school, vacations, weddings, family, infancy, childhood, sports, games, and military service. A narrative data file 12C may include one or more narrative content type identifiers 12D indicating the type or types of narrative content 12B contained therein. In a presently preferred embodiment of the present invention, however, a narrative data file 12C will typically contain a single type or class of narrative content data 12B and closely related types of information. For example, a given narrative data file 12C may contain information of the type or class designated as "fun", and will then typically contain information pertaining to play, sports, music, puzzle solving, gaming, hunting and so on.

Lastly with regard to narrative data files 12C, it will be noted that, as indicated in FIG. 1, each narrative data file 12C will typically also include one or more context indicators 12E that identify the types or classes of contextual content 16A, discussed in detail below, that may relate to or be of significance with regard to the narrative content 12B of the narrative data file 12C. In this regard, it must be noted that context indicators 12E may be expressed explicitly in narrative data files 12C, for example by prior analysis of the narrative contents 12B of narrative data files 12C and storing the results of the analyses in data fields of the narrative data files 12C. In a presently preferred embodiment of the method of the present invention, however, context indicators 12E are instead inherent and implicit in narrative data files 12C, being contained within and comprised of the narrative content 12B of the narrative data files 12C. In the presently preferred embodiment, the context indicators 12E of a given narrative data file 12C are determined during the process in which the narrative content 12B of the narrative data file 12C is selected for inclusion in a work 10, by analysis of the narrative content 12B according to rules defining various types of contextual content 16A.

(b) Narrative Structure

As discussed previously, a work 10 is defined by the sequence in which information is presented to a recipient, the recipient can be for example one or more of an audience, an author, or user of the work, effecting and/or receiving the sequence or sequences in which the narrative data files 12C are traversed to present the information therein. Nodes 12A are thereby arranged according to a narrative structure 14A, which is an organizational structure that defines relationships between the nodes 12A of a work 10. The contents of a work 10 are conveyed to a recipient according to the sequence or narrative path 12P by which the nodes 12A of the narrative structure 14A are traversed and the narrative structure 14A structure thereby arranges the narrative contents 12B of the nodes 12A into a coherent presentation of the information contained in nodes 12A according to the intents and purposes of the work 10.

A narrative structure 14A may express many different types of relationship or relationships between nodes 12A and in itself defines and imposes a relationship among the nodes 12A of a work 10 and thus among the narrative contents 12B of the nodes 12A. For example, many works 10, such as a description of a technical or scientific process, a fictional story or a description of historical events, are necessarily comprised of linear sequences of information and, as a consequence, it is necessary for the nodes 12A of the work 10 to be traversed in a specified sequence, or narrative path 12P. In such cases, the nodes 12A will be related and presented primarily according to the narrative requirements of the work 10 and will thereby be related and presented according to a narrative structure 14A structure imposed by the narrative requirements of the work 10. It must be noted, however, that the nodes 12A in a narrative structure 14A may be arranged according to more than one aspect of the narrative. For example, a narrative structure 14A may be comprised of temporal sub-sequences within one or more overall temporal sequences, or according to geographic relationships within one or more overall temporal sequences, such as may be seen in travelogues.

The relationships between nodes 12B of a narrative structure 14A and thus the structure of the narrative structure 14A may also be dependent, for example, on the narrative contents 12B of the nodes 12A. For example, the node 12A may contain narrative contents 12B having temporal relationships, such as sequences of events in time, or geographic relationships, such as the geographic relationships among Boston and the towns of eastern Massachusetts, or subject matter relationships, such as art or medicine. These relationships will in turn be at least inherently or implicitly reflected in the narrative structure 14A. In further example, the narrative contents 12B of the nodes 12A may also express or represent relative relationships that are in turn reflected in the narrative structure 14A. For example, certain events described in the narrative contents 12B of nodes 12A may be closely related in time while others are more distant in time, and these temporal relationships may be at least inherently reflected in the relationships between the nodes 12A of the narrative structure 14A. Yet other narrative contents 12B that may expressly or inherently affect the narrative structure 14A may express, for example, relationships defined by multiple factors. For example, in a work 10 comprising a historical narrative the narrative contents 12B of groups of nodes 12A are related according to a sequence in time but the narrative contents 12B of nodes 12A within a given group may be associated and linked by geographical relationships.

(c) Contextual Content and Context Data Files

As also discussed previously, a work 10 will typically further include contextual content 16A that may be associated with and related to the narrative content 12B in the narrative nodes 12A of a narrative structure 14A wherein, as discussed previously, contextual information provides additional information and details to a recipient both directly and indirectly, both by direct narration of the information and by allusion, association and indirect reference to invoke the emotions, memories and personal knowledge and experiences of the members of the audience. As discussed, if the contextual content 16A selected to be associated with items of narrative content 12B of a work 10 is suitably selected in consideration of the knowledge, experiences and personality of the author and audience of the work 10, the effectiveness of the work 10 will be significantly enhanced.

As indicated in FIG. 1, contextual content 16A is typically stored in context data files 16B, wherein each context data file 16B contains one or more context content 16A items of one or more types or classifications of contextual information 16A. In certain embodiments of the present invention context data files 16B may also contain corresponding context type identifiers 16C identifying the types or classes of contextual content 16A contained therein. In other embodiments, however, the context type identifiers 16C may be determined for a given context data file 16B at the time contextual content 16A is being sought for inclusion in a work 10 and by analysis of the contextual content 16A of the context data file 16B according to rules defining the various types of context content 16A.

In this regard, and according to the present invention, context data files 16B and their contextual content 16A may thereby be considered as members of one or more contextual frameworks 16D wherein each contextual framework 16D relates to a given type or classification of context. For example, the context data files 16B of a chronological contextual framework 16D will contain contextual content 16A that is chronologically related to the narrative content 12B of narrative data files 12C. A geographical contextual framework 16D will contain contextual content 12A related to the narrative content 12B by geographical factors, such as geographical location. Yet other contextual frameworks 16D may pertain, for example, to date and/or time, family or business relationships, personal interests, school history, medical history, various forms of subject matter, and so on for any definable type of context relationship, and may include transient as well as longer term relationships. Contextual frameworks 16D may also be defined as global, that is, as applicable to a wide range of contextual content 16A or narrative content 12A, such as a general class of person or locations, or local, that is, as limited to a narrowly defined range of contextual content 16A or narrative content 12B, such as a very limited group of persons or a specific location, and so on.

The membership of a body of contextual content 16A in a given contextual framework 16D, that is, in a type or classification of contextual information, is determined by a set of contextual rules defined for that contextual framework 16D, that is, for that type or classification of context content 16A. The contextual rules used in determining and prioritizing membership of a particular type or classification of context may be, for example, binary, that is, yes or no, or probabilistic/statistical, and contextual rules used in a particular contextual framework can be determined heuristically or by use of automated classification techniques well known to those of skill in the art, such as use of a genetic algorithm.

As discussed above, and as will be discussed in further detail in a following description, the context indicators 12E in narrative data files 12C indicate the types or classes of contextual content 16A that may relate to the narrative content 12B therein, thereby relating the narrative content 12B of each narrative data file 12C to one or more possible types or classes of contextual content 16A and one or more corresponding contextual frameworks 16D. As described above, context indicators 12E may be expressed explicitly in narrative data files 12C, for example by prior analysis of the narrative contents 12B of narrative data files 12C and storing the results of the analyses in data fields of the narrative data files 12C. In a presently preferred embodiment of the method of the present invention, however, context indicators 12E are instead inherent and implicit in narrative data files 12C, being contained within and comprised of the narrative content 12B of the narrative data files 12C. In the presently preferred embodiment, the context indicators 12E of a given narrative data file 12C are determined during the process in which the narrative content 12B of the narrative data file 12C is selected for inclusion in a work 10, by analysis of the narrative content 12B according to rules defining various types of contextual content 16A.

(d) Narrative Structure Linkages

Each narrative node 12A of a narrative structure 14A has links 14B with other elements of the narrative structure 14A, including but not limited to one or more nodes 12A, narrative data files 12C and/or context data files 16B or repositories of narrative data files 12C and/or context data files 16B. Each such link may exist in one or more of a plurality of functional states, such as the required, optional, active or inactive states wherein the state of a link may be modified, for example, during presentation of the work 10, either automatically or under control of the author or a performer, to adapt the material presented to the audience according to the reactions of the audience.

In addition to the links to or from the narrative nodes 12A, there will typically be additional links between, for example, narrative data files 12C and/or context data files 16B or repositories of narrative data files 12C and/or context data files 16B, at one or more levels of interconnection between the narrative data files 12C and/or context data files 16B or repositories of narrative data files 12C and/or context data files 16B. For example, the author/performer may choose an optional link to a contextual data file 12C to display a scene typical of the Chicago lakefront in 1955. The selection of the contextual data file 12C may produce, in turn, an additional set of links that are required, optional, or inactive. The system and method of the present invention therefore includes the capability to "look ahead" of the currently selected narrative node 12A to identify, locate and sort for narrative data files 12C or context data files 16B of potential significance to the author, performers, characters or audience members in at least one subsequent narrative node 12A.

(e) Absolute and Relative Significance and "Perspective" of Elements of a Work 10

(i) Absolute and Relative Significance

It is well known and accepted in all forms of communication, including for example fiction and non-fiction writing, music and movies, actual or potential impact of a given body of narrative content 12B or contextual content 16A on a work 10 and the audience is a function of and determined by the significance of the narrative, the narrative content 12B and the contextual content 16A of a work 10 to each other and to the author and the intended audience of a work 10. The actual or potential impact of a given body of narrative content 12B or contextual content 16A on a work 10 and the audience may be summarized, in brief and simply, as dependent upon the number of audience members effected, the degree or severity of the impact, the duration of the impact and the degree and significance of the result effects on the work 10 and the effected members of the audience.

In this regard, it must be noted that while significance of an element 10 of a work may be measured in "absolute" terms, that is, in terms of the overall general significance of the element to the work 10 or to works 10 in general. According to the present invention, however, the significance of a given element of a work 10 is more usefully measured and defined in terms of the "relative" significance of the element with respect to other elements of the work 10, such as a narrative node 12A, a narrative data file 12C, a context data file 16B or a person or persons associated with the work 10, such as an author, performer, audience member or real, fictional or anthropomorphic character of the work 10.

As will be described in detail in the following, the present invention provides a method and system for selecting and controlling the relative significance of these elements to each other and to the author and intended audience according to the intended goals and objects of the work 10 and characteristics of the author and audience to optimize the effectiveness of the work 10. As will also be described, the present invention further provides a method and system for adjusting or adapting the choice of contextual content 16A under guidance of the characteristics and responses of the author and audience, even during presentation of the work, to further optimize the effectiveness of the work. For example, an author may wish to invoke an emotional or atmospheric response in the audience and may elect to do so by including music or a reference to music, that is, contextual content 16A, selected to induce the desired response. This in turn requires that the author select music having the appropriate relationship to both the narrative content 12B and the personal characteristics of the audience, such as the general age, probable interests, background and cultural characteristics, including the musical experiences and tastes, of the average audience member. If the work 10 is a live performance, such as a music performance or speech, the author may note the responses of the audience, either by direct observation or, for example, through appropriate sensor systems, and adjust the contextual contents 16A of upcoming nodes 12A accordingly to gain the desired responses.

Therefore considering the effects of contextual content 16A on the narrative of a work 10 and the narrative structure 14A and narrative content 12B of the work 10, the effect of given contextual content 16A in a work 10 is dependent in part upon its relevance to and impact upon the audience and the elements of the work 10. The relevance of a given body of contextual content 16A to an audience and to the work 10, is dependent, for example, on its relationship to the intended object of the work 10, the narrative node 12A with which it is associated, that is, the point at which it appears in the narrative structure 14A, and the specific narrative content 12B with which it is to be associated. For example, the author of a biographical work 10 may wish to include contextual content 16A comprising a photograph of the subject's home during the subject's youth. This contextual content 16A will most suitable appear in a narrative node 12A located in an early part of the narrative structure 14A, unless the author wishes to have a "flashback" scene about an event in the subject's early schooling, and a photograph of the residence as it existed during the subject's youth would probably be notably more significant that a recent photograph of the residence. In further example, an author wishing to invoke a particular emotional or intellectual response, allusion or shared memories or experiences in members of the intended audience may elect to do so by introducing contextual content 16A in the form of music that, in the audience's minds, will be associated with or will induce the desired responses. In order to accomplish these responses, however, the music must be selected so as to have a high degree of relevance with the audience member's ages, possible shared experiences and cultural, educational and musical background and experiences and, of course, with the type of desired emotional or intellectual response.

(ii) Perspective

The significance of a particular item of content is also a function of the "perspective" wherein "perspective" may be defined as the narrative context in which the significance is defined, measured or viewed. For example, the significance of an item or body of content to a particular person or group or class of persons may be defined as "personal" while the significance of the item or body of content to a larger group of which the particular person or group or class of persons is a member may be defined as the "general" or "global" "perspective" that that item or body of content. In the first instance, the context or "perspective" of the significance is "personal" or "local" in that it is measured over, for example, a relative small effected group or over a relative small span of events while in the second instance the perspective is "global", that is, wider or further, because the significance is measured, for example, over a larger group of persons or over a longer span of events.

The "perspective" of an item or body of content to individual persons or groups may be a function of a number of factors, such as the spatiotemporal proximity or displacement or the person or group with respect to the content, the degree of their personal involvement with the content, or the personal impact of the content on the person or group. For example, a person's personal relationship "perspective" with respect to an event will be different depending upon whether they or someone of importance to them are involved, or whether it is someone they know that is involved, or whether the event is only or remote, academic interest. In a like manner, spatiotemporal perspective is, for example, the difference in significance to a person or group of events that are far removed in time or distance, such as a remote historic event or an event occurring in a little known, distinct place, compared to events that are contemporary or local. It must be recognized, however, that the relative weights given to each factor in determining the perspective significance of content to a person or group will typically be a function of the person or group and the content. That is, a historic event may be of greater significance to a particular group than many contemporary events.

The significance of content to a person or group may also be a function of narrative perspective, that is, the point in a narrative from which the content is perceived. For example, the significance of an item of content that is introduced in an early narrative node 14A may not become apparent or may not reach its full impact until a subsequent narrative node 12A, as in the case of "foreshadowing".

Finally and according to the present invention, the significance of two or more elements of a work 10 to each other, such as between or among narrative nodes 12A, items of narrative or contextual content or one or more persons associated with a work 10, such as an author, performer, audience member or real, fictional or anthropomorphic character of the work 10, is typically directional. That is, and for purposes of the present invention, the direction of a relationship or the significance of a relationship is a function of the influence or dependency between the elements of the work 10. For example, a narrative data file 12C may be significant to a narrative node 12A, such as by providing narrative content 12B that defines and comprises at least a part of the narrative node 12A, and the "direction" of the relationship or significance would be from the narrative data file 12C to the narrative node 12A. In the reverse instance, however, the narrative node 12A may, for example, define at least a part of the narrative content 12B of the narrative data file 12C and the direction of the relationship would be from the narrative node 12A to the narrative data file 12C. The influence or relationship between elements of a work 10 may also be bidirectional. That is, and using the same example, the narrative content 12B of the narrative data file 12C may define some aspect of the narrative node 12A and the narrative node 12A may define a part of the narrative content 12B of the narrative data file 12C.

(iii) Virtual Perspective

As discussed above, the significance of a particular item or body of content is a function of "perspective" wherein "perspective" may be defined as the significance of an item or body of content to a particular person or group or class of persons under specific circumstances of the narrative embodied in the work 10. According to the present invention, perspective may, for example, be a function of the spatiotemporal proximity or displacement or the person or group with respect to the content, that is, whether an event is remote or local in time or space, personal proximity or displacement, that is, the degree of their personal involvement with the content or the degree of personal impact of the content, or narrative perspective, that is, the point in a narrative from which the content is perceived or viewed.

The present invention further includes the concept of "virtual perspective", which is an expression and embodiment of the relationship between narrative data files 12C and a narrative node 12A in the context of a narrative path 12P by which the nodes 12A of the narrative structure 14A are traversed to present the narrative and contextual content 12B and 16A or the work 10. According to the present invention, virtual perspective is a mechanism by which narrative and context data files 12C and 16B can be organized and presented to represent the manner in which individuals or groups actually perceive the world and the relative significance of narrative content and context content represented in a work 10.

(iv). Directionality of Relationships

According to the present invention and as will be discussed in detail in the following, the characteristics of relationships between, for example, narrative nodes 12A, narrative and context data files 12C and 16B and their narrative and contextual contents 12B and 16A, and individuals or groups of individuals associated with the work 10 are not limited to absolute or relative significance. According to the present invention, the characteristics of the possible relationships between the elements of a work 10 may also include direction wherein, for purposes of the present invention, relationships direction represents influence or dependency between two elements of a work 10. For example, a narrative data file 12C may be significant to a narrative node 12A, such as by providing narrative content 12B that defines and comprises at least a part of the narrative node 12A. In this case the "direction" of the relationship between the narrative node 12A and narrative data file 12C would be from the narrative data file 12C to the narrative node 12A. That is, in this example the narrative data file 12C influences the narrative node 12A but the narrative node 12A may not influence the narrative data file 12C; that is, the narrative node 12A does not define any part of the narrative content 12B of the narrative data file 12C, which has an existence independent of the narrative node 12A. In the reverse instance, however, the narrative node 12A may, for example, define at least a part of the narrative content 12B of the narrative data file 12C and the direction of the relationship would be from the narrative node 12A to the narrative data file 12C. In a further example, the influence between the narrative node 12A and the narrative data file 12C may be bidirectional. That is, the narrative content 12B of the narrative data file 12C may define some aspect of the narrative node 12A and the narrative node 12A may define a part of the narrative content 12B of the narrative data file 12C.

In a preferred embodiment of the systems and methods of the present invention, therefore, the relationship between elements of a work 10 will includes direction as well as, for example, the strength of the relationship. Accordingly, the direction of a relationship may, in the present invention, be graphically as well as conceptually represented by arrowed lines, including both mono- and bi-directional lines as indicated by the locations and/or orientations of the arrows.

As will be described in detail in a following description, the method and system of the present invention considers the effects of an item of narrative or contextual content from the viewpoint of perspective as well as the more general considerations of significance.

B. Exemplary System for Generating a Work

Figure 2:
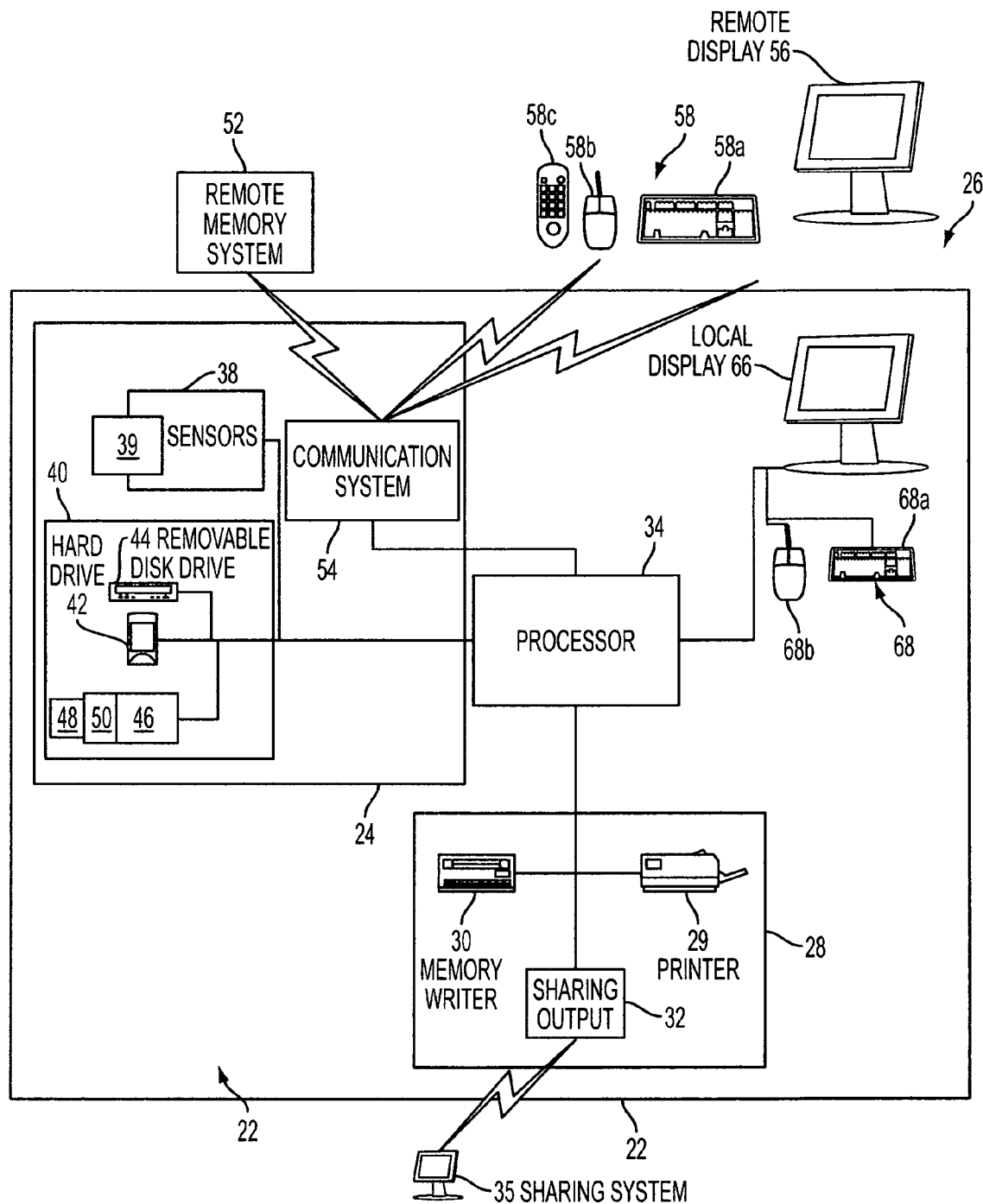
FIG. 2 shows an embodiment of the system.

FIG. 2A illustrates an exemplary embodiment of an electronic system 20 for generating a work 10 of authorship as described above. As illustrated therein, an electronic system 20 comprises a content input system 24 providing narrative data files 12C and context data files 16B, a user input system 26 and an output system 28 connected to a processor 34. The elements of electronic system 20, including content input system 24, user input system 26, output system 28 and processor 34 may be localized or distributed and interconnected through a local or wide area communication system or network 54, as is well known in the arts.

Content input system 24 may include any form of system, apparatus of device that can supply narrative or contextual content 12B or 16A to processor 34 wherein narrative or contextual content 12B or 16A may be comprised, for example, of digital or analog data comprising text, still or sequential images, video, audio data or any other form of information capable of being used as narrative or contextual content 12B or 16A. Content input system 24 may, for example, include personal computers, cell phones, other computer systems, local or remote sensors 38 for capturing narrative or contextual content 12B or 16A and/or local or remote storage devices 40 for storing and providing narrative or contextual content 12B or 16A, and may include a communication system 54 for communicating narrative or contextual content 12B or 16A between sensors 38 and/or storage devices 40 and processor 34. Sensors 38 may, for example, include environmental sensors to detect environmental conditions, audio or visual sensors or cameras or other devices to capture audio data or still or moving images in a range of spectrums, and biometric sensors for measuring physical and mental reactions, including voice inflection, body movement, eye movement, pupil dilation, body temperature, and p4000 wave sensors, as well as any other types of sensors capable of capturing data usable as narrative or contextual content 12B or 16A. Storage devices 40 may, in turn, include any local or remote device, system or apparatus capable of storing and providing digital or analog data that is capable of being employed as narrative or contextual content 12B or 16A. Examples of such may include various forms of hard disk drives or removable media disk drives using, for example, optical or magnetic storage media or magnetic or optical memory cards or devices, other forms of solid state, magnetic or optical memories or storage devices. Yet other devices or systems usable in a content input system for providing narrative of contextual content 12B or 16A may include two and three dimensional scanning/reading devices for reading data from images, documents, three dimensional objects, and so on.

Communication system 54 can comprise for example, one or more optical, radio frequency or other transducer circuits or other systems, such as the internet, a cellular, peer-to-peer or other form of mobile telecommunication network, a local communication network such as wired or wireless local area network or any other conventional wired or wireless data transfer system, that cam transmit narrative content 12B or contextual content 16A to or receive narrative or contextual content 12B or 16A from a remote device or system such as remote memory system 52 or remote display device 56.

User input system 26 allows an author to control the operations of electronic system 20, including such functions as designating narrative or contextual data files 12C and 16B to be incorporated into a work 10, allowing an author to arrange, organize and edit content or contextual data files 12C or 16B, to provide information about the author or audience, and so on. For these purposes, user input system 26 may comprised any of a number of local or remotely connected devices or systems or combinations thereof, including touch screens, keyboards, trackballs, mouse's, voice or gesture recognitions systems, display screens, and so on. In the embodiment shown in FIG. 2, for example, user input system 26 includes an optional remote input 58 including a remote keyboard 58a, a remote mouse 58b, and a remote control 58c and a local input 68 including a local keyboard 68a and a local mouse 68b.

Figure 3A:
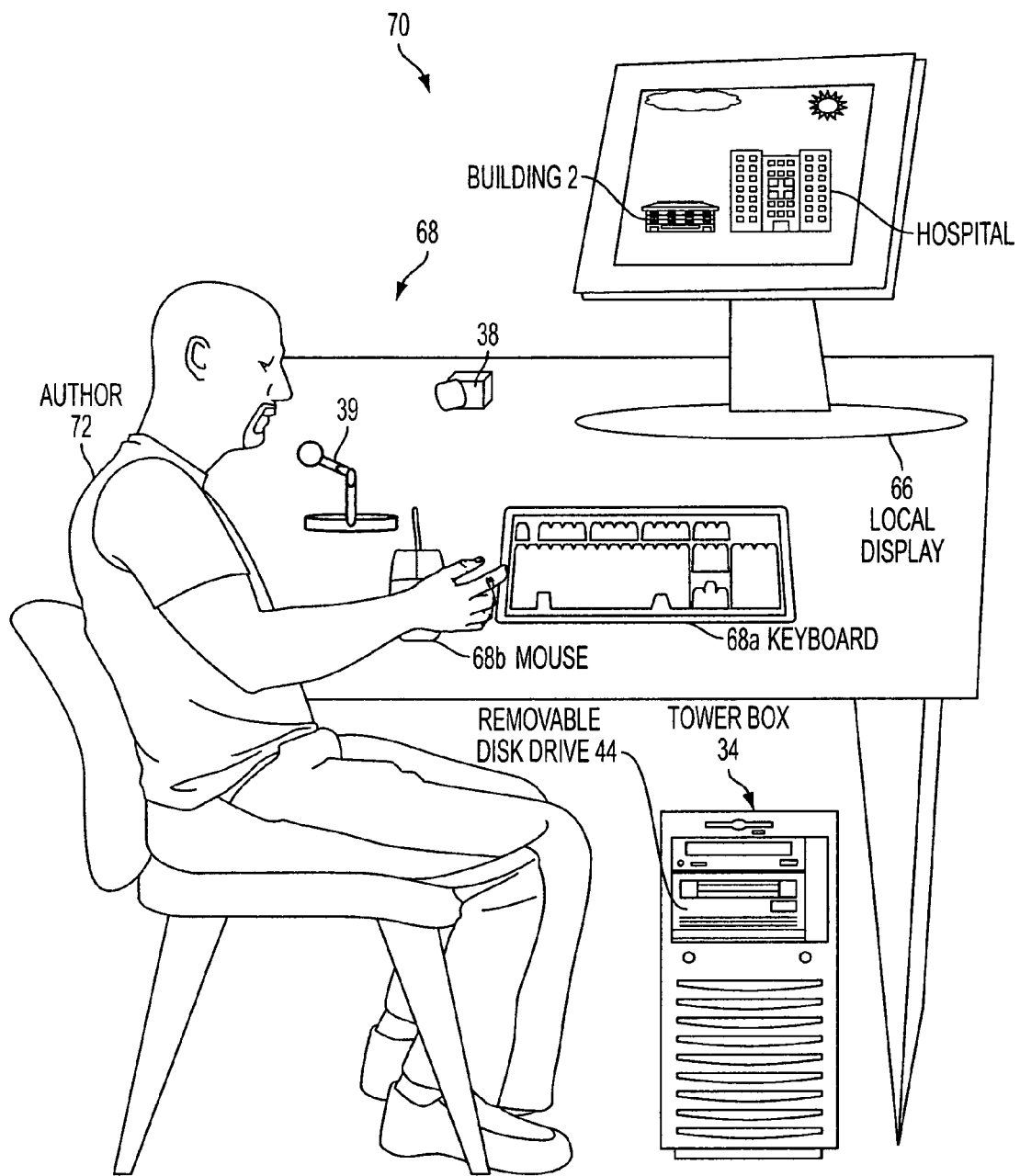
FIG. 3A shows a schematic view of a user input system and display in the form of a studio for use in authoring a work of communication.

As is illustrated in FIG. 3A, local user input 68 may also or alternatively, and for example, take the form of an editing studio or kiosk 70, hereafter also referred to as an "editing area 70". In this embodiment, an author 72 may be seated before a console comprising local keyboard 68a and mouse 68b and a local display 66 which is capable, for example, of displaying multimedia content. Editing area 70 may also have sensors 38 including but not limited to cameras, audio sensors 39 and other sensors such as multispectral sensors that can monitor author 72 during an authoring or working session.

Figure 3B:
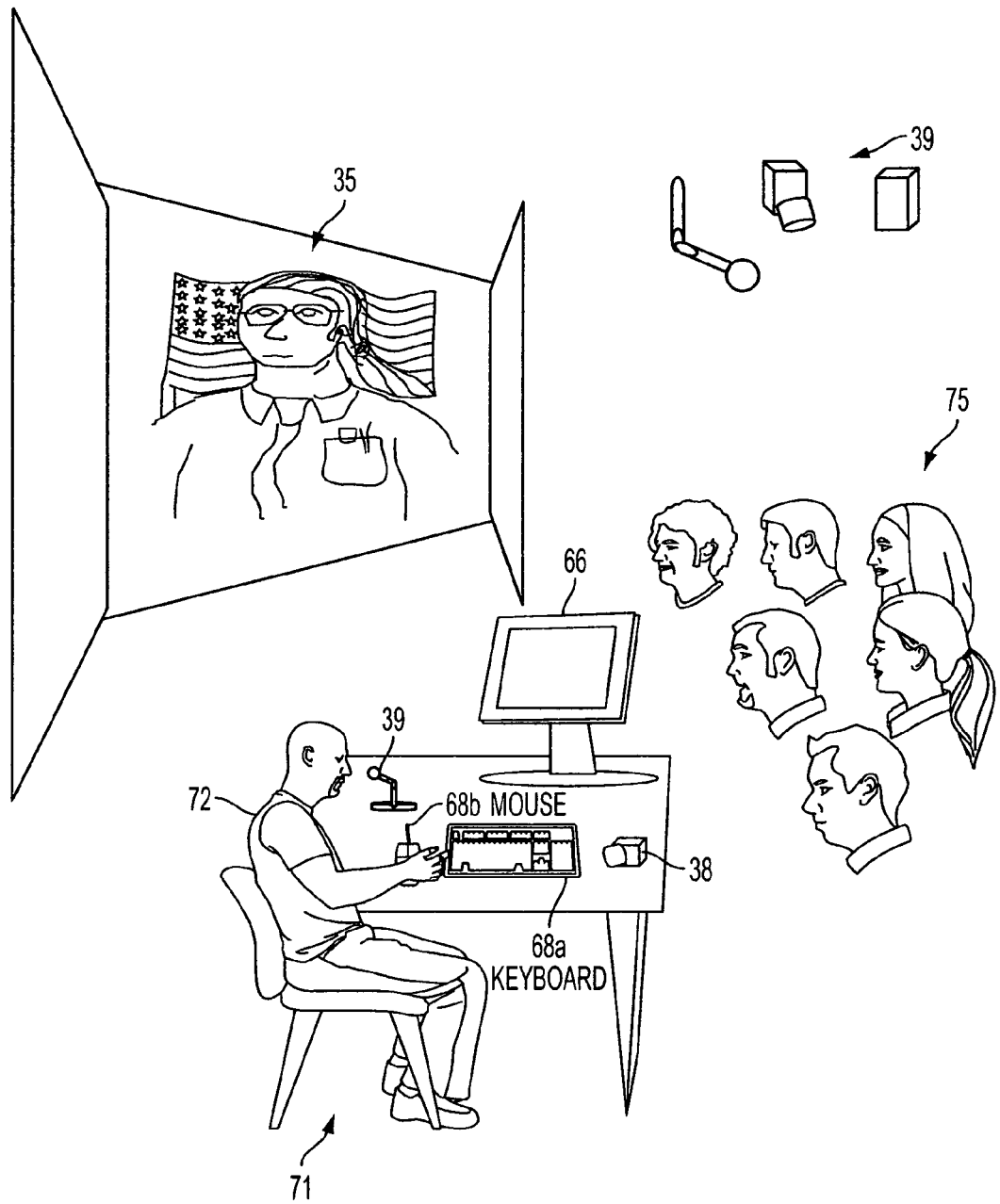
FIG. 3B shows a schematic view of a user input system and display in the form of a performance stage for use in authoring a work of communication.

In a yet further embodiment, such as is illustrated in FIG. 3B, local user input 68 may also or alternatively take the form of a performance stage 71. In this illustration, an author 72 is seated before a console comprising local keyboard 68a and mouse 68b and a local display 66, which is capable of multimedia display. As is also illustrated in FIG. 3B, performance stage 71 can also have sensors 38 including but not limited to cameras, audio sensors 39 and other sensors 38 such as multispectral sensors that can monitor author 72 during an authoring or working session. As is also illustrated in FIG. 3B, performance stage 71 may include a sharing system 35, also referred to herein as a "presentation system 35", that presents narrative or contextual content 12B or 16A to an audience 75 and one or more sensors 38 that are adapted to monitor audience reaction to the presented content. It will be appreciated that the material presented to audience 75 can also be presented to remote viewers by a sharing output 32, as described further below.

Output system 28 allows a user of system 20, that is and typically the author of a work 10, to store, present or deliver or share a work 10 and may be comprised of any system or device or combination of systems of device conventionally used for such purposes. Output system 28 may thereby and for example be comprised of display screens and projectors, image and audio projection devices and systems, printers, communications systems, networks or devices of all types, recording devices, memory devices, and media recording devices, such as CD and DVD presses or recorders.

Finally, processor 34 may be comprised, for example, of a program controlled general purposes processor or group of linked processor operating under control of programs, dedicated purpose systems or sub-systems or any combination thereof operating under control of user/author inputs to select, access and retrieve, manipulate and assemble narrative and contextual content 12B and 16A into a work 10. Such systems are in general and in themselves well known and understood by those of ordinary skill in the relevant arts and the general structure and operations of such devices and systems need not be described further herein.

C. Method for Generating a Work of Authorship

Figure 4:
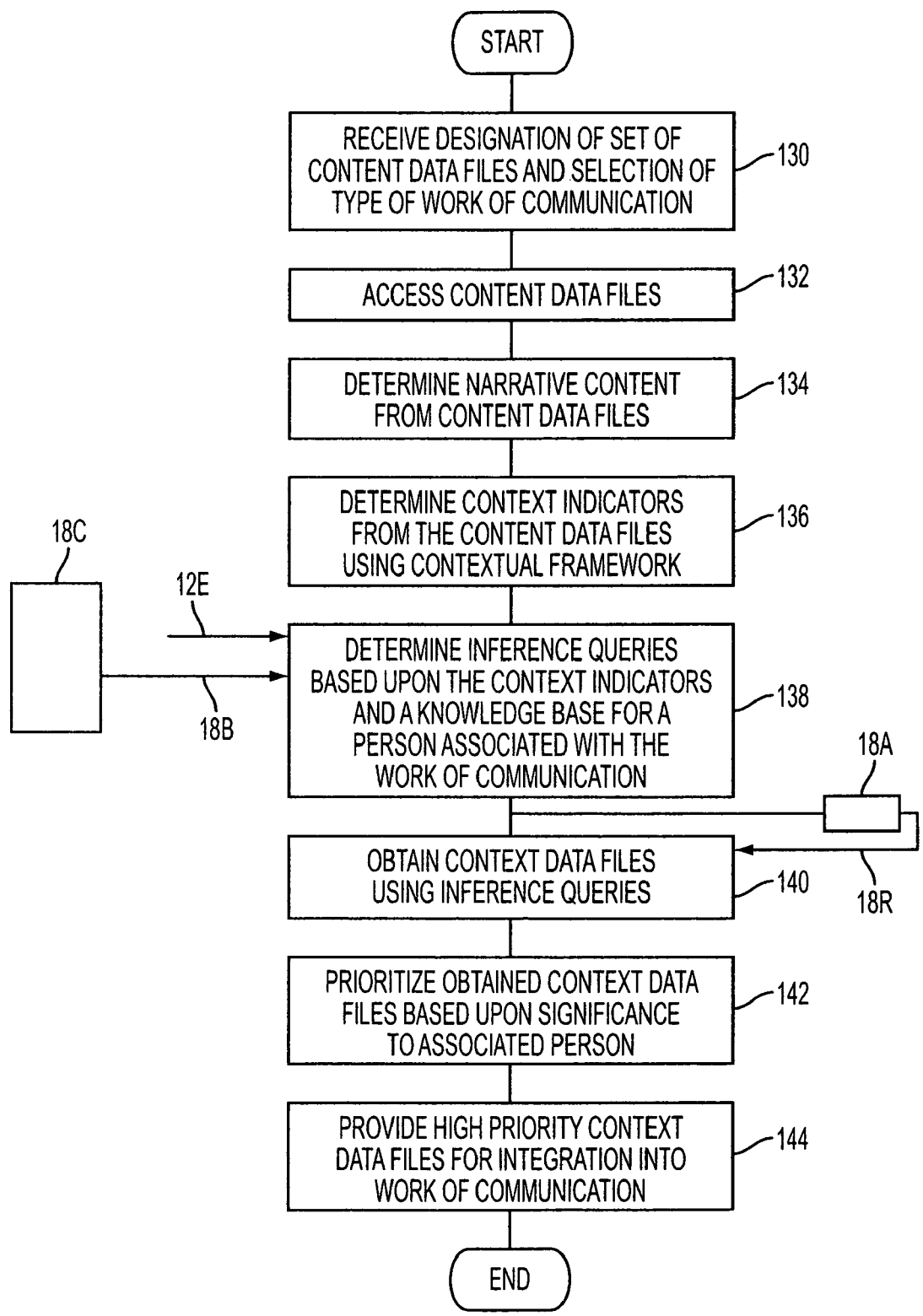
FIG. 4 is a flowchart showing a method for authoring a work of communication.
Figure 5:
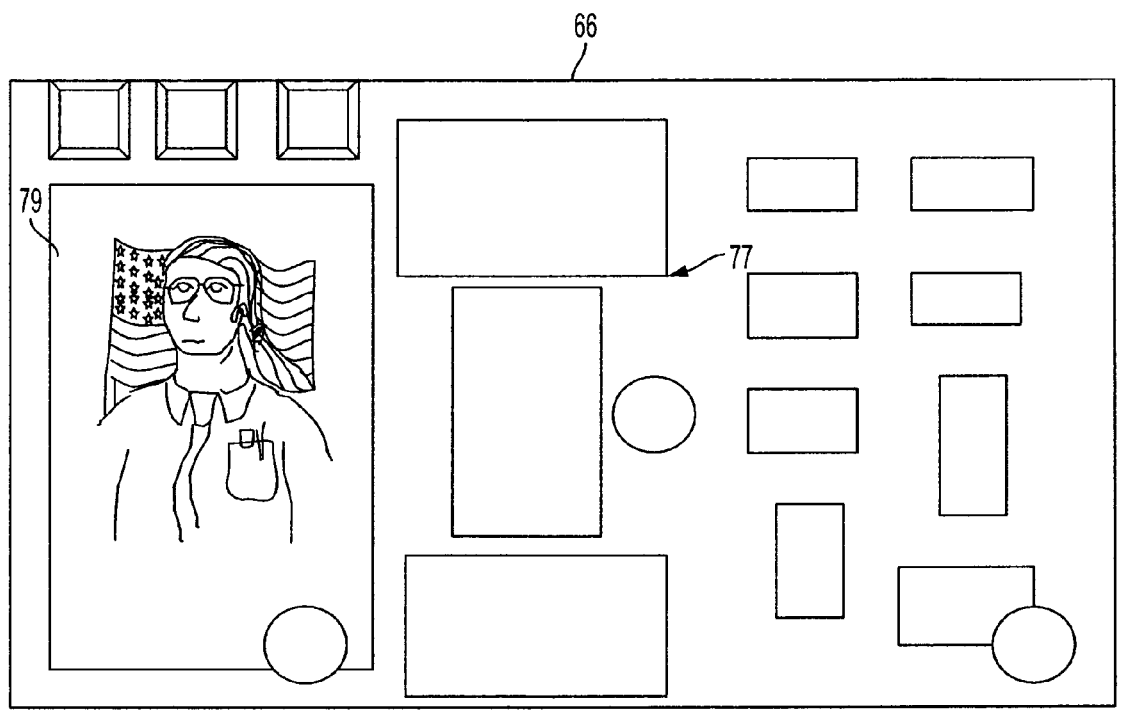
FIG. 5 shows a view of a display device with representations of narrative data files presented thereon.

Referring to FIG. 4, therein is illustrated an exemplary embodiment of the method of the present invention for authoring a work 10 containing both narrative content 12B and contextual content 16A wherein the relative significance and effect or impact of the narrative content 12B and contextual content 16A structure are selectively dependent on at least the characteristics of the author or the intended audience of the work 10. It will be appreciated by those of ordinary skill in the relevant arts, after perusal of the following description of the method of the present invention, that the method of the present invention may be implemented in a system 20 as described above or, alternately, in any generally equivalent system capable of performing the operations of the present method.

(a) Step 130:

The creation of a work 10 begins with the author's designation of one or more narrative content 12B items that are to be included in the work 10 or that are representative of the narrative content 12B to be included in the work 10 and an indication of the form to be taken by the final work 10. The narrative content 12B may be designated in a number of ways, such as by designating or listing one or more narrative data files 12C, by direct input of the narrative content 12B, such as by download from a designated storage device or system or other source of narrative data 12B, or by identifying or specifying one or more types or classifications of narrative content 12B

(b) Step 132:

The narrative data files 12C containing the designated narrative content 12B are then located and accessed and the identified narrative content 12B is retrieved from the appropriate narrative data files 12C. The narrative data files 12C containing the desired narrative content 12B may be identified directly, such as by user designations of the narrative data files 12C, automatically, by downloading from the identified storage device or system, or indirectly, by searching the accessible narrative data files 12C for the designed types or classes of narrative content 12B, such as by a search of the narrative content type identifiers 12D of the narrative data files 12C.

(c) Step 134:

The narrative content 12B of the narrative data files 12C retrieved in step 132 is then filtered according to work criteria 134 that is dependent, for example, the user's identification of the form of the final work 10, that is, and for example, whether the work 10 is to be textual, still or sequential images, music or other audio data, or a combination thereof, so that only the forms of narrative content 12B that are compatible with the intended form of the work 10 remain under consideration for inclusion in the work 10. It should be noted that the volume of narrative content 12B resulting from steps 132 and 134 may exceed the amount of narrative content 12B that can be or is desired to be included in the work 10. In such instances, the user may repeat steps 132 and 134 with narrower work criteria 134C to thereby narrow the range and thus the volume of narrative content 12B to include only the narrative content 12B that is most relevant to the purpose of the work 10. Alternately, the user may intervene directly at this point, such as by direct, individual review of each item of narrative content 12B resulting from steps 132 and 134, to further narrow the range of narrative content 12B resulting from steps 132 and 134.

(d) Steps 136-142:

In steps 136-142 of the process contextual content 16A related to the selected narrative content 12B is identified and retrieved from context data files 16B. As will be described next below, the retrieval of context content 16A pertinent to the narrative content 12B of the narrative data files 12C of a narrative structure 14A is a multi-step process comprising:

(step 136) identification of context indicators 12E in the narrative data files 12C;

(step 138) generation of at least one deductive or inductive inference query 18A relating at least one context indicator 12E of the narrative data files 12C with associated entity data 18B relating to at least one person that is an author or performer of the work 10 or at least one anticipated member of the intended audience of the work 10 or a real or fictional or anthropomorphically character of the work 10;

(step 140) retrieval of query results 18R from an inference query 18A comprising context data files 16B and their contextual content 16A according to the inference queries 18A; and, (step 142) assigning priorities to the contextual contents 16A of the retrieved context data files 16B according to the significance of the contextual contents 16A to the author(s) and the member(s) of the audience identified in the inference queries 18A, and the narrative and narrative structure 14A of the work 10.

The following will next consider the elements and operations of process steps (136) through (142) in greater detail, noting that certain portions of the following discussions have been presented herein above and that such repeated material is presented below for convenience in understanding the relationships between the matters discussed below.

Step 136—Identification of Context Indicators 12E

As described herein above, narrative data files 12C include context indicators 12E that indicate the types or classes of contextual content 16A that may relate to the narrative content 12B. In a presently preferred embodiment, as also described herein above, context indicators 12E are inherent and implicit in narrative data files 12C, being contained within and comprised of the narrative content 12B of the narrative data files 12C. In the presently preferred embodiment, thereby, the context indicators 12E of a narrative data file 12C are determined during the present process by analysis of the narrative content 12B of the narrative data file 12C according to contextual framework rules 16E defining each contextual framework 16D and its contextual contents 16A.

Context indicators 12E are identified in the narrative data files 12C according to one or more contextual frameworks 16D of rules for identifying occurrences of the various types and classes of narrative content 12B. In a presently preferred embodiment, context indicators 12E identify and comprise any of a wide variety of types of narrative content 12B that are identifiable through analysis of the narrative data files 12C and can provide any of a number of different pieces of information that can provide some useful suggestion or identification as to the contextual content 16A related to a set of narrative data files 12C. The following description of exemplary context indicators 12E and contextual frameworks 16D is generally directed to the instance of a single contextual framework 16D of a work 10 for purposes of brevity and clarity. It will be understood, however, that the following descriptions may be readily expanded to works 10 possessing multiple contextual frameworks 16D.

As indicated, a contextual framework 16D is comprised of and defined by various rules that are used to identify context indicators 12E in a narrative data file 12C and each contextual framework 16D and the rules of a contextual framework 16D may be organized or grouped according to categories of related context indicators 12E and the associated rules for determining such context indicators 12E.

According to the present invention, context indicators 12E are elements of semantic information determined from an analysis of one or more instances of narrative content 12B in a narrative data file 12C wherein the term "semantic information" is used herein to refer to the meaning of a particular instance of data as interpreted by a human observer. For example, semantic information refers to the meaning of a word or phrase in a text document or the interpretation of a particular pattern of light and shadow in an image as a pair of eyes. In a contextual framework 16D, context indicators 12E are particular items of semantic information that are identified by the associated rules as being relevant to the identified context. An individual contextual framework 16D is thereby generally inclusive of at least some of the semantic information potentially available in a narrative data file 12C and generally exclusive of other semantic information potentially available in the narrative data file 12C, with the selection between the included and excluded semantic information being defined by the rules of the contextual framework 16D.

One example of a contextual framework 16D is a chronological contextual framework 16D, that is, a framework of rules related to chronology that identify a the chronological context of the set of narrative data files. For example, one contextual framework 16D rule can analyze the narrative data files 12C to determine a range of dates and times over which the set of narrative data files 12C were captured. Other rules can examine each narrative data file 12C to try to associate the set of narrative data files 12C with a time of day, or to determine a time of day or year that a particular event occurred, or to determine whether a set of narrative data files 12C represents a single event, a sequence of different events or one or more groups of events. Such chronological context indicators 12E might be found in metadata associated with selected narrative data files, such as date and time information, or by analyzing the narrative content 12B of the narrative data files 12C for chronological indicators such as image, text or audio elements that are known to connote chronological relationships or properties Another example of a contextual framework 16D is an environmental contextual framework 16D pertaining to environmental context indicators 12E within the narrative data files 12C wherein the contextual framework 16D rules operate to determine ambient conditions within which a narrative occurs, such as rules for determining weather conditions, daylight and indoor/outdoor status can be applied. Environment indicators 12E like chronological indicators 12E, can be determined from metadata and analyses of content and by use of additional outside information, such as metadata on white balance in an image that can indicate indoor/outdoor status, exposure level can indicate light or dark outdoor conditions Still other examples of a contextual framework 16D include but are not limited to, for example, a social framework that defines rules for location, social context indicators in the narrative data files such as groupings of people depicted therein. For example, family groupings, school groupings, work groupings and the like can be identified using appropriate rules.

Other contextual framework 16Ds can be provided, for example, political and technological contextual framework 16D can include, as context indicators, political figures or indicia of technological development, or athletic, educational, and geographic contexts.

As discussed previously, the contextual rules of a contextual framework 16D may be, for example, binary, that is, yes or no, or probabilistic/statistical, and contextual rules used in a particular contextual framework can be determined heuristically or by use of automated classification techniques well known to those of skill in the art, such as use of a genetic algorithm.

Step 138—Generation of Inference Queries 18A

An inductive or deductive inference query 18A essentially comprises a search criteria derived from and identifying a possible relevant contextual relationship between items of contextual content 16A as identified by the context indicators 12E identified in step 136 and information, referred to herein as associated entity data 18B, pertaining to or characterizing an entity or person, such as an author, performer, audience member or real, fictional or anthropomorphic character or representation, associated with or appearing in the work 10. The query results 19R resulting from an inference query 18A thereby represent a possible relationship, relevancy or correlation between a person or entity that is associated in some way with a work 10 and contextual content 16A that is or may be associated with the narrative content 12B of the work 10. The following description of exemplary inference queries 18A is generally directed, for purposes of brevity and clarity, to an instance of a single inference query 18A pertaining to an author, performer, audience member or real, fictional or anthropomorphical character of a work 10. It will be understood, however, that the following descriptions may be readily expanded to instances involving multiple inference queries 18A and multiple persons or entities associated with a work 10 in any of a wide variety of relationships.

Associated entity data 18B is stored in one or more knowledge databases 18C wherein each knowledge base 18C is comprised of information pertaining to and relevant to the associated person or entity. Associated entity data 18B may include for example, but is not limited to, biographical information including family, educational, professional, social, medical, or psychological histories, personal characteristics, preferences and habits, and so on, and may include any form of information descriptive of the associated entity. Context indicators 12E, in turn and as described above, identify the various types and classes of context content 16A that may be associated with the narrative content 12B in each narrative data file 12C of the work 10.

Inference queries 18A are generated by comparisons of the context indicators 12E determined in step 136 of the process with the associated entity data 12B of one or more of the persons or entities associated with the work 10 to identify matches, correlations or other relevancies between the context indicators 12E and items of the associated entity data 12B. Each resulting inference query 18A represents a possible match, correlation or relevancy between a context indicator 12E obtained from the narrative content 12B of the work 10 and a person or entity associated with the work 10, and includes identifications of the corresponding context indicators 12E and the relevant items of associated entity data 12B. For example, a given body of associated entity data 12B pertaining to a person or entity associated in some way with the work 10 can be comprised of an educational history for a person and the educational history can identify schools attended by the relevant person and the years of attendance. If a context indicator 12E derived from the narrative content 12B of the narrative data files 12C of the work 10 suggests that the corresponding set of narrative data files 12C were captured during a particular year, and the knowledge base 18C indicates that the associated person was attending a particular school during that year, then inference queries 18A can be generated for narrative data files 12C that are related to the school and/or people who attended the school during the relevant year.

Step 140—Retrieval of Relevant Contextual Content 16A

In step 140, the inference queries 18A determined in step 139 are then used to search for, locate and retrieve context data files 16B containing contextual content 16A corresponding to the context indicators 12E and the relevant items of associated entity data 12B identified in the inference queries 18A.

Step 142—Significance and Assignment of Priorities to Contextual Content 16A

In step 142, as described briefly above, the process of the present invention assigns priorities to the contextual content 16A of the retrieved context data files 16B according to the significance of the contextual contents 16A to the persons or entities identified in the inference queries 18A and to the narrative and narrative structure 14A of the work 10

The significance of each retrieved item of context content 16A is dependent upon and determined by the nature of the context data files 16B and contextual content 16A found during the inference query 18A search or searches and the relationship between the context data files 16B and contextual content 16A and the associated person or entity. For example, a higher priority is assigned to context data files 16B and contextual content 16A depicting content having a greater level of immediacy for or closer relationship to the associated person or entity. Thus, and for example in the instance of the above described search for school related context data files 16B, the context data files 16B having contextual content 16A that depicts the present appearance of the school might be given lower priority than context data files 16B that present contextual content 16A represent the school from the years in which the associated person attended that school. Similarly, context data files 16B and contextual data 16A actually depicting the relevant person at the school during that time frame would be determined to have a still higher significance and thus given a higher priority.

In summary, therefore, the levels of relative significance of items of narrative content 12B or contextual content 16A will depend upon and vary with the group and the matters or events, and there is useful information inherent, in terms of the goals and objects of a given work 10, in the distinctions between types and levels of general significance. For example, significance may be generally defined as the function of the size of an effected group and the intensity and duration of the effect of the event or matter as perceived by the group. It is therefore apparent that in at least certain instances it is advantageous to the intended narrative goals and object of a work 10 to distinguish between, for example, narrative content 12B that effects large groups intensely for short periods of time and narrative content 12B that effects large groups at low levels of intensity over a long period, and various levels of intermediate significance. It is further understood that shared contextual content 16A, such as membership in a group having a common age range and common experiences, will aid in identifying narrative or contextual content 12B or 16A that are likely to be of particular significance to the author, performers, the audience and the characters in the work 10.

It must be noted that there are a number of means of measuring significance between events or elements, many of which are well known in the arts, and that any system of significance measure that will provide the described results may be so employed, depending upon the needs, requirements and objects of the particular embodiment of the present invention.

It must also be noted that the range of criteria for judging and measuring relevance and significance and this priorities is essentially unlimited and includes any criteria for evaluating or representing relationships between, for example, events, persons or other factors, and may include, for example, social, economic, historical and political factors and so on.

Step 144—Selecting and Integrating Contextual Content 16A

The context data files 12C and contextual content 12B identified and retrieved and ordered by assigned priority in step 142 may then be incorporated into the work 10 in association with the respectively associated narrative content 12B of narrative content files 12C.

While all of the context data files 12C and contextual content 12B identified in step 142 may be included into the work 10, the resulting number of context data files 12C or amount of contextual content 12B may be excessive for the intended nature or scope of the work 10, or may result in the effect of the more significant contextual content 12B being diluted by less significant contextual content 12B. It is therefore often and typically necessary to reduce or limit the number of context data files 12C or amount of contextual content 12B in order to obtain the desired effect or to stay within the intended bounds of the work 10. The number of context data files 12C or amount of contextual content 12B incorporated into a work 10 may be reduced or limited by a number of different methods and according to a number of different criteria. For example, contextual files or content may be selected or limited according to a predetermined metric, such as work criteria 134C, the priorities assigned in step 144, the number of context data files 16B or volume of contextual content 16A contained in the context data files 16B, or aspects such as the contextual framework 16D, the associated person, the subject or type of work 10, and so on, either singly or in any combination thereof. The selection of contextual content 12B may be mad, for example, heuristically, automatically according to predetermined or selected criteria or combinations of criteria, or by individual consideration of the context data files 12C or contextual content 12B by an author of the work 10.

It must also be noted that in addition to incorporating contextual content 16A and narrative content 12B from previously acquired context data files 16B and narrative data files 12C, the system and method of the present invention may also incorporate contextual content 16A or narrative content 12B acquired in "real time", such as when the work 10 is being created or performed or otherwise presented to an audience. In such instances, and as illustrated in FIG. 2B, a system in which the method of the present invention is implemented may include, for example, an editing area 70 to have the form of a personal monitoring image and sound capture device that runs continuously, and in conjunction with sensors and monitors, is able to select events and objects of significance as they present themselves to an individual and capture or otherwise record those objects and events.

In a further example, as illustrated in FIG. 2C, an author 72 is stationed on performance area 71 illustrated in FIG. 2C and recounting incidents in her life. As author 72 speaks, audio capture system 39 senses the voice signals, converts the voice signals into a narrative data file 12C. The system then determines a narrative content 12B associated with the narrative data file 12C, analyzes the narrative data file 12C in accordance with the rules of one or more contextual frameworks 16D to determine context indicators 12E. The context indicators 12E are then applied to a knowledge base 18C for the author 72 to obtain inference queries 18A and the inference queries 18A are used to obtain context data files 16B that are significant to the associated person, in this case the author 72. Because of the manner in which the context data files 16B are acquired, the context data files 16B are also significant to the narrative content 12B of the storytelling performance. In this example, the context data files 16B are media objects that are automatically available for inclusion in the work 10. For example, where author 72 is presenting her story on a performance stage 71 as illustrated in FIG. 2C, this can be done by providing author 72 with a presentation of representations of narrative data files 12C and context data files 16B on a local display 66. Author 72 may the choose to share one of the context data files 16B with audience 77 or can respond to the presentation of context data files 16B by adding to or changing the direction of the story. As author 72 speaks of her experiences, maps, photos, documents, sounds and other context data files 16B can be presented to author 72 without the formulation of an inference query 18A by author 72. Author 72 can use the presented context data files 16B and narrative data files 12C as stimulants to memory and cues to further narration, can share the presented narrative and context data files 12C and 16B with the audience, or can ignore the presented narrative or context data files 12C or 16B, or do all of these at different times in a single performance. Each time the storyteller recounts the same or a similar story, narrative comprised of narrative data files 12C and context data files 16B can be tailored to capture the choices made by author 72 other performers and/or audience 77 with the intent that such a history can be used to better anticipate and fulfill the needs of the author (or other performers) in telling the story.

Figure 6:
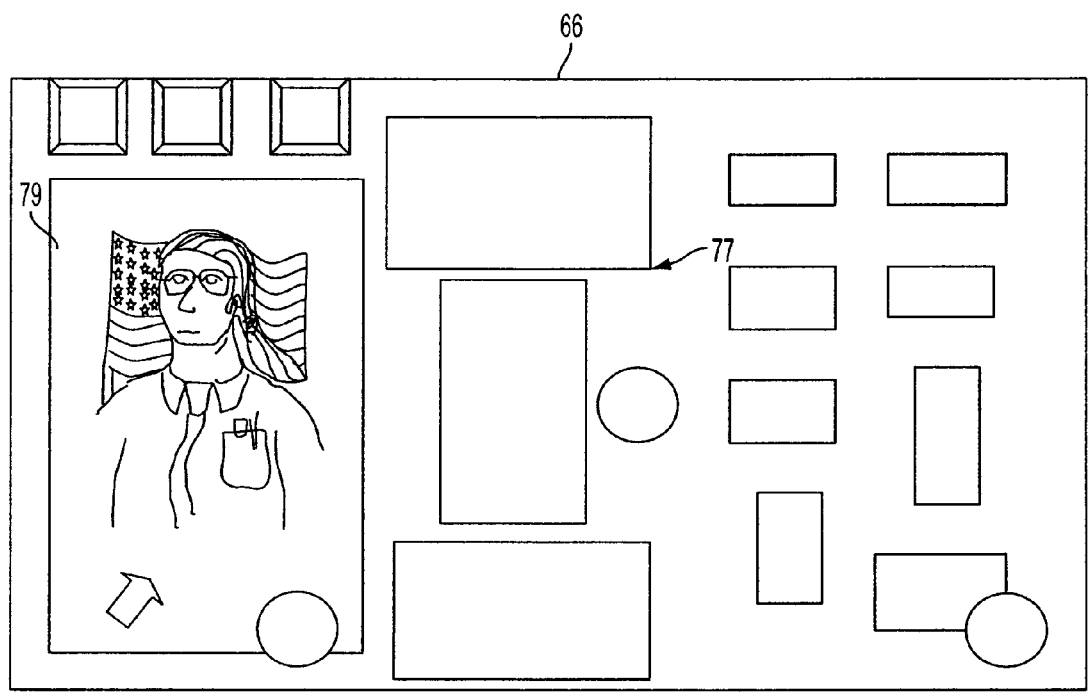
FIG. 6 is a diagrammatic representation of database structures.

D. Database Structures (FIG. 6)

In a presently preferred embodiment of a system 10 in which the present method for creating a work 10 may be implemented, the above described functions and mechanisms are implemented by means of a plurality of database structures.

For example, as illustrated in FIG. 7 and as described in detail in the following, knowledge databases 200 contain information pertaining to persons or entities associated the work 10, such as and for example, an author, performer, audience member, or real, fictional or anthropomorphic character appearing in the work 10. Other database structures implementing the present invention may include, for example, narrative data file databases 210 as illustrated in FIG. 8 for storing information characterizing the content of narrative data files 12C. FIG. 9 in turn illustrates an embodiment of designated narrative data file databases 220 for storing information characterizing narrative data files 12C that are designated to be incorporated in a work 10. As will be described in further detail below, designated narrative data file databases 220 and designated narrative data files 12C are effectively data file databases 210 relating to narrative data files 12C specifically designated for inclusion in a work 10 and thereby comprise a special class or group of narrative data file database 210.

FIG. 10 illustrates an embodiment of narrative structure databases 230 that define and characterize a narrative structure 14A for a work 10.

Lastly, FIG. 11 illustrates an embodiment of link databases 240 for storing links 14B associating, for example, narrative nodes 12A, narrative data files 12C, context data files 16B, the narrative structure 14A into a work 10.

(a) Knowledge Database Structures 200 (FIG. 7)

Therefore considering each of these database structures individually and in greater detail, as described above a knowledge database 200 provides a mechanism storing associated entity data 18B pertaining to and relevant to an associated person, entity or group of persons or entities associated with a work 10. As illustrated in FIG. 7, a knowledge database 200 includes one or more knowledge entries 200E, each of which comprises a series of data fields 202 of biographical, social, behavioral or psychological information pertaining to a person or group. Each data field 202 can store information directly and/or can be a logical link 204 to another repository of stored data, and links 204 may include null links.

Biographical, social, behavioral or psychological information to be stored in data fields 202 of a knowledge database structure 200 may be generated and stored in data files 202 either directly or indirectly. For example, direct methods for generating and storing biographical, social, behavioral or psychological information may include asking questions of the individual or group or asking the individual or group to fill out a questionnaire. Indirect methods include searching an individual's or group's public records, monitoring the behavior of the individual or group and noting voluntary and/or involuntary responses to specific types of stimuli, and additionally, by deductively and inductively inferring information about the individual or group from information otherwise gathered.

(b) Narrative Data File Database 210 (FIG. 8)

A narrative data file database 210 comprises a mechanism for storing information characterizing the content of the narrative data files 12C associated with each narrative node 12A in the narrative structure 14A of a work 10. Narrative data file databases 210 thereby allow narrative data files 12C to be identified, evaluated, classified and sorted or organized according to their general significance to a given narrative node 12A and type of work 10 and for appropriateness to the narrative node 12A and type of work 10. For example, given the availability of information pertaining to the author or one or more members of an expected audience, the narrative data files 12C may be classified, sorted, ordered and related to the narrative nodes 12A according to the significance of the narrative content 12B of the narrative data files 12C. In addition, and significantly with respect to the fundamental method of the present invention, changes in the author or authors, the performers, the characters in the work 10 or the intended audience or responses of the audience are easily reflected in the corresponding narrative data file databases 210 and thus in the narrative of the work 10. Such changes may be incorporated in "real time" and may be effectuated by, for example, direct "feedback" of the responses of a live audience while the work 10 is being presented to an audience, thereby effectively allowing modification of a work 10 by interactive cooperation between the author(s), performer(s) and members of an audience. Narrative data file databases 210 also permit such changes to be incorporated directly into a work 10 and carried forward from version to version of the work 10, thereby allowing a work 10 to be adapted, for example, to changing circumstances or audiences or to be updated to remain topical.

As illustrated in FIG. 8, each narrative data file database 210 is comprised of one or more narrative data file entries 210E, each of which corresponds to and is associated with a corresponding narrative data file 12C and comprises one or more narrative data file entries 200E, each of which contains a plurality of criteria 212 fields wherein each criteria 212 field corresponds to a given criteria characterizing some aspect of the associated narrative data file 12C. As indicated, the data fields associated with and comprising each criteria 212 entry in a narrative data file entry 210E include an associated criteria value field 214 containing the characterizing information for that criteria 212.

Considering the criteria 212 typically appearing in a narrative data file entry 210E, each narrative data file database will include at least a unique identifier 216 assigned to and uniquely identifying the corresponding narrative data file 21C. Further criteria 212 that may be included in a narrative data file database 219 may include, for example, one or more group identifiers 214 or sub-group identifiers identifying corresponding groups or sub-groups of narrative data files 12C to which the given narrative data file 12C belongs, such as the group "birthdays" and the sub-group "February birthdays". Such groups and sub-groups and the corresponding identifiers may be defined or imposed, for example, "top down" or "bottom up" and may be used, for example, in defining a context or contextual framework 16D of a work 10 and it should also be noted that the number of groups or sub-groups to which a given narrative data file 12C can be assigned is effectively unlimited.

Other criteria 212 may include event/type identifications pertaining to the type or class of narrative content 12B or contextual content 16A appearing in the narrative data file 12A or associated context data file 16B, for example, whether the node content pertains to school, political, cultural, sporting or religious events or matters, type of content or to a person, group, object, condition or environment.

The criteria 212 appearing in a narrative data file entry 210E will also typically include information pertaining to the degree of significance of the narrative content 12B of a narrative node 12A and the relationship between the narrative content 12B and other narrative or contest content 12B or 16A or persons, entities or groups related to the work 10. As discussed previously, the significance of a given item or body of narrative or contextual content 12B or 16A may be expressed as and is generally a function of and dependent upon the impact of the narrative content 12B of the narrative node 12A, the number of persons effected by the narrative content 12B, the severity of the effect or impact of the narrative content 12B, the duration of the effect, and the type and extent of changes resulting from the impact. Other factors determining the significance of narrative or contextual content may include the space in which the impact takes place, the location at which the impact occurs and the number of other items of narrative or contextual contents related to or effected by the content in question.

Other criteria 212 that may be represented in a narrative data file entry 210E may include, for example and as illustrated in FIG. 8, identifications of the type of media in which the corresponding narrative content 12B resides, such as audio, image or text, the physical aspects of the narrative content 12B, such as resolution, size and so forth, the species of narrative content 12B contained therein, such as relational, epochal or iconic content, the date and location of acquisition of the narrative content 12B or ownership of the narrative content 12B

It will be apparent that various taxonomies and classifications can be applied as appropriate to select and generate criteria 212 appropriate to a contemplated work 10. It will also be apparent from the above discussions that the taxonomy used creates and defines a contextual framework 16D for the work 10 and context indicators 12E by the application of formulas applying the corresponding resulting contextual rules to the criteria 212. Again, criteria 212 may be defined or imposed, for example, "top down" or "bottom up" and may be applied to both structured and unstructured narrative and contextual content 12B and 16A.

(c) Designated Narrative Data File Databases 220 (FIG. 9)

FIG. 9 illustrates an exemplary embodiment of a designated narrative data file database 220 for storing information characterizing narrative data files 12C that are designated to be incorporated in a work 10. As generally indicated, each designated data file database 220 includes one or more designated data file entries 220E, each of which includes one or more criteria 222 and associated fields 224 for storing values of the corresponding criteria 222. A given designated narrative data file entry 220E include or may include essentially the same criteria 212 and fields 214 as contained in a narrative data file entry 210E as described above with reference to FIG. 8. Designated narrative data file entries 220E comprise, however, a special case of narrative data file entries 210W for particular use, for example, in selecting, designating and organizing groups of narrative data files 12C.

Instances of designated narrative data file databases 220 and designated narrative data file entries 220E may include, for example, "personal" databases and "local" databases wherein a personal designated narrative data file entry 220E of the type illustrated in FIG. 9 may be assembled by sorting narrative data files 12C on the basis of relative significance to the author, performers, and characters in the work 10 and the audience. A designated narrative data file entry 220E may contain, for example, material either generated by the author or selected by the author as belonging to a set of personal narrative data files 12C or personal context data files 16B containing narrative content 12B or contextual content 16A having a close personal proximity or significance to or relationship with an author, performer, character of the work 10 or member of the audience. For example, images of the author's town would be of significance to the author, possibly to at least certain characters of the work 10 and those performers and individuals in the audience who come from the same area as the author, especially if they were there in the same time period. The narrative data files 12C associated with a personal designated narrative data file entry 220E could thus include, for example, personal photographs, movies, clippings from local newspapers of family exploits, works of personal art, documents and other recordings of personal or family achievement and all other content that meets the author's criteria "Local" designated narrative data file databases 220 and entries 220E, in turn, contain narrative data files 12C having narrative content 12B whose significance is based on a more distant or a non-personal relationship to an author, performer, character or audience member, is of lesser significance to such persons or is based upon a relationship with other than an author, performer, character or audience member or is based upon a more narrowly defined scope or type of relationship. Such narrative data files 12C may, for example, contain narrative content 12B that has only a mid or low level of significance to an author, performer, characters or audience member but that is of greater significance to such persons than to the general population. In further example of the narrative content 12B of a local narrative data file entry 220E, people of the same age, even if not physically collocated, commonly share at least a degree of general perception of experience and may thereby be said to have, as a group, a useful level of local relative significance to each other based upon that degree or range of experiences that are shared in fact or in perception.

Lastly, it should be noted that the functionality of designated narrative data file databases 220 can be achieved within other database structures through the use of fields, views, metatags and other tools well known to those versed in the art of databases.

(d) Narrative Structure Database 230 (FIG. 10)

As discussed herein above, the organization or structure of a work 10 of authorship is typically based on an underlying narrative that defines a spatiotemporal collection of relationships between concepts having or represented by associated narrative content 12B contained in narrative data files 12C. As also discussed previously herein above, the contents of a work 10 are conveyed to an audience according to the sequence or narrative path 12P by which the nodes 12A of the narrative structure 14A are traversed, and the narrative structure 14A structure arranges the narrative contents 12B and associated contextual contents 16A of the nodes 12A into a coherent presentation of the contents of the work 10.

Referring therefore to FIG. 10, therein is illustrated an exemplary embodiment of a narrative structure database 230 that defines a narrative structure 14A for a work 10. As shown, a narrative structure database 230 includes one or more narrative structure entries 230E, each of which includes one or more criteria 232, each of which in turn includes descriptor fields, such as descriptor fields 234 and 236 illustrated in FIG. 10, that contain information defining the narrative structure 14A of the work 10, the relationships between the narrative nodes 12A included in the narrative structure 14A, and identifications of the narrative data files 12C associated with the narrative nodes 12A of the narrative structure 12A, including the status of the narrative data files 12C.

For example, and considering the narrative structure information typically and generally included in the data fields 234 and 236 of a narrative structure entry 230E in further detail, one descriptor field 234 may contain a unique identifier 238 for the work 10. Other descriptor fields 234 will typically correspond to each narrative node 12A of the narrative structure 14A and may contain, for example, a unique identifier for the associated narrative node 12A.

Others of criteria 232 and the associated descriptor fields 234 and 2356 may contain information identifying the location of the corresponding narrative node 12A in the narrative structure 14A itself. Yet others of criteria 232 and the associated descriptor fields 234 and 236 may contain information identifying the spatiotemporal location of the narrative node 12A in narrative presented by the work 10 or in the "real world", such as "Chicago, Spring, 1993-Fall 1994" or "New York, 1 am, Wed, Nov. 11$^{th}$" or a generic equivalent such as "small town, summers day."

Still further criteria 232 and associated descriptor fields 234 and 236 may contain information identifying, for example, a role played by the narrative node 12A within the narrative structure 14A. Such identified roles may include, for example, narrative nodes 12A that set a context or provide a surprise, drama or resolution effect, and so on, thereby allowing the associated narrative data files 12C to be identified and sorted on an aesthetic basis to more readily determine the flow and pattern of the narrative of a work 10. Context setting narrative data files can be described by the formula as having wide general exposure coupled with a low level of significance but of lengthy temporal duration. A dramatic narrative data file can rely on high levels of significance and short temporal duration and close proximity, that is, a close relationship to the associated person(s).

A narrative structure entry 230E can also have criteria 232 and associate fields 234 and 236 like those in the narrative data file database 210 that describe a node in terms of preferred characteristics of resolution, appearance, and media type that will allow system 20 to rapidly generate a work of communication in response to changing goals of the author, performers and responses of the audience.

Additionally, a narrative structure database 230 can have criteria 232 and associated fields containing overall rules governing the presentation, editing, and assemblage of the narrative data files that will constitute the work of communication.

(e) Link Databases 240 (FIG. 11)

Each narrative node 12A of a narrative structure 14A has links 14B other element of the narrative structure 14A, including but not limited to one or more nodes 12A, narrative data files 12C and/or context data files 16B or repositories of narrative data files 12C and/or context data files 16B. Each such link 14B may exist in one or more of a plurality of functional states, such as the required, optional, active or inactive states wherein the state of a link 14B may be modified, for example, during presentation of the work 10, either automatically or under control of the author or a performer, to adapt the material presented to the audience according to the reactions of the audience.

In addition to the links 14B to or from the narrative nodes 12A, there will typically be additional links 14B between, for example, narrative data files 12C and/or context data files 16B or repositories of narrative data files 12C and/or context data files 16B, at one or more levels of interconnection between the narrative data files 12C and/or context data files 16B or repositories of narrative data files 12C and/or context data files 16B. For example, the author/performer may choose an optional link 14B to a contextual data file 12C to display a scene typical of the Chicago lakefront in 1955. The selection of the contextual data file 12C may produce, in turn, an additional set of links 14B that are required, optional, or inactive. The system and method of the present invention thereby includes the capability to "look ahead" of the currently selected narrative node 12A, by following chains or sequences of links 14B, to identify, locate and sort narrative data files 12C or context data files 16B of potential significance to the author, performers, characters or audience members in at least one subsequent narrative node 12A.

In a presently preferred embodiment of the present invention information identifying the links 14B between nodes 12A, narrative data files 12C and/or context data files 16B or repositories of narrative data files 12C and/or context data files 16B at various levels in the narrative structure 14A resides in one of more link databases 240, an exemplary embodiment of which is illustrated in FIG. 11. As represented therein and as in the case of the database structures described above, each link databases 240 includes one or more link entries 240E, each of which pertains to a corresponding link 14B and includes one or more criteria 232, each of which in turn includes descriptor fields, such as descriptor fields 234 and 236 that containing information identifying, pertaining to and defining a corresponding link 14B of the narrative structure 14A, the nodes 12A, narrative data files 12C and/or context data files 16B and/or repositories of narrative data files 12C and/or context data files 16B related by the corresponding links and the levels at which the corresponding links reside in the narrative structure 14A.

For example, one criterion 232 and the associated descriptor fields 234/236 may contain a unique identifier 238 for the work 10. Other descriptor fields 234 will typically correspond to each narrative node 12A of the narrative structure 14A and may contain, for example, a unique identifier for the associated narrative node 12A.

Certain one of criteria 232 and the associated descriptor fields 234 and 236 may contain a unique identifier of the corresponding link 14B, an identification of the nodes 12A, narrative data files 12C and/or context data files 16B and/or repositories of narrative data files 12C and/or context data files 16B related by the corresponding links 14B, the types of elements related through the link 14B and the level at which the corresponding link 14B resides in the narrative structure 14A. Other criteria 232 and associated descriptor fields 234/236 may contain an identification of the a storage location of the link, and identifications of at least one group and/or subgroup of links to which the link may belong information identifying the location of the corresponding narrative node 12A in the narrative structure 14A itself.

Still further criteria 232 and associated descriptor fields 234 and 236 may contain information identifying, for example, the type of elements related through the link 14B, the relationship between the elements related through the link 14B, and the significance of the relationship represented by the link 14B. Still other criteria 232 and associated descriptor fields 234 may contain, for example, information pertaining to the characteristics of the elements related by the corresponding link, such as preferred characteristics of resolution, appearance, media type, date of acquisition, and ownership of the linked elements.

E. Creation and Use of Database Structures (FIGS. 12A-12E and 13)

It will be apparent from the above descriptions of the elements of the present invention that the relationships between persons or entities associated with a work 10, such as an author, performer, audience member or real, fictional or anthropomorphic character in the work 10, and the narrative content of the work 10 is of very great significance with regard to identifying and selecting contextual content to be incorporated into the work 10. The relationships between narrative content 12B and a person associated with the work 10 containing that narrative content 12B, and the construction of such a relationship, is illustrated in FIG. 12A.

Figure 12A:
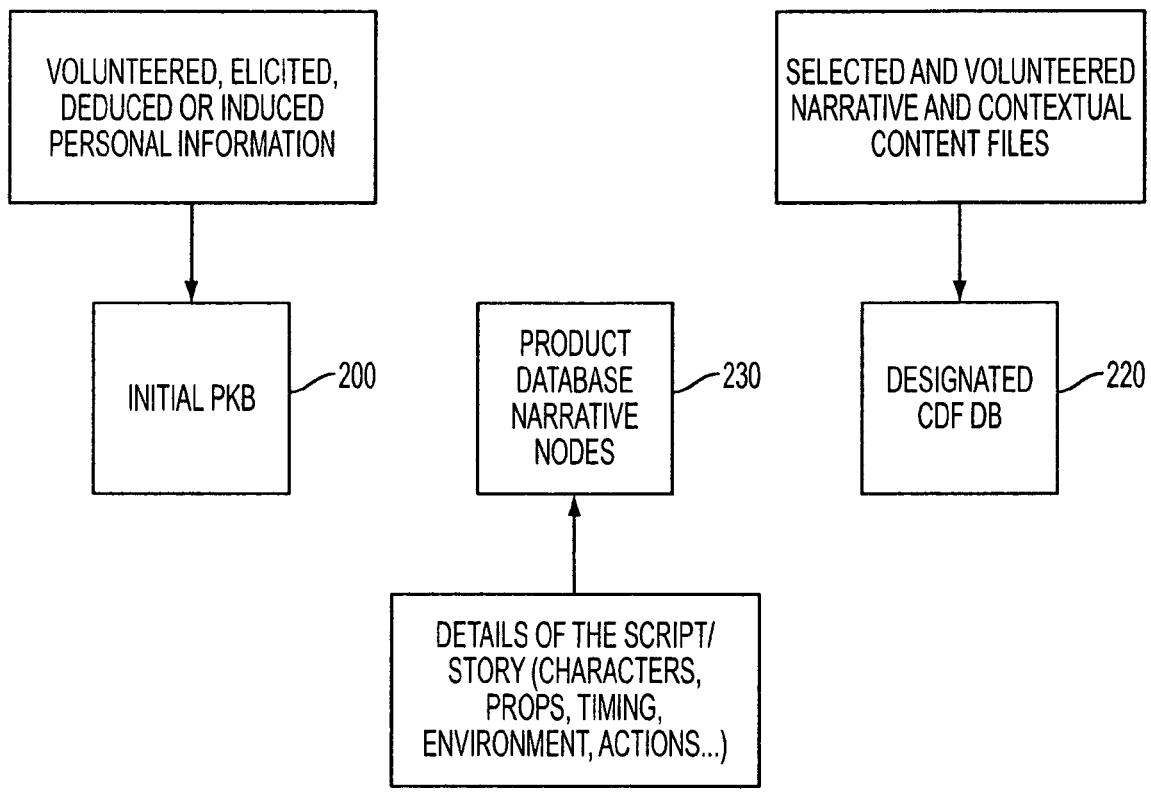
FIG. 12A shows the relationship between the narrative data files, the narrative and an associated person.

As represented in FIG. 12A, the generation of a relationship between a narrative data file 12C and a person associated with a work 10 is initiated with a starting personal knowledge database 200, a starting narrative structure database 230 and a starting designated narrative data file database 220.

As has been discussed herein above, the personal information contained in or referred to by the starting personal knowledge database 200 is directed to information about the person that would allow the discovery, identification, deduction or inference of the general and specific types of narrative content 12B or contextual content 16A that would be of significance to that person. For example, the starting personal knowledge database may contain or refer to the personal history, interests, experiences and characteristics of the person and may include, for example psychological profiles, hobbies, past purchasing behavior, vocations, avocations, social, financial, cultural and familial relationships, and so on. The narrative content 12B contained in or referred to by the starting designated narrative data file database 220, in turn, pertains to the essentially and fundamental explicit, implicit and deducible aspects and elements of the narrative embodied in the work 10. That is, the narrative content 12B pertains to the basic components of plotting/sequencing, description, characterization, environment and action, which are often expressed as the classic elements of who, what, where, when and how.

Figure 12B:
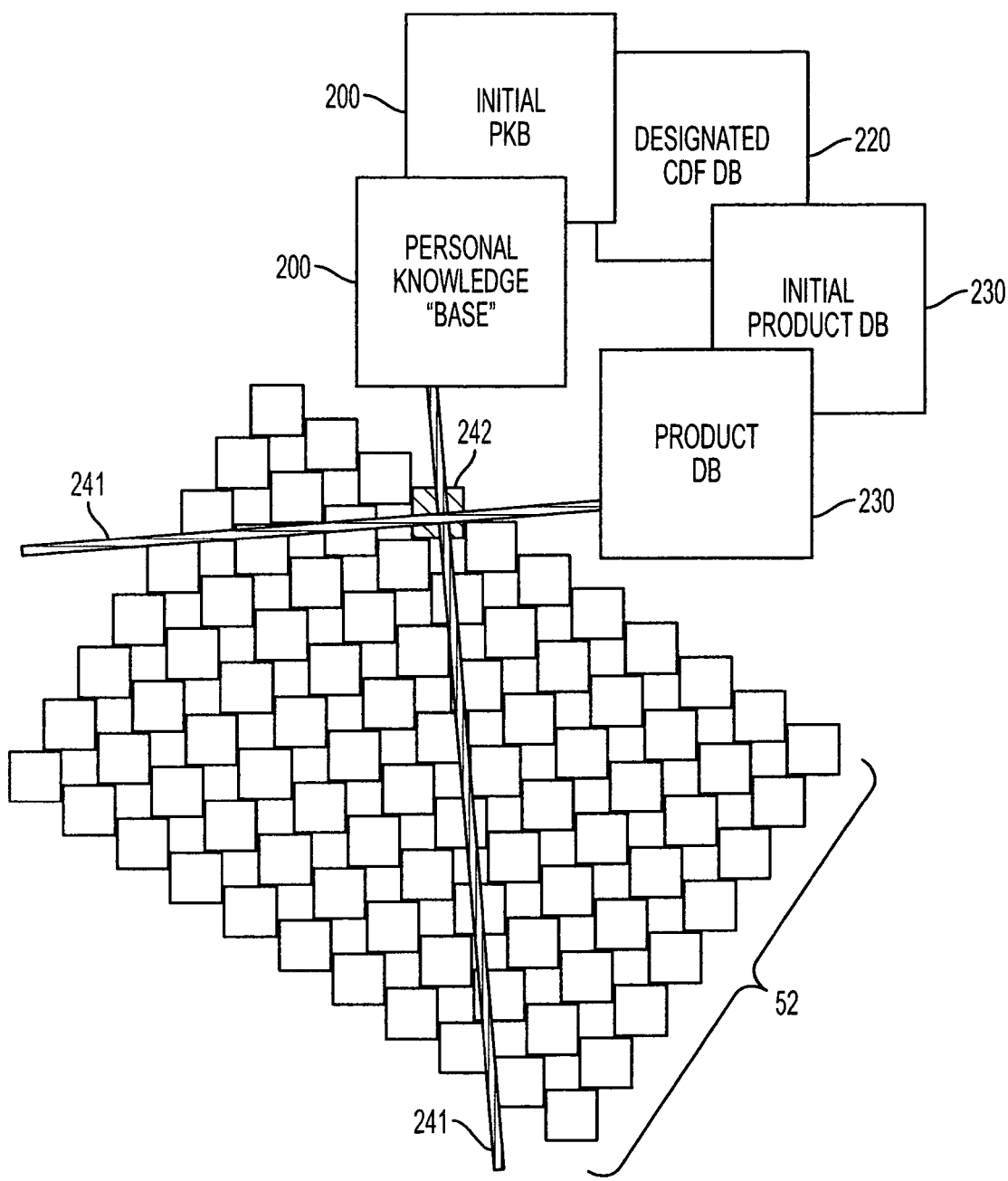
FIG. 12B suggests how these basic components can be thought to interact.

The interaction of the starting personal knowledge database 200, starting narrative structure database 230 and starting designated narrative data file database 220 to identify potential and actual relationships between information pertaining to persons associated with a work 10 and the narrative content of the work 10 is illustrated in FIG. 12B. As indicated therein and according to the method and system of the present invention, one or more combined queries 241 are generated by a combination of information from the starting personal knowledge database 200, starting narrative structure database 230 and starting designated narrative data file database 220 to identify possible combinations and correlations among the information in the databases.

As illustrated in FIG. 12B for the instance of a single combined query 241, all sources of narrative content 12B or contextual content 16A accessible to the system 20, including narrative data file databases 210, designated narrative data file databases 220 and narrative structure databases 230, are queried or search using each of the resulting combined queries 241. All results of the searches, that is, the identifications of the materials 242 identified by the searches, are returned for consideration of the material for possible inclusion in the work 10 as comprising material that is pertinent and appropriate to the work 10.

Figure 12C:
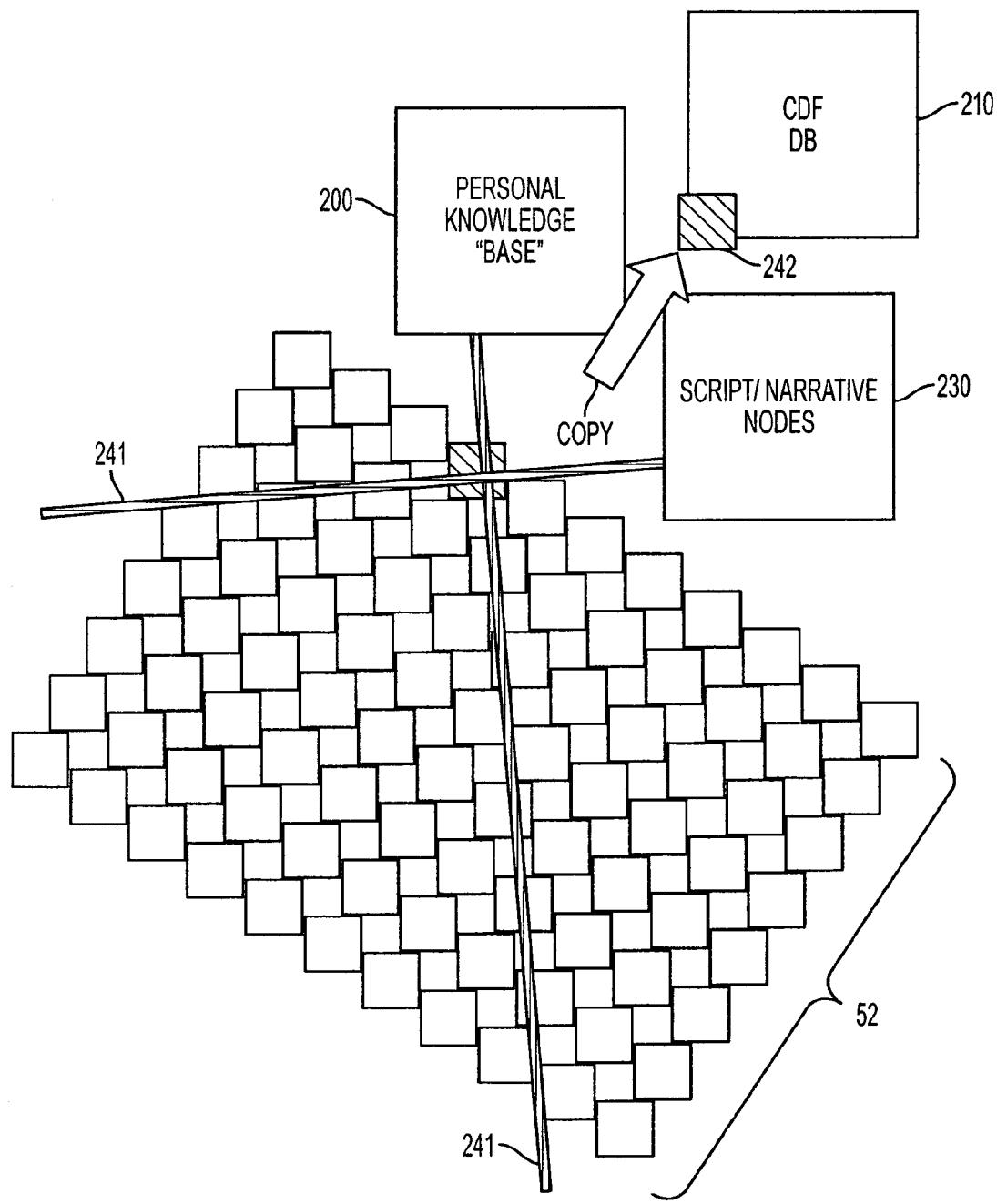
FIG. 12C suggests how the result of the interaction can be used.

As shown in FIG. 12C, copies of the materials 242 identified by the combined queries 241 are accessed and retrieved, as necessary, and links 14B for each item of narrative or contextual content 12C or 16A in the copies of materials 242 are placed in one or more of a holding database, a narrative data file database 210 or a linkage database 240. The identified materials 242 are subsequently considered for inclusion in the work 10 by, for example, an author, performer or agent or by the system itself according to predetermined criteria.

Figure 12D:
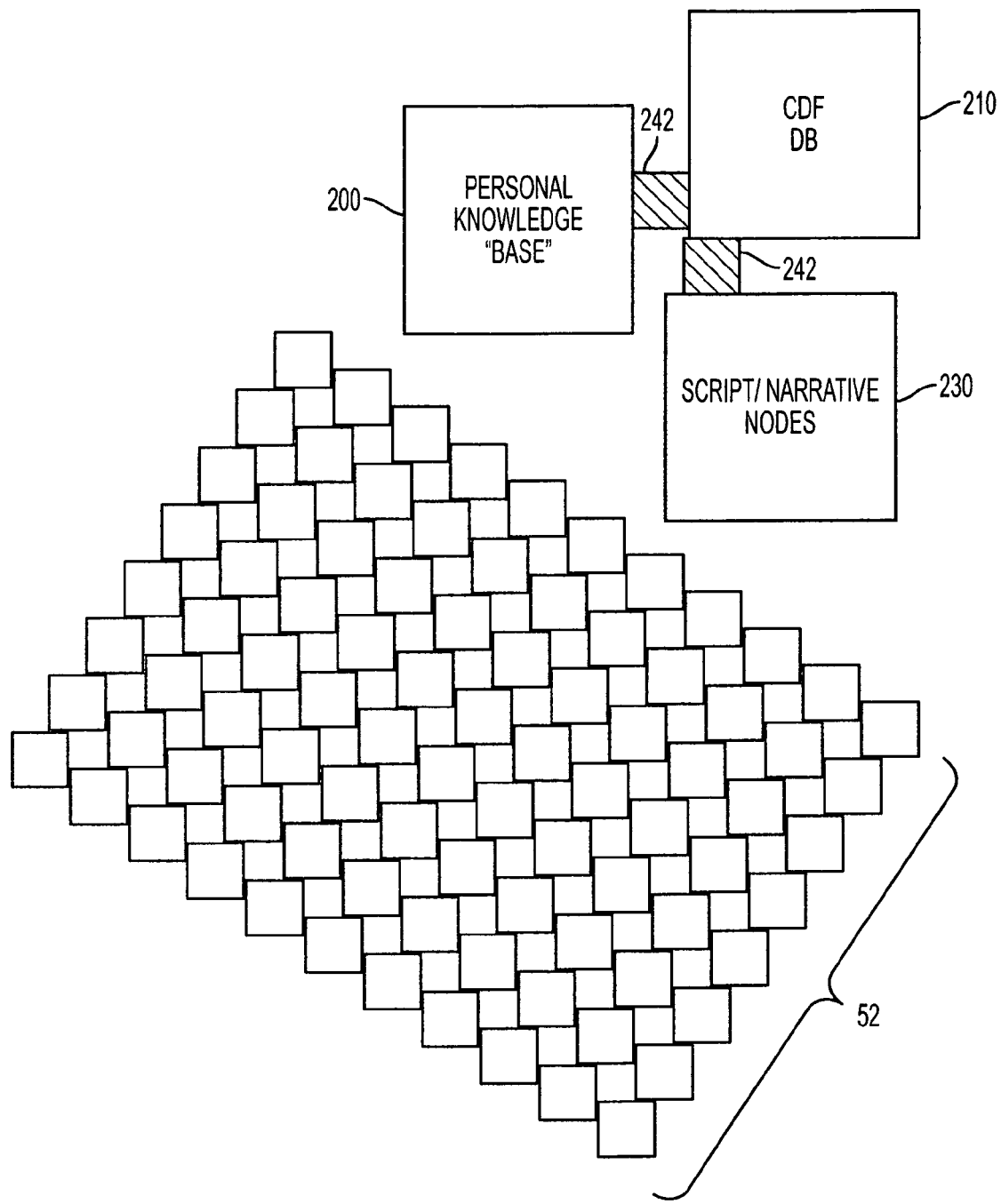
FIG. 12D suggests the final state of the system after interaction.

As indicated in FIG. 12D, the materials 242 accepted for inclusion in the work 10 as comprising appropriate and relevant narrative content 12B or contextual content 16A are entered into one or more of a personal knowledge database 200, a narrative structure database 230 and a narrative data file database 220 and now further define and refine the personal interests and narrative and contextual content 12B and 16A identified therein.

Figure 12E:
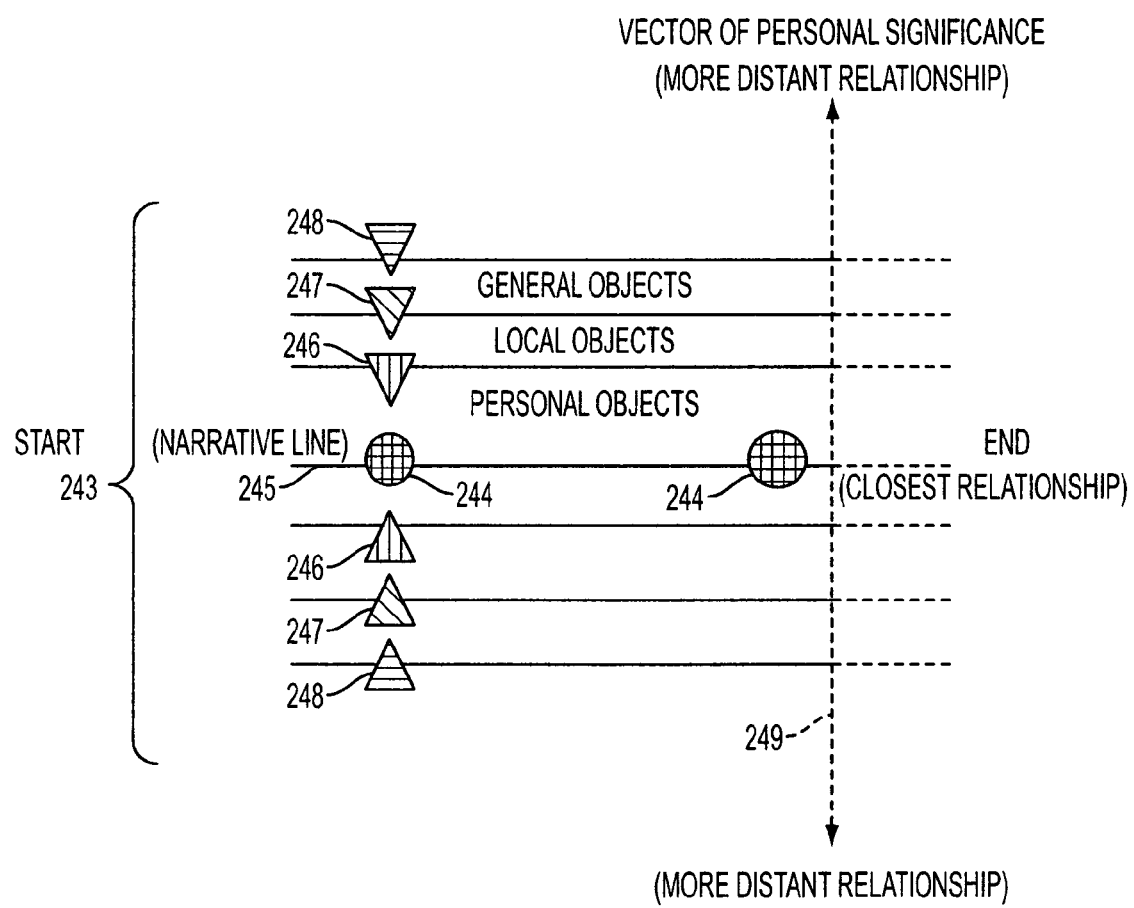
FIG. 12E illustrates the concept of virtual perspective.

F. Virtual Perspective (FIG. 12E)

As discussed previously, the significance of a particular item or body of content is a function of "perspective" wherein "perspective" may be defined as the significance of an item or body of content to a particular person or group or class of persons under specific circumstances of the narrative embodied in the work 10. Perspective may, for example, be a function of the spatiotemporal proximity or displacement or the person or group with respect to the content, that is, whether an event is remote or local in time or space, personal proximity or displacement, that is, the degree of their personal involvement with the content or the degree of personal impact of the content, or narrative perspective, that is, the point in a narrative from which the content is perceived.

In this regard, and as discussed previously, the significance of narrative and context data files 12C and 16B may be measured in "absolute" terms, that is, in terms of the overall general significance of the element to the work 10 in general. Absolute significance, however, as used in the prior art, is a very limiting concept and method for measuring significance because the significance of narrative and context data files 12C and 16B does not vary according to their relationship to other narrative and context data files 12C and 16B of the work 10 or the point in the narrative path 12P through the work 10 at which the narrative and context data files 12C and 16B are introduced. As such, the absolute significant of, for example, a narrative or context data files 12C or 16B, is not only fixed for a given work 10 but has a very limited range of values that typically demonstrates a very limited set of values or degrees of significance, such as, for example, "low", "moderate" or "high", and is thus of very limited functionality in assisting in the creation of a work 10.

According to the present invention, however, the significance of a given element of a work 10, that is, of a narrative or context data file 12C or 16B, is more usefully measured and defined in terms of the "relative" significance, that is, the perspective, of the element with respect to other elements of the work 10, such as a narrative node 12A, a narrative data file 12C, a context data file 16B or a person or persons associated with the work 10, such as an author, performer, audience member or real, fictional or anthropomorphic character of the work 10, or a point along the narrative path 12P through the work 10. As a consequence, and as illustrated in FIG. 12E, the relative significance or perspective of narrative and context data files 12C and 16B typically comprise a relative wide continuous spectrum or range of values or degrees having a significantly higher granularity or number of increments compared to absolute significance. As such, the relative significance and perspective of a narrative node 12A, a narrative data file 12C, a context data file 16B, a person or persons associated with the work 10, or a point along the narrative path 12P through the work 10 is a significantly more powerful and flexible tool or mechanism for constructing a work 10 than is absolute significance.

In the present invention the concept and mechanism of relative significance and perspective is embodied in the concepts and mechanism of "virtual perspective. FIG. 12E is a diagrammatic illustration of "virtual perspective" 243, which is an expression and embodiment of the relationship between narrative data files 12C and a narrative node 12A in the context of a narrative line 245 wherein a narrative line 245 is a narrative path 12P by which the nodes 12A of the narrative structure 14A are traversed to present the narrative and contextual content 12B and 16A or the work 10. FIG. 12E thereby illustrates perspective and the relative significance of narrative and contextual content 12B and 16A according to the methods of the present invention by which narrative and context data files 12C and 16B can be organized to represent the manner in which individuals or groups actually perceive a work 10.

According to the present invention, and to more readily identify the significance relationships among narrative and context data files 12C and 16B, common relational groupings of narrative and/or context data files 12C and 16B are identified and the narrative and/or context data files 12C and 16B are organized into relational groups, referred to in FIG. 12E and hereafter as "objects". As illustrated in FIG. 12E, such relational groups of narrative and/or context data files 12C and 16B may be organized, for example, as personal objects 246, local objects 247 or general objects 248, based upon their relative spatiotemporal, personal, or narrative perspective with respect to the persons or groups perceiving the narrative or contextual content 12B and 16A. The classification of a narrative and/or context data files 12C and 16B as within a personal object 246, local object 247 or general object 248 is a general representation of the general significance of the narrative or contextual content to the narrative node 12A. It must be recognized, however, that this relationship is general and may not reflect certain actual situations. For example, the groupings of objects 246, 247 and 248 may overlap or, in certain instances, an item of narrative or contextual content 12B or 16A that is classified into a general object 248 may have a higher level of significance to a narrative node 12A than does, for example, an item of narrative or contextual content 12B or 16A that is classified into a personal object 246.

It must be noted that similar significance relationships and personal, local or general groupings of relationships may be determined between persons associated with a work 10, such as an author, performer or audience member, and the narrative or contextual content 12B or 16A of narrative or context data files 12C or 16B data files, as discussed next below.

G. Directional Relationships and Significance (FIG. 14D)

Figure 14B:
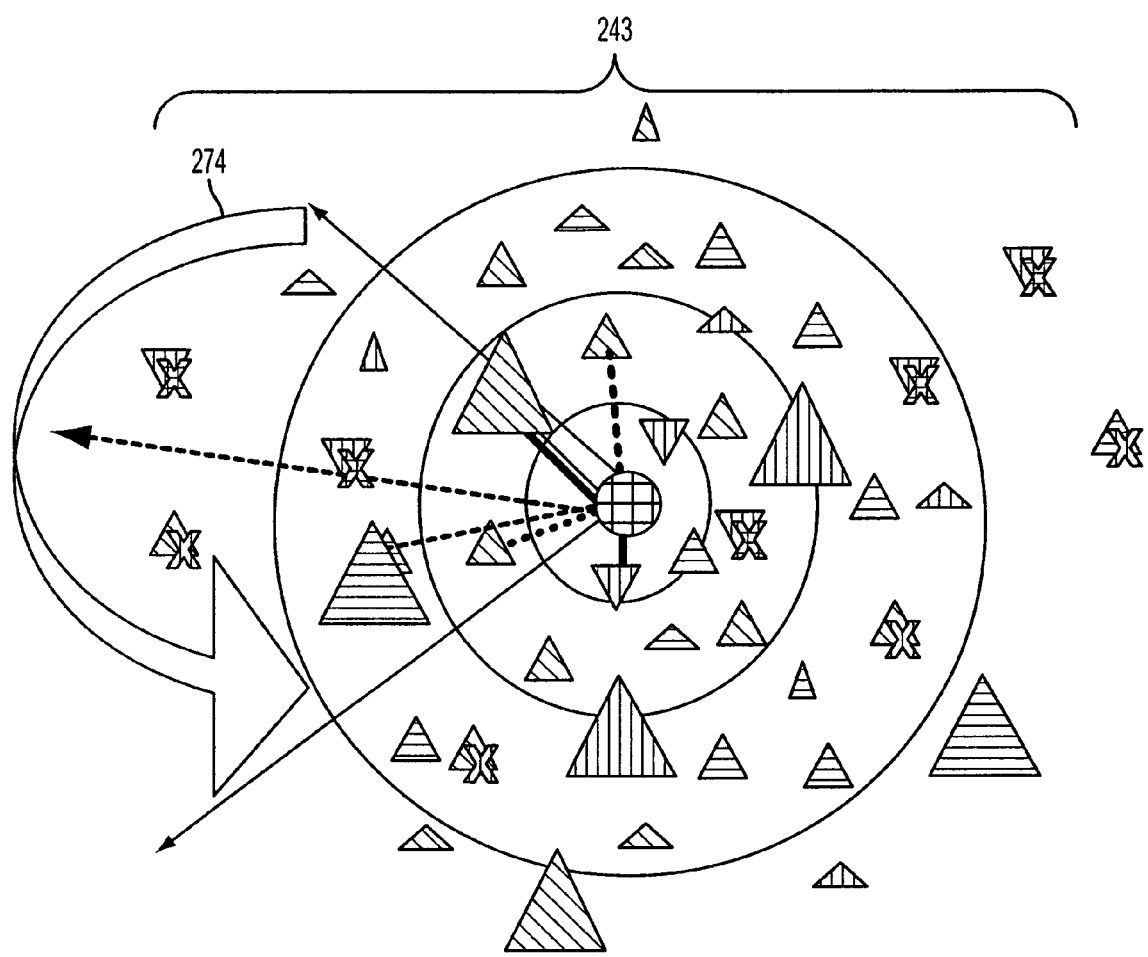
FIG. 14B shows a schematic figure illustrating different types of relationship between the narrative data files and nodes in the narrative.
Figure 14C:
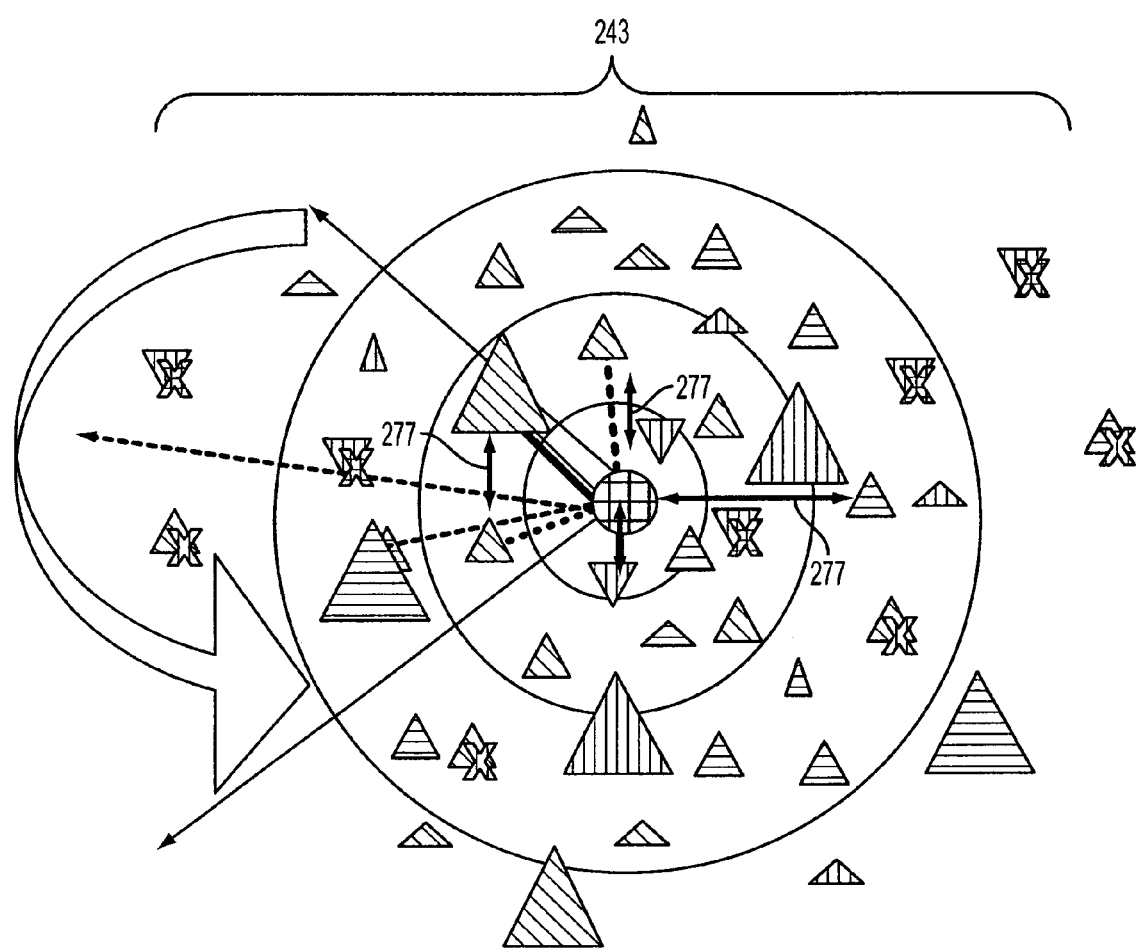
FIG. 14C shows a schematic figure illustrating the relationship between the narrative data files and nodes in the narrative and two-way relationships.
Figure 14D:
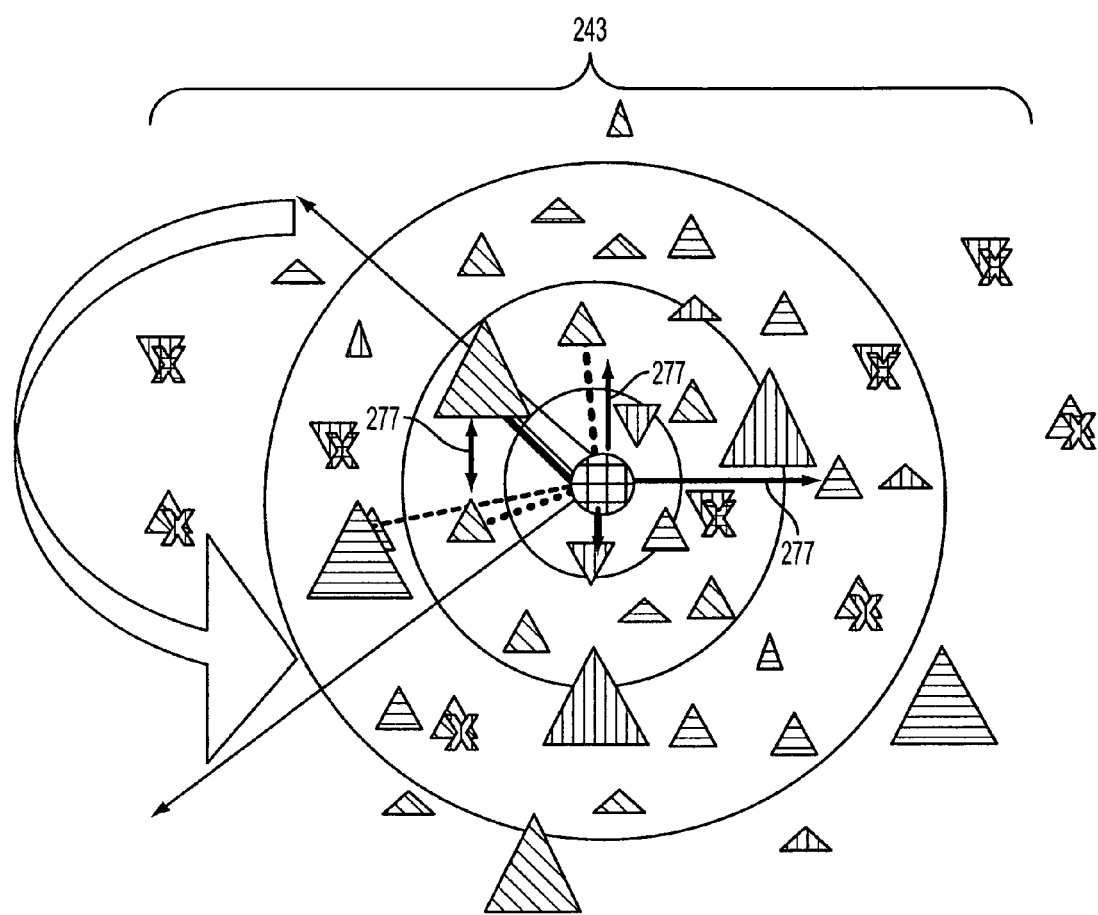
FIG. 14D shows a schematic figure illustrating the relationship between the narrative data files and nodes in the narrative where the node defines the narrative data files.

Referring next to FIG. 14D, therein is illustrated a further aspect of the relationships between elements of a work 10 as directional relationships, and a method for representing and displaying such directional relationships. The example shown in FIG. 14D pertains to a relationship a narrative node 12A and a narrative data file 12C of a narrative structure 14A in a three dimensional virtual perspective space 243. It will be readily understood by those familiar with the relevant arts, however, that the method for displaying relationships between elements of a work 10 apply equally to relationships, including significance relationships, between a narrative structure 14A, narrative nodes 12A, narrative and context data files 12C and 16B and their narrative and contextual contents 12B and 16A, and individuals or groups of individuals associated with the work 10, such as one or more authors, performers, audience members or real, fictional or anthropomorphic characters of the work 10.

The method of representing relationships between elements of a work 10 illustrate the fact that, according to the present invention, the characteristics of relationships between, for example, narrative nodes 12A, narrative and context data files 12C and 16B and their narrative and contextual contents 12B and 16A, and individuals or groups of individuals associated with the work 10 are not limited to, for example, type and their vector parameters. According to the present invention, the characteristics of the possible relationships between the elements of a work 10 may also include direction wherein, for purposes of the present invention, relationships direction represents influence or dependency between two elements of a work 10. For example, a narrative data file 12C may be significant to a narrative node 12A, such as by providing narrative content 12B that defines and comprises at least a part of the narrative node 12A. In this case the "direction" of the relationship between the narrative node 12A and narrative data file 12C would be from the narrative data file 12C to the narrative node 12A. That is, in this example the narrative data file 12C influences the narrative node 12A but the narrative node 12A may not influence the narrative data file 12C; that is, the narrative node 12A does not define any part of the narrative content 12B of the narrative data file 12C, which has an existence independent of the narrative node 12A. In the reverse instance, however, the narrative node 12A may, for example, define at least a part of the narrative content 12B of the narrative data file 12C and the direction of the relationship would be from the narrative node 12A to the narrative data file 12C. In a further example, the influence between the narrative node 12A and the narrative data file 12C may be bidirectional. That is, the narrative content 12B of the narrative data file 12C may define some aspect of the narrative node 12A and the narrative node 12A may define a part of the narrative content 12B of the narrative data file 12C.

In a preferred embodiment of the systems and methods of the present invention, therefore, the relationship between elements of a work 10 will includes direction as well as, for example, type and vectors parameters, such as the strength of the relationship. Accordingly, and as illustrated in FIG. 14C, the direction of a relationship may, in the present invention, be graphically as well as conceptually represented by arrowed lines, including both mono- and bi-directional lines as indicated by the locations and/or orientations of the arrows.

Figure 14E:
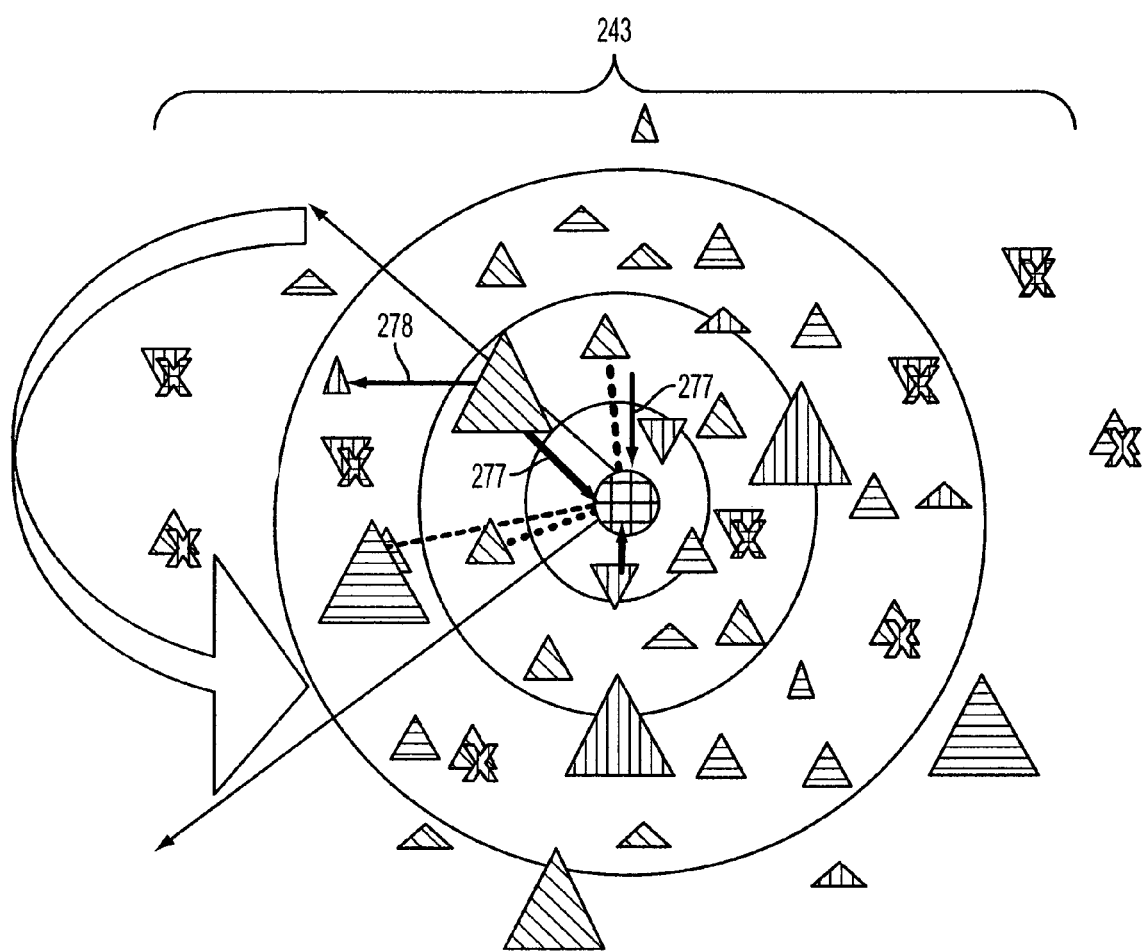
FIG. 14E shows a schematic figure illustrating the relationship between the narrative data files and nodes in the narrative with a node being defined by narrative data files.
Figure 14F:
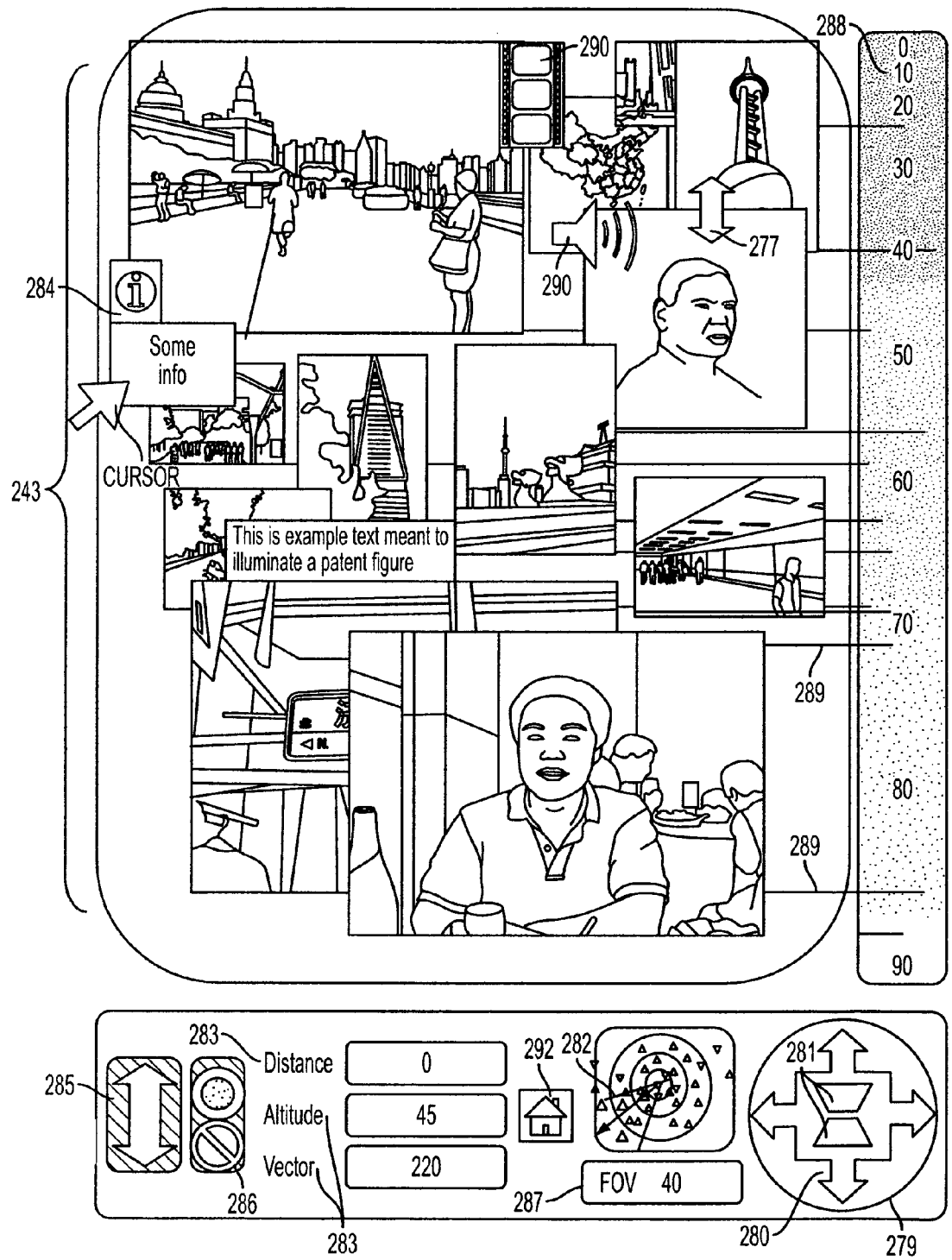
FIG. 14F illustrates how the virtual perspective may be displayed on a screen.
Figure 15A:
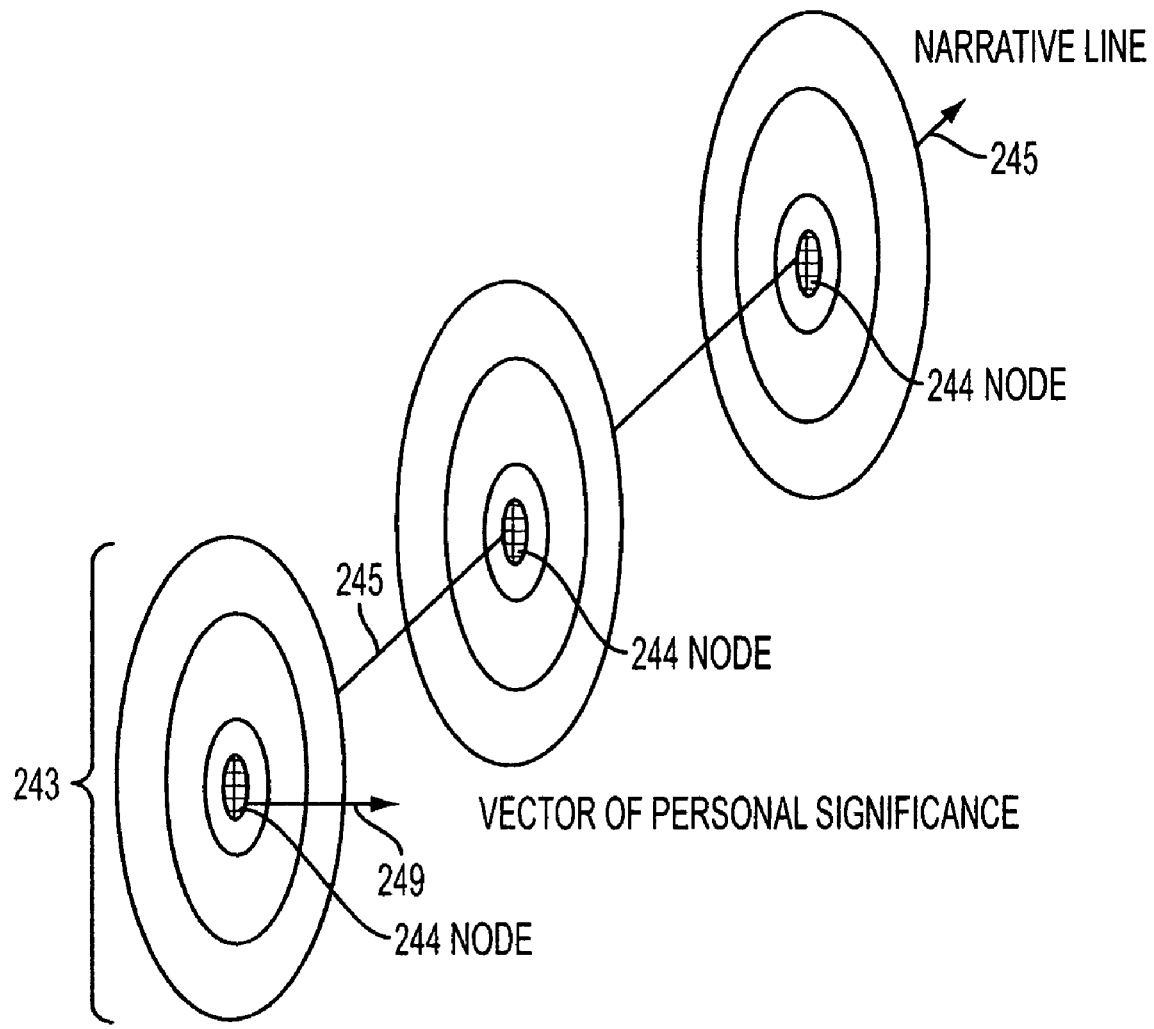
FIG. 15 shows a schematic figure that illustrates the concept of vectors of personal significance and a narrative line.

The directional properties of relationships and links between the elements of a work 10 and the methods by which such directional relationships may be graphically represented to a user are further illustrated in FIGS. 14E and 14F. For example, FIG. 14E illustrates the relationship between the narrative data files and nodes in the narrative where the arrow 277 extending from the narrative node 12A to the narrative data file 12C indicates that a narrative node 12A is in a defining role with regard to the narrative data file 12C. In this instance, for example, the narrative node 12A may provide a larger, defining context for the narrative content 12B of the narrative data file 12C while the narrative content 12B of the narrative data file 12C refine the context specified by the narrative node 12A. FIG. 14F, in turn, illustrates the reverse situation. In this instance, for example, the more significant content, such as an image of a person essential to the narrative, resides in the narrative data file 12C and the narrative node 12A provides a broader but less definitive context for the narrative content 12B in the narrative data file 12C, such as a map or picture of the general setting in which the image in the narrative data file 12C was taken. Again, it is necessary to note that two elements of a work 10, such as a narrative node 12A and a narrative data file 12C, may not be in a superior/inferior influence relationship with each other but may instead be equally significant with respect to each other, in which instance the representative link would be defined as bi-directional.

H. Identification of Significance Relationships and Related Narrative and Contextual Content (FIG. 13)

The above has described significance relationships among, for example, narrative nodes 12A, narrative data files 12C, context data files 16B, persons associated with the work 10, and a narrative path 12P through the work 10.

The following will next describe the use of a static or dynamic relationships between narrative data files 12C, context data files 16B and one or more persons associated with the work 10 to identify significance relationships among persons associated with a work 10, and the narrative nodes 12A of the work 10, a method for the generation of inference queries to identify further potential content of a work 10, and the provision of alternate narrative paths 12P through a narrative structure 14A.

Figure 13:
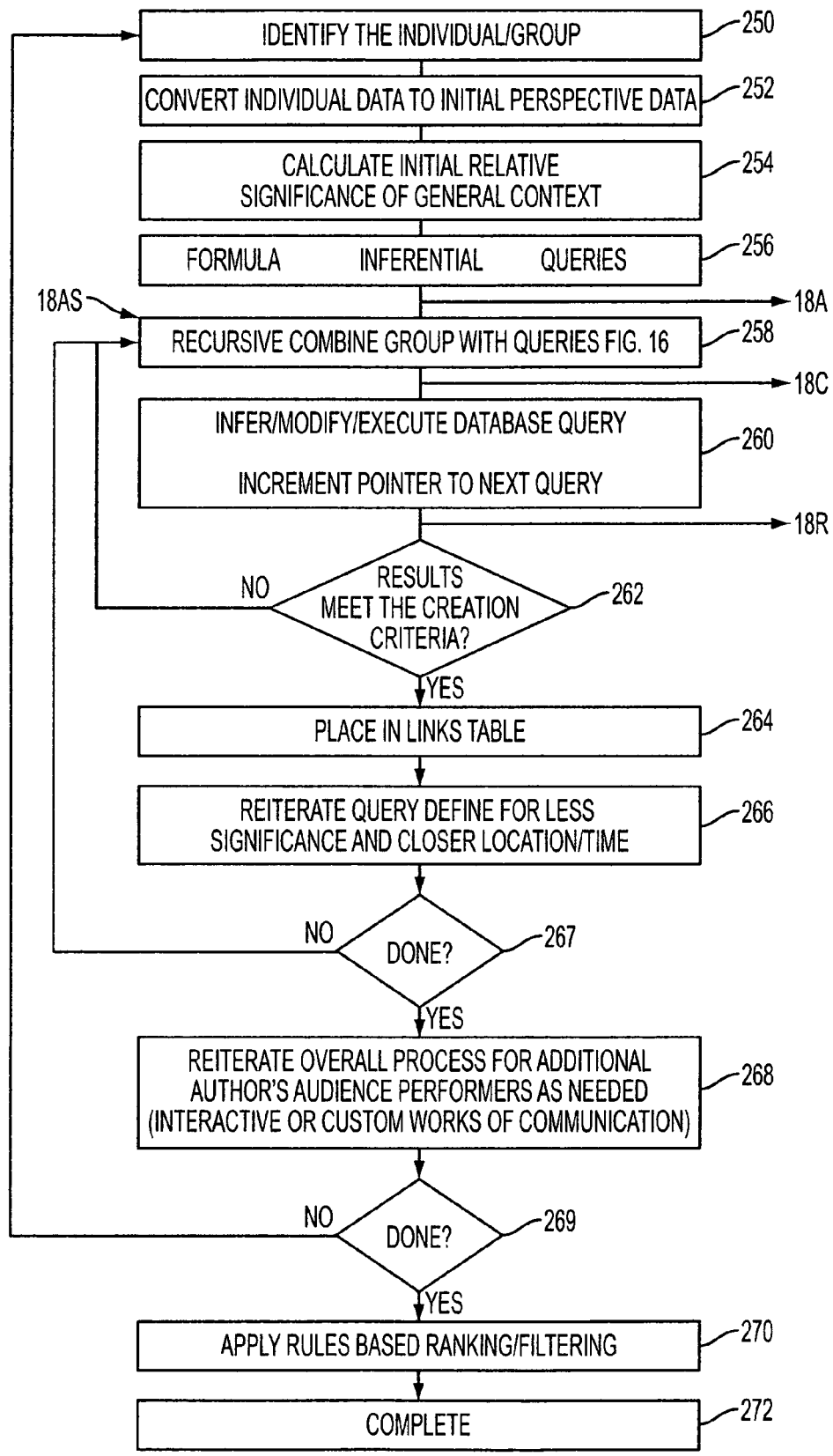
FIG. 13 shows a flowchart illustrating the association of the relationships between narrative data files and an associated person.

(i) Identification of Significance Relationships (FIG. 13)

FIG. 13 illustrates the use of a static or dynamic relationships between narrative data files 12C, context data files 16B and one or more persons associated with the work 10 to identify significance relationships among persons associated with a work 10, the narrative nodes 12A and narrative and contextual content files 12C and 16B of the work 10.

Referring therefore to the steps of the process as shown in FIG. 13:

(Step 250):

An associated person is identified and a knowledge database 200 is acquired or generated for the identified associated person wherein an associated person may be, for example, one or more authors, performers or audience members or real, fictional or anthropomorphic characters of the work 10.

(Step 252):

Data from the knowledge database 200 is converted to perspective coordinates 252C in a multidimensional perspective coordinate space including, for example but not limited to, spatiotemporal, personal and narrative relationship parameters. The perspective coordinates 252C of that person define and comprise a perspective reference point 252P defining the location of that person in the perspective coordinate space.

(Step 254):

Similar perspective coordinates are then determined for one or more narrative or context data files 12C or 16B and the perspective space distance between a narrative or context data file 12C or 16B and the perspective reference point 252P is determined for each narrative or context data files 12C or 16B. The narrative or context data files 12C or 16B are then classified and grouped as personal 246, local 247 or general 248 objects, thereby determining the significance of each narrative or context data files 12C or 16B with respect to the associated person.

(Step 256):

One or more inference queries 18A relating at least one context indicator 12E of a narrative data bile 12C with an associated person are then generated using inductive and deductive logic and within the perspective coordinates 252C of virtual perspective 243, as described generally herein above.

In a presently preferred embodiment of the method of the present invention, the inference query process is executed in two parts wherein the first part, performed in step 256, is the generation of one or more inference queries 18A that search for general narrative and contextual content items having the broadest and highest relative significance to the associated person or groups of associated persons.

(Step 258):

The second step of the inference query process is the generation of one or more combined inference queries 18AC wherein each second stage inference query 18AC is the combination of an inference query 18A from step 256 with a supplemental inference query 18AS. Each supplemental inference query 18AS is again generated using inductive and deductive logic within the perspective coordinates 252C of virtual perspective 243, as described above, but pertains to the relative significance of the narrative or context data files 12C or 16B with respect to narrative nodes 12A In particular, inference queries 18A are combined reiteratively and recursively with supplemental inference queries 18AS to create combined inference queries 18AC.

(Step 260):

The combined inference query or queries 18AC are then executed to locate narrative or context data files 12C or 16B meeting the criteria stated in each combined inference query 18AC.

(Step 262):

The query results 18R returned from each combined inference query 18AC executed in step 260 are tested against one or more work criteria 134C, such as a boundary for the minimum level of relative significance, types media containing contextual content 16A and other constraints.

It must be noted that the query results 18R returned from the combined inference queries 18AC of step 258 represent overlaps, correlations or concurrences between one or more persons associated a work 10, such as an author, performer, audience member or real, fictional or anthropomorphic character of the work 10, and a narrative node 12A of the work 10 according to the query criteria defined in the combined inference queries 18AC. The inference query results 18R resulting from the combined inference queries 18AC accordingly identify narrative or context data files 12C or 16B containing narrative or contextual content 12B or 16A that is of significance to both the person or persons associated with the work 10 and the narrative node 12A of the work 10. For example a combined inference query 18AC may combine an inference query 18A directed to the books read by a given individual with a supplemental inference query 18AS specifying a time period closely surrounding a time represented in the narrative node 12A. The resulting query results 18R identifying the books read by the person during that interval may then be used in subsequent reiterations of the queries to suggest and identify locations and characters in the books that may be associated with the events in the narrative.

(Step 263)

If none of the returned query results 18R meet the test criteria, the process returns to step 258 to generate and execute further combined inference queries 18AC.

(Step 264):

When a returned query result 18R meets the test criteria, a corresponding link 14B is entered into a link database 240 wherein the link 14B may comprise, for example, an identification or location of the corresponding accepted narrative data file 12C or contextual data file 16B.

(Step 266):

The process is reiterated for combined inference queries 18AC that are progressively formulated to specify narrative or context data files 12C or 16B having less significance with respect to the associated person or persons and narrative or context data files 12C or 16B having fewer degrees of separation from the associated person or persons, such as narrative or context data files 12C or 16B classified as local or personal objects 247 or 246 instead of general objects 248.

(Step 267):

The process monitors the returning query results 18R to determine whether the reiterative generation of combined inference queries 18AC should continue for the associated individual or individuals for further degrees significance with respect to the associated individual or individuals and narrative or context data files 12C or 16B or fewer degrees of separation from the associated individual or individuals.

(Step 268):

If the reiterative inference query process is completed with respect to the individual or individuals, that is, it is determined in step 267 that further reiterations are not required, the process determines whether the above described process should be continued for further associated individuals or groups of individuals.

(Step 269):

The process determines whether the process is completed for all potential associated individuals or groups of individuals or should be continued for further individuals or groups of individuals. Step 268 identifies when the process is complete for an individual or group and the nodes of the narrative line, requiring storage of the narrative or context data files 12C or 16B and links to the narrative or context data files 12C or 16B in a manner useful to the work structure databases.

(Step 270):

The process then ranks the identified narrative or context data files 12C or 16B for relative significance with respect to the associated person or persons and the narrative node 12A under consideration, as described previously herein, and selects the narrative or contest data files 12C or 16B to be associated with the narrative node 12A accordingly.

(Step 272):

The process is complete.

It must be noted with regard to the above described process for linking narrative and context data files 12C and 16B, persons associated with the work 10 and narrative nodes 12A of the work 10 that certain data fields of the above described knowledge entries 200E, narrative data entries 210E and work structure entries 230E contain information pertaining to the general significance of the corresponding elements of the work 10. This information in turn allows at least a first level of association to be generated for those personal, narrative or work structure elements of sufficiently high significance and sufficiently universal or general relationship with one or more of at least one author, performer, audience member of real, fictional or anthropomorphic character of the work 10.

In this regard, it must also be reiterated that, as discussed above, the significance of narrative or contextual content 12B or 16A is a function of several factors, such as the proximity of the narrative of contextual content to the person or persons in question, the number of persons effected, the degree or severity of the effect of the content on those persons, the duration of the impact and the degree and significance of the resulting effects on the work 10.

It must also be noted the reiterative capability of the above described process allows the number and breath and depth of potentially significant personal, narrative and contextual content and narrative node relationships and links to be greatly expanded from what may often be a very small starting base of potential relationships. That is, and in particular, each reiteration of inference queries 18A may provide further narrative or contextual content 12B or 16A that not only adds to the number of possible significance relationships but may, in turn, suggest further possible areas or subjects for subsequent inference queries 18A.

Having used static and dynamic relationships between narrative data files 12C, context data files 16B and one or more persons associated with the work 10 to identify significance relationships among persons associated with a work 10, the narrative nodes 12A of the work 10, the following will next describe a method for generating inference queries, as discussed previously, to identify further potential narrative or contextual content or persons that may be associated with a work 10.

Figure 16:
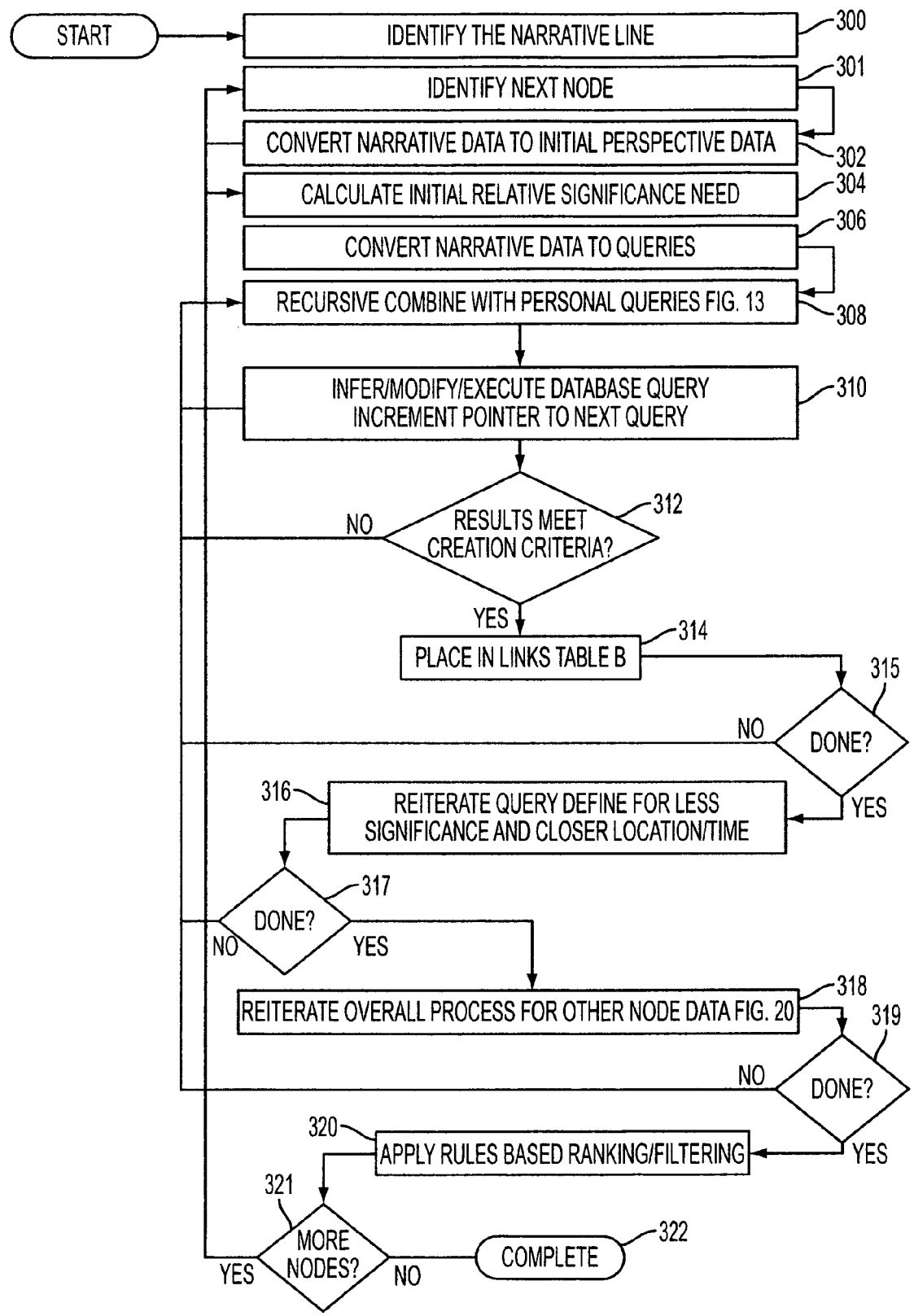
FIG. 16 shows a flowchart illustrating the relationship between narrative data files and node of the narrative.

(ii) Generation of Inference Queries to Identify Additional Narrative and Contextual Content (FIG. 16)

FIG. 16 shows a flowchart illustrating a method for examining the relationship between the narrative data files and "nodes" of the narrative to create additional inferential queries. As previously explained, one or more nodes are defined for a narrative by author 72 or based upon automatic analysis of the content supplied in the narrative data file to sufficient detail to allow calculation of using the relative perspective formula previously described.

In a first step of the method a narrative line 245 (sequential arrangement of narrative nodes 12C comprising a backbone for a potential work) and supporting narrative data files are identified (step 300) and a work data base 210 is obtained for the narrative line 245.

Data from the work structure database 210 is converted to guidelines (time, location) useful for providing an absolute point of reference from which to measure the degrees of separation of the designated narrative data files (step 302). Step 304 then builds upon step 252 and the formula for degrees of separation and the absolute significance of designated narrative data files as criteria for classification of narrative data files such as personal, local and general classifications (step 304) by calculating the relative significance to the node.

An inference query (step 306) is then created using inductive and deductive logic and the principle of virtual perspective 243 as described generally above. Initially the step begins with searches for general items of broadest and highest relative significance.

In step 308, the similar queries produced by similar calculations for calculating the relative significance of the supporting context data files 16B to the individuals associated with the story (FIG. 13) are combined reiteratively and recursively to create inferential queries.

The additional inference queries generated in 308 are then used to return results (step 310) that are of contextual significance to both the author and node of the story.

Results from step 310 are then tested against the work creation criteria (such as setting a boundary for the minimum level of relative significance, types of narrative data files to be searched and other constraints) (step 312). If the test is failed then the system can go back to step 308 and reformulate the query to produce more satisfactory results. If the test is passed then the results, that is, the returned location of an acceptable context data file 16B, are entered into the link database (step 314) for the potential work. Steps 308-314 are then repeated as necessary (step 315).

The process is reiterated (step 316) for inference queries that are formulated for nodes useful for providing alternative narrative lines 245 as narrative paths 12P that may be available in interactive and customized versions of this disclosure and repeated.

When all required reiterations are complete (step 319) the overall results are filtered a final time on the basis of rules governing the ranking of the results returned from the multiple iterations of the inferential queries (step 320). For example, the rules may favor retention of the context data files of highest relative value across all the nodes or for a limited selection of nodes in a particular range. If more nodes are present (step 3210 the process can then return to step 308.

If there are no more nodes, the process is complete (step 322).

Figure 17:
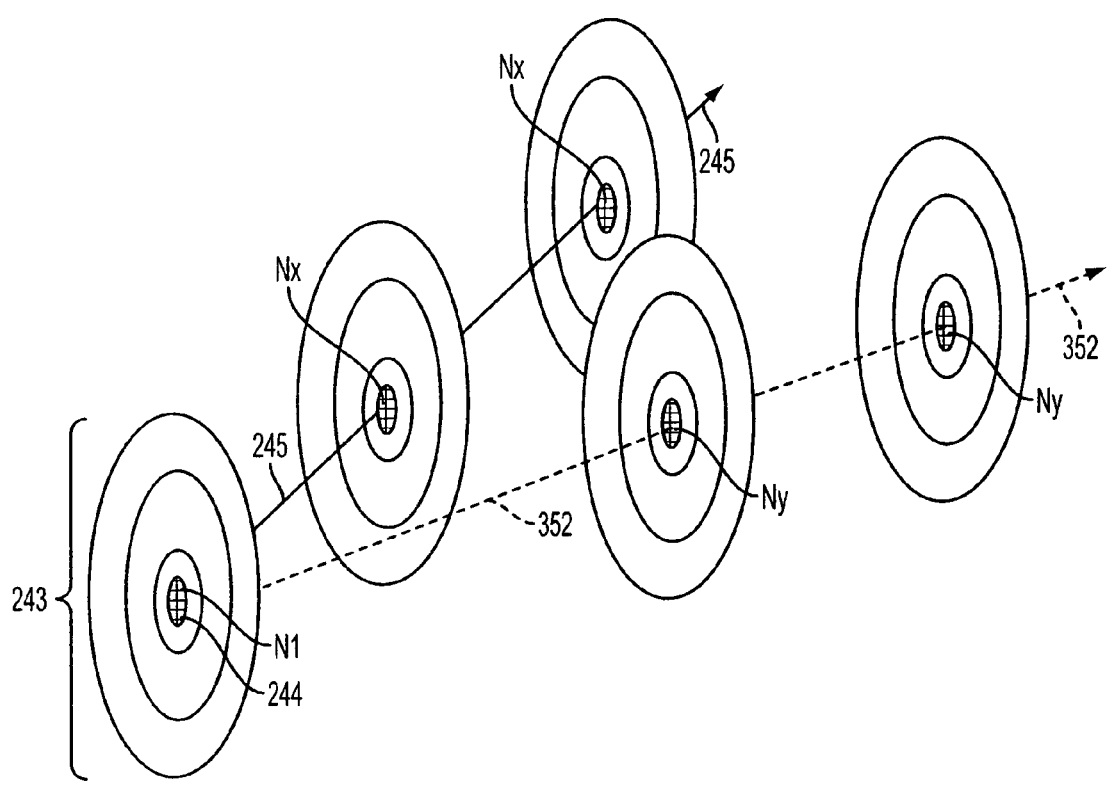
FIG. 17 shows alternate narrative paths through a narrative structure illustrating that the author of the work of communication may, for example, choose to offer the option of making choices when interacting with the work of communication.

(iii) Alternative Narrative Paths (FIG. 17)

Next considering the provision of alternate narrative path 12P through a narrative structure 14A, FIG. 17 illustrates that the author of the work of communication may, for example, choose to offer the option of making choices when interacting with the work of communication. In addition to a first narrative line 245, having nodes $N_x$, an additional narrative line 352 is provided having additional nodes $N_y$ that allow a choice of an alternative narrative line 352 at the time of the presentation or performance. For example, a node in a narrative may allow a choice to proceed with one or more alternative narrative lines 352 and the narrative line 245 may be redirected to any alternative node as allowed by the work of communication. The alternative choices may, for example, be unconditional, that is, entirely at the discretion of the user or audience member, or conditional, that is, certain choices may be available only upon the presence of certain conditions.

I. Narrative Structure and Significance Relationships in a Virtual Perspective Space (FIGS. 14A, 14B and 14C)

It has been described extensively herein above that the method and system of the present invention incorporate the principles of significance relationships and perspective, in particular virtual perspective, in the organization and structure of the elements of a work 10, including the narrative structure 14A, the narrative nodes 12A, the narrative data files 12C, the context data files 16B and their narrative and contextual contents 12B and 16A, and the persons associated with the work 10. It will be understood and appreciated that the use of the system and method of the present invention to create a work 10 in the general manner described briefly herein above further requires the display of those relationships and perspectives in a manner useful to the user or author of the work 10. The following will next describe certain methods for representing and displaying those relationships and perspectives to a user or author, and will further illustrate and describe the principles of significance relationships and virtual perspective as implemented in the system and method of the present invention.

(i) Significance Relationships in a Multi-Dimensional Virtual Perspective Space (FIG. 14A)

First referring to FIG. 14A, therein is illustrated a representation of the relationships between narrative nodes 12A and narrative data files 12C in a virtual perspective space 243 implemented, in a presently preferred embodiment, as a multi-dimensional polar coordinate space wherein the coordinate origin of perspective space 243 is comprised of an origin point narrative node 12AO under consideration. As will become apparent from the following discussions, the virtual perspective space 243 shown in FIG. 14A not only illustrates the method of structuring significance relationships in polar space according to a presently preferred embodiment of the present invention, but also comprises an advantageous display of such relationships and is so employed in systems embodying the present invention, as will be described further in following descriptions. It will also be recognized from the following discussions that a virtual perspective space 243, which is implemented as a two dimensional coordinate space in the exemplary space illustrated in FIGS. 14A and 14B may be implemented for effectively any number of dimensions, depending upon the number and relationship of significance factors employed in a given implementation of the present method and system. In a like manner, a virtual perspective space 243 may be implemented in yet other coordinate systems, such as a rectangular or spherical coordinate system.

According to the present invention, the degree or measure of relative significance between the origin narrative node 12AO and, for example, a person, a context data file 16 or contextual content 16A or another narrative node 12A, is represented by the radial distance between the origin point narrative node 12A and the a person, context data file 16 or contextual content 16A in question. As shown, the coordinate origin point formed by origin narrative node 12AO is surrounded by radially spaced rings 273 which represent increments of relative significance with respect to the origin narrative node 12AO with increasing radial distance from the origin narrative node 12AO representing proportionally decreasing significance with respect to the narrative node 12A. As has been discussed herein above with regard to a present embodiment of the invention, groups of narrative and/or context data files 12C and 16B may be classified, for example, as personal objects 246, local objects 247 or general objects 248 with personal objects 246 being of the group of highest significance and general objects 248 being of the group of lowest significance. The illustration of virtual perspective space 243 in FIG. 14A is accordingly provided with three rings 273 defining three radial regions in which personal objects 246, local objects 247 or general objects 248 respectively reside.

The degree or measure of relative significance between origin narrative node 12AO and narrative data files 12C and context data files 16B and their contents may accordingly be represented in virtual perspective space 243 by the radial locations of the narrative and context data files 12C and 16B, that is, in the personal object 246, local object 247 or general object 248 regions delineated by rings 273. Relationships between or groupings of narrative and context data files 12C and 16B such as similarities of content or other characteristics and either inherent in the data files or imposed by other criteria or selection processes, may be represented in virtual perspective space 243 by circumferential placement or groupings of the narrative and context data files 12C and 16B. Lastly, the type of object represented, that is and for example, a person, a narrative data file 12C or a context data file 16B, may be represented in virtual perspective space 243 for purposes of visual display by, for example, shape or color coding of the icons or symbols representing the objects.

(ii) Significance Relationships in a Three Dimensional Polar Coordinate Virtual Perspective Space (FIG. 14A)

Relative significance relationships between the origin narrative node 12AO and individuals or group of individuals or narrative nodes 12A or narrative data files 12C and significance and other relationships among the individuals or group of individuals or narrative nodes 12A or narrative data files 12C may be represented in the polar coordinate perspective space by significance vectors 249. As may be seen from FIG. 14A, the radial length of a significance vector 249 will clearly indicate the relative significance between the corresponding object and both the original narrative node 12AO and any other objects represented in the virtual perspective space 243. In a like manner, the circumferential location of the significance vector 249 may further indicate, for example, possible relationships of grouping with others of the objects represented in virtual perspective space 243. The angular distance between two significance vectors 249 may reflect a degree of relationship between the objects corresponding to the significance vectors 249, and a range of relationships between such objects may be described or selected by specifying an angular range of inclusion or exclusion.

The absolute significance of an object, such as a person, narrative or context data file 12C or 16B or narrative node 12A, as opposed to the relative significance of the object with respect to the origin point narrative node 12A or other objects represented in the perspective space 243, is a function solely of the object itself. As such, the absolute significance of an object may be encoded into or represented by, for example, a corresponding appropriate characteristic of the icon or symbol representing the object.

It must also be noted with respect to the creation and representation of personal significance relationships between the origin narrative node 12AO and one or more persons represented by a significance vector 249 in the following discussions, that personal significance vectors 249 are, according to the present invention, constructed from the personal information in knowledge entries 200E of a knowledge database 200.

Figure 18:
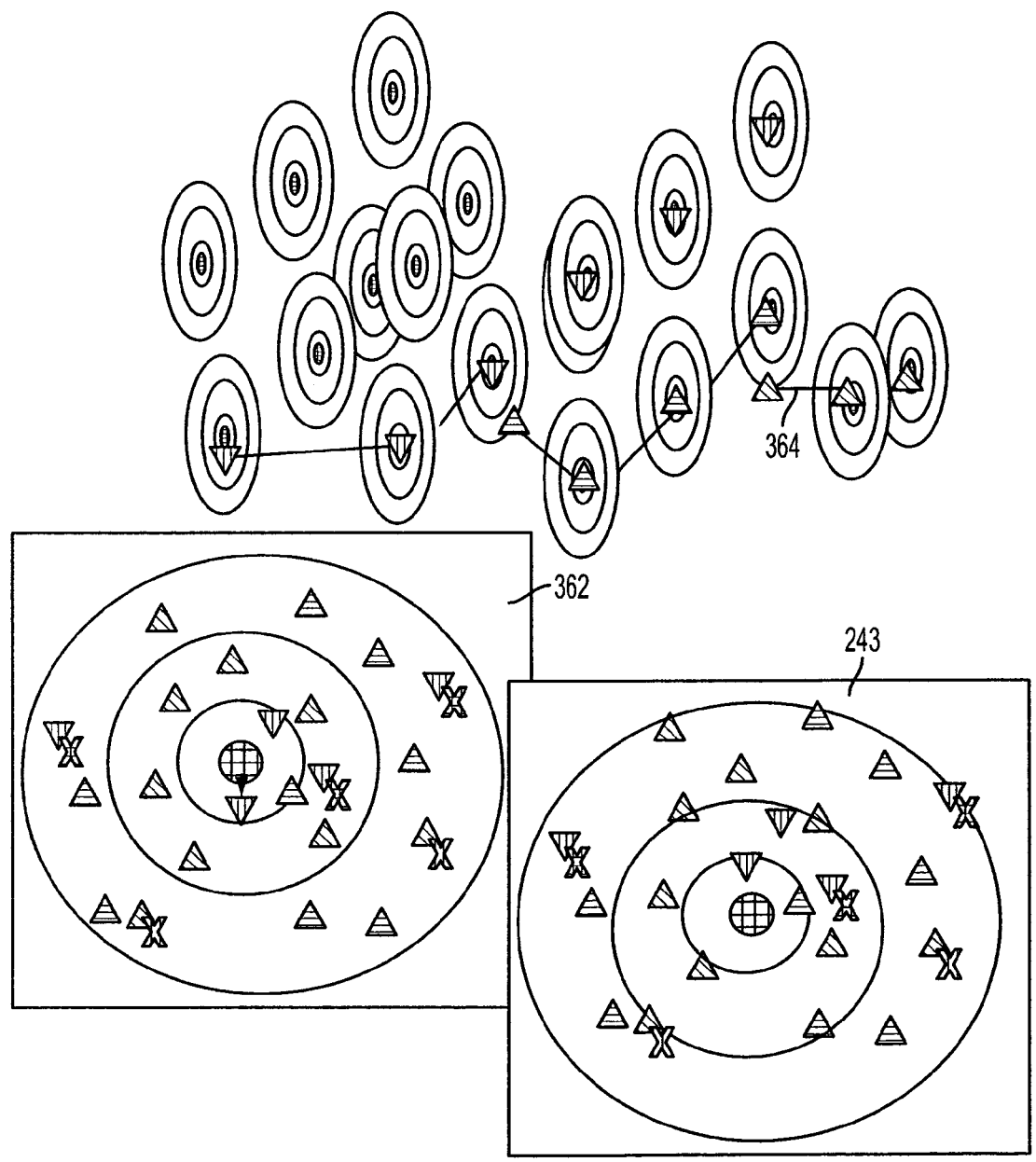
FIG. 18 illustrates the recalculation of a virtual perspective as a context data file being recast as a narrative node.

(iii) Recalculation of Virtual Perspective (FIG. 18)

There are many possible points during the construction of a work 10 when the perspective of elements relative to one another, that is, the significance of the elements relative to one another, will change. For example, an audience may show high interest or response to a context data file 16B in an interactive presentation, and the presenter may respond by selecting that context data file 16B for emphasis in a subsequent presentation. A system of the present invention will in turn recast the work 10 as displayed to the audience and fetch an alternate set of nodes 12A that allow illustration of an alternate narrative path 12P. In other instances, one contextual content file 16B or narrative content file 12B may replace another of the narrative may be altered to follow a different narrative path 12P or the role or classification of at least some narrative nodes 12A or narrative or contextual data files 12C or 16B may be changed.

FIG. 18 illustrates the recalculation of a virtual perspective 243 as previously discussed with regard to, for example, FIGS. 8 and 12E, for the example of a context data file 16B being recast as a narrative node 12A. As described, the recasting of a context data file 16B to a different role in turn requires the recalculation of contextual significance and relationships for the new narrative node 12A that has been established by this operation. Such a recalculation is graphically illustrated in sections 243 and 362 of FIG. 18 wherein elements of the work 10 have been previously associated on the basis of their relative significance to a node 12A to which the context data file 16B is linked. In section 362, a context data file 16B has been selected to become a narrative node 12C element and the boundary conditions for determining which of the narrative data files 12C should be associated with a context data file 16B can be recalculated. This allows the author to define a broad knowledge database 364 that can be interactively navigated at the time of performance or presentation. The new nodes 12A can in turn be used to generate new narrative paths 12P, that is, new narrative lines 362, or can provide contextual content 16A that will generate new nodes 350.

J. Virtual Perspective Subsystem and an Exemplary Embodiment of a System 20 for Generating a Work 10 (FIGS. 21A and 21B)

Having herein above described the elements and methods of a work 10 and for constructing a work 10, the following will describe in further detail a system 20 for constructing a work 10, including an exemplary subsystem for generating virtual perspectives and a flowchart of the operation of an exemplary embodiment of a system 20 including a virtual perspective generator.

Figure 21A:
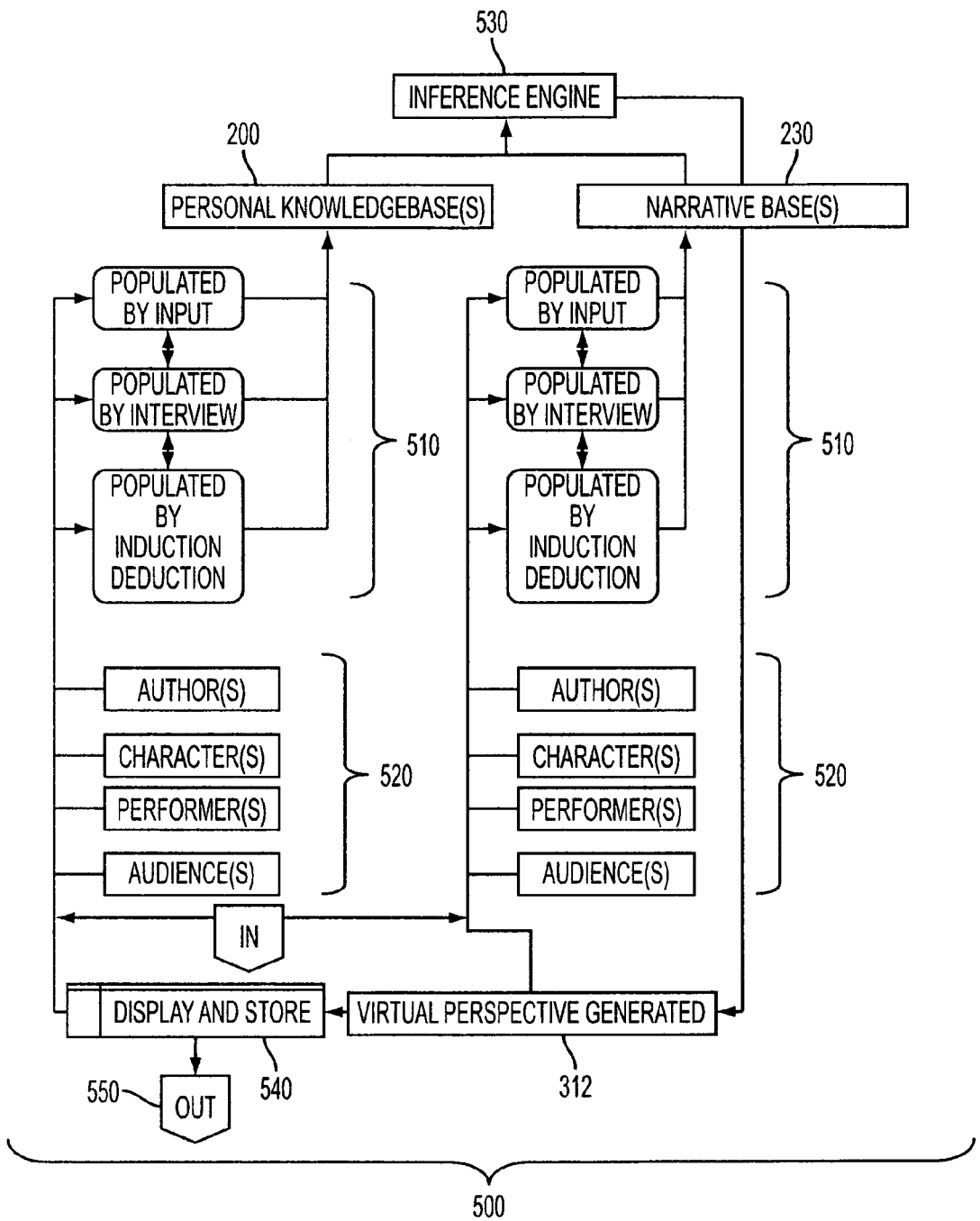
FIG. 21A shows a flowchart illustrating a method for determining inference queries and using such inference queries.
Figure 21B:
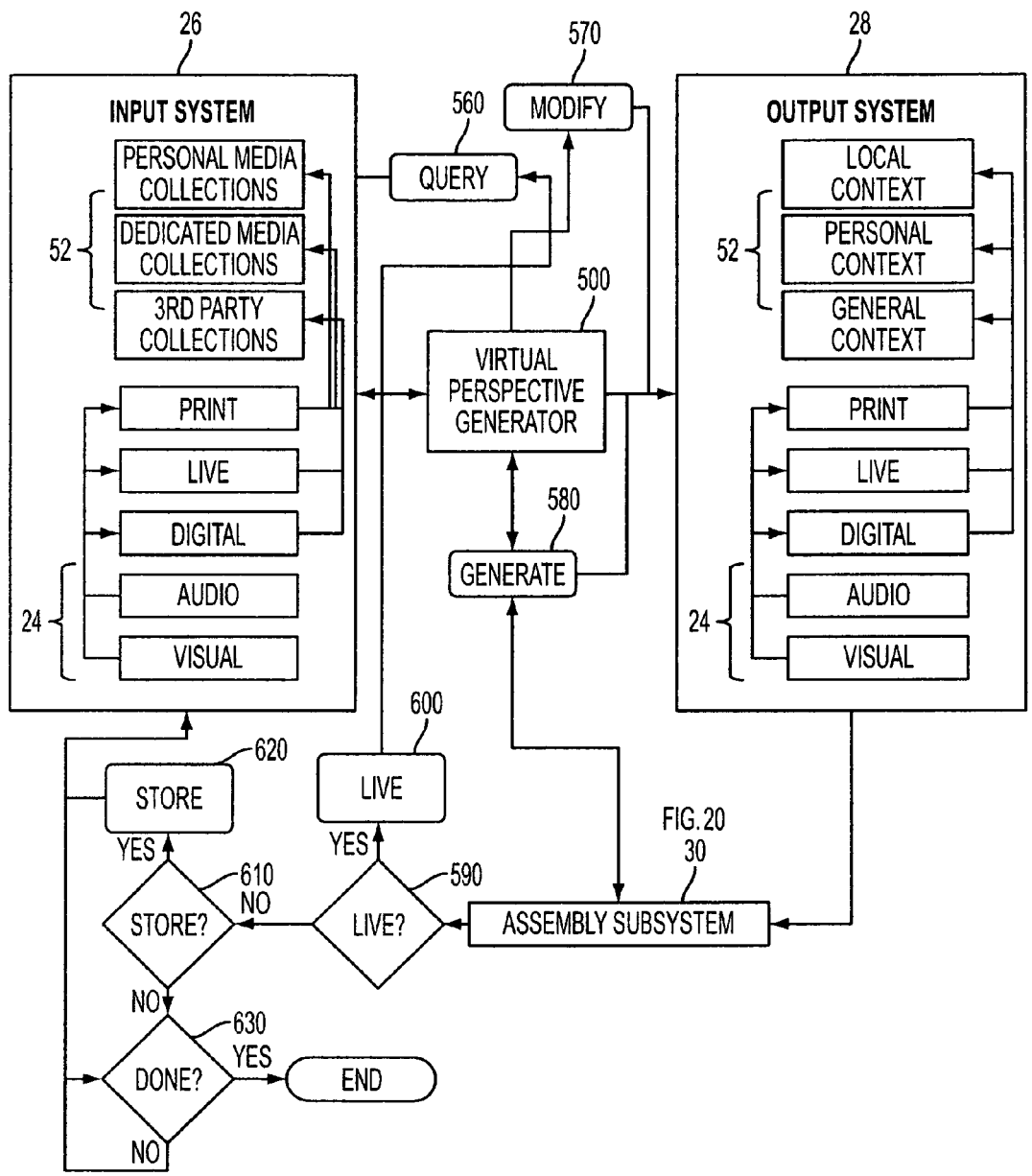
FIG. 21B a flowchart of overall system operation.

(i) Virtual Perspective Subsystem (FIG. 21A)

FIG. 21A is a block diagram representation of a virtual perspective generator 500 subsystem 500 that may be implemented in a system 20 to execute the method of the present invention in cooperation with the above described elements of a system 10, such as the database structures described herein above.

The virtual perspective generator 500 as illustrated in FIG. 21A also demonstrates the high degree of parallelism between the method for populating a personal knowledgebase 200 and the narrative information for a work structure database 230 through a variety of sources 520, including information pertaining to authors, characters, performers and an audience 520. It will be recognized that this parallelism facilitates the iterative generation of compound inference queries 18A, as illustrated by the interaction of the processes illustrated with FIGS. 13 and 16, through an inference engine 530. In a presently preferred embodiment of the present invention, an inference engine 530 creates a compound inference query 18A by combining information from knowledgebase 200 and narrative information as described with reference to, for example, FIG. 12A, in a form that can be applied to text, audio and visual narrative data files. The query 18A is then further refined using the relative significance ontology as described herein above with respect to, for example, FIGS. 8, 12E, 13, 16 and 19, as a method to return narrative data files 12C and contextual data files 16B whose relative significance scores allow them to be organized and presented as virtual perspectives 243. The virtual perspectives 243 thus created are then stored in display and store subsystem 540 for access by the larger system.

(ii) Exemplary Embodiment of a System 20 Including a Virtual Perspective Generator 500 (FIG. 21B)

Now considering the general processes by which a system 20 is employed by a user to generate a work 10, FIG. 21B illustrates the general operation of an exemplary embodiment of a system 20 including a virtual perspective generator 500 as described above.

Narrative data files 12C, here limited for purposes of illustration to, for example, audio visual narrative data files and live transmissions, reside in remote memory systems 52, as do context data files 16B containing, for example, collections of print or other physical media, wherein narrative and context data files 12C and 16B are typically in the form of digital or analog electronic files. In this regard, it should be noted that context data files 16B may include contextual content 16A that is being generated "live" and transmitted electronically and is being otherwise sensed or recorded and contextual content 16A that is stored in personal content databases as well as licensed contextual data 16A and public domain or third party contextual data 16A. The narrative content 12B and contextual content 16A thereby includes all materials that are accessible by means of either links to or copies of materials identified by inference queries generated by an inference engine 530 of the virtual perspective generator 500.

It should be noted that in addition to existing context data files 16B and modified context data files 16B, the system include or have access to a subsystem 580 capable of generating or capturing context data files 16B on order. That is, a decision to generate potentially desirable context data files 16B either by request for manual generation or by an automated generation subsystem is possible in that an inference query 18A identifies context data files 16B surmised to be of significance to the work 10 and if there is failure to retrieve, the inference query 18A can act as a request for generation of a context data file 16B.

The functions performed by the system 20 as illustrated in FIG. 21B includes the processes of input subsystem 26 of taking found, modified, or generated narrative and contextual data files 12C and 16B and storing them, for example, on remote memory systems 52, as output resources 28 for use in constructing a specific work 10 where the narrative data files 12C are. The stored narrative data files 12C are preferably grouped according to relative significance and into useful categories, such as personal material, local contextual content 16A, and general contextual data 16A according to the subcategories previously described in reference to the rules of virtual perspective.

Figure 20:
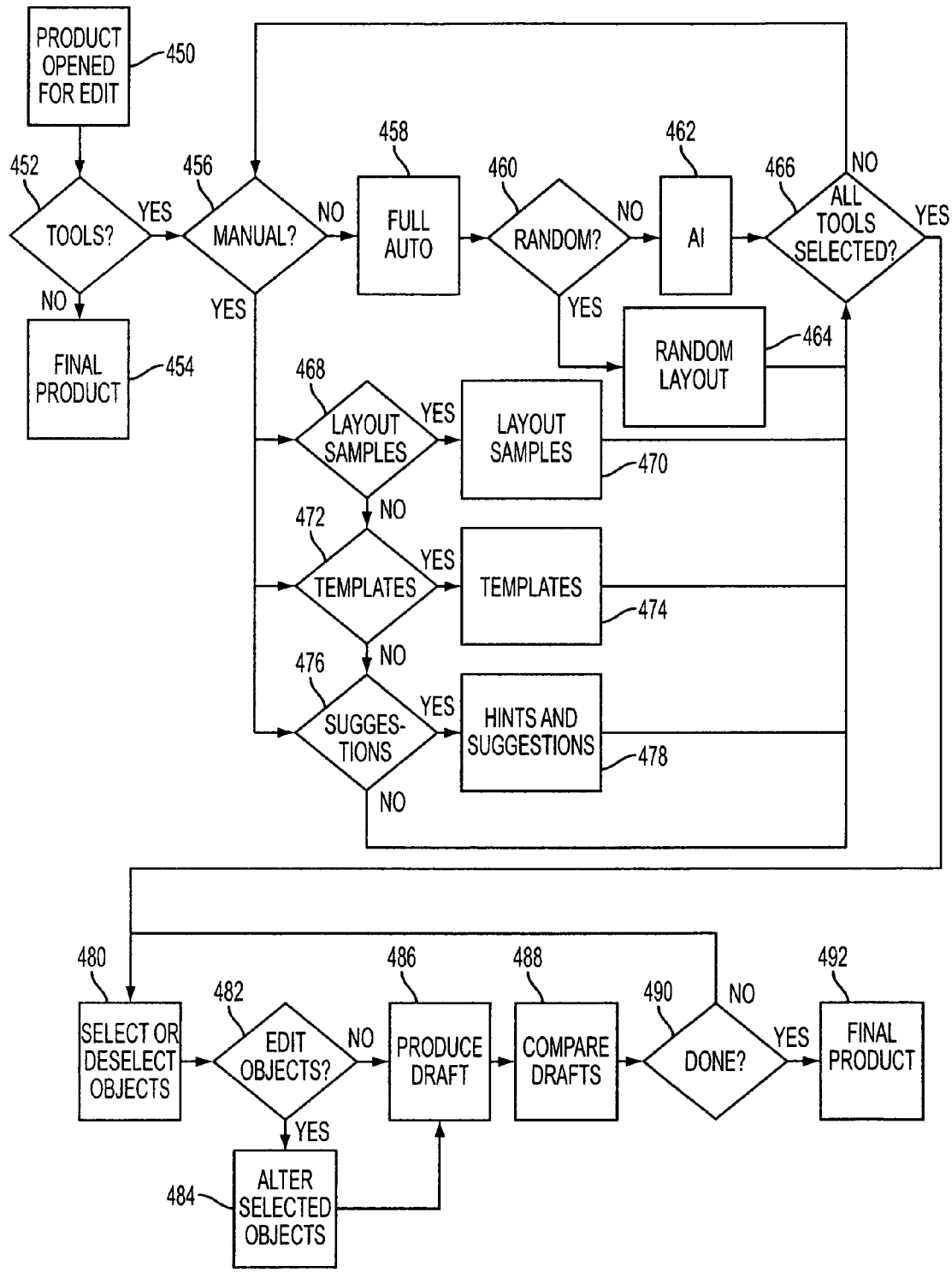
FIG. 20 shows a flowchart depicting one embodiment of a method for generating the work of communication.

Output resources 28 are then displayed to a system 20 user in a virtual perspective representation in ways described, for example, in FIGS. 14A through 14F and are provided to a work assembly subsystem 30 which then operates interactively with the user, or in a fully automated manner, as illustrated in FIG. 20, to allow further refinement of the selection and assembly of the narrative nodes 12A, narrative data files 12C and context data files 16B into a work 10. The decision (step 560) is then made as to whether the work 10 is to be presented in a live performance or stored for later replay, such as by an individual or as in a computer game, or presented in a live performance. When the decision (step 590) is made to not be live is made, the system offers the decision option 610 of storing the results, whether the work 10 being presented live or not. It should be understood in this regard storing a work 10 refers to the storage of a "non-live" work 10 and that "live" works 10 may be stored by being recorded through input subsystem 26 of the system 20. If the decision (step 610) is to store the work 10 without a concurrent live presentation, then longer term storage 620 takes place in the remote memory systems 52, after which the system will is able to start a another project or will return to the store decision option 610 and decide no and continue to the completion decision box 630. If complete the system shuts down, otherwise it loops while waiting for a decision at 630 to continue or shutdown or gets new input.

Figure 19:
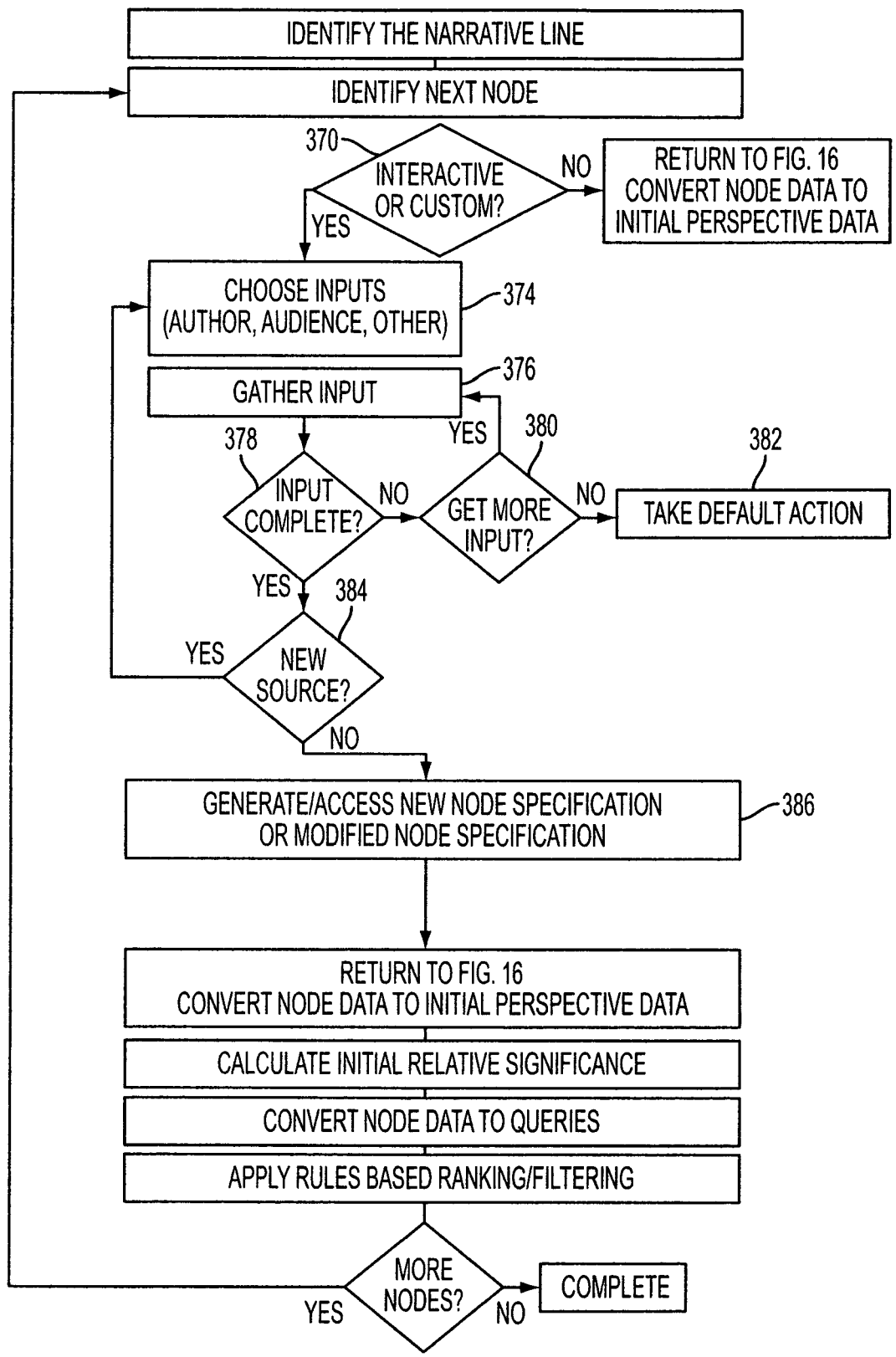
FIG. 19 shows a flowchart of the virtual perspective subsystem.

If the user makes the decision (step 560) to use the system 20 in a "live" presentation mode 600, the system 20 invokes the interactive processes illustrated in FIG. 19, which results in an ongoing continuous loop performance of the work 10 through the system 20 until the decision is made (step 630) to terminate the performance.

(K) Review and Further Aspects of the Generation of a Work 10 (FIGS. 7, 8, 10, 16 and 20)

Having considered the general operation and use of a system 20 to construct a work 10, the following will consider the operation and use of a system 10 in further detail.

(i) Discussion of Modes of Generation of a Work 10

As described herein above, a user of a system 20 first proposes and defines one or more narrative nodes 12A that are to be the basis for the construction of a narrative structure 14A comprised of narrative nodes 14A arranged along a narrative path 12P to form the narrative of the work 10, and links 14B relating the narrative content 12B of selected narrative data files 12C and the contextual content 16A of selected context data files 16 to the narrative nodes 12A. As described herein above, FIG. 16 illustrates the relationships between the narrative data files 12C and narrative nodes 12A to create inferential queries 18A to locate additional narrative data files 12C and context data files 16B related to narrative nodes 12A. It may be seen therein that the narrative nodes 12A of a work 10 thereby function as keys for the location or identification and selection of narrative and context data files 12C and 16B useful in forming and enhancing the work 10.

As previously discussed, in typical system of the prior art searches for possible narrative or context data files 12C or 16B requires a search of all possible sources and potentially returns vast numbers of results, including null results and inappropriate results, that must then be manually sorted. As also described herein above, however, the system and method of the present invention pre-selects narrative data files 12C and context data files 16B on the basis of their significance to the author, performers, characters and audience. For example, the narrative node 12C may use a keyword, key image, or key sound for fish. Rather than force the author to search all databases for an appropriate fish, the system by knowing the time location of the author, performers, audience and narrative node and characters within the narrative node; could anticipate the author's choice per rules provided by the builders of a specific instance of the system. Thus, knowing that the narrative node 12A is set in Japan, the system 20 could assign a high relationship value to narrative data files 12C with narrative content 12B relating to Japanese koi. As described herein above, the inference rules and the rules for selection of narrative and context data files 12C and 16B allow a range of interaction styles from fully automatic, to assistive, to completely manual selection and may control other factors of the selection of narrative and context data files 12C and 16B, such as automatically providing set ratios of context data files 16B and narrative data files 12C to appear in the foreground of the work 10

In addition, the system can suggest related context data files 16B whose association with the narrative content 12B specified by the narrative node 12A can be a stimulus to recollection and engagement of the author, performers and audience. For example, narrative data file 12C information held by the system regarding the location and time of the narrative node 12A, the author and the audience allows the system to suggest context data files 16B containing pictures of koi pools, art images, and streets in Japanese cities where the action is taking place.

As also described herein above, the system 20 has the power to recursively optimize the selection of narrative and context data files 12C and 16B. For example, a personal photograph chosen by the author can be analyzed by the system using additional knowledge about the author, such as a school attended by the author and that individuals in the photo are wearing team uniforms. The system 20 may then test an inference that the figures in the photo are college team members and initiate a search for photos of such team members, which it may then possibly use to identify the individuals in the author's photo.

In addition, the system can construct a database of narrative data files 12C using narrative data file databases 210 or 220 as illustrated in FIG. 8 and, in conjunction with the data in the knowledge database 200 personal table as illustrated in FIG. 7 and narrative structure database 230 as illustrated in FIG. 10, alter the databases in such a manner as to optimize their significance to the work 10, narrative nodes 12A and the persons associated with the work 10. For example, the rules guiding the system 20 may allow the system 20 to alter narrative data files 12C with information extracted from general database 212 so as to match narrative content 12B descriptions in the personal knowledge database 200 pertaining to the author of the work 10 and to provide the missing media contextual content 16A.

This principle applies to all combination of narrative data files 12C, including knowledge databases 200 as shown in FIG. 7, general databases 212 as shown FIG. 8 and narrative structure databases 230 as illustrated in FIG. 10. The author can choose to implement rules that allow narrative data files 12C from one database to be altered so as to serve as narrative data files 12C that are described by but missing from another database. Alternatively, the rules may give precedence to the narrative node 12A in the narrative structure database 230 as illustrated in FIG. 10 and may alter narrative data files 12C to correspond to or agree with the narrative node 12A.

It may therefore be seen that, because the system 20 is able to identify missing narrative data files 12C that would be of potential significance, the system 20 may, as a consequence, generate narrative data files 12C as needed to fulfill a need for a narrative data file 12C or context data file 16B that is missing or that does not exist. For example, the narrative data files and context data files 12C and 16B accessible to the system 20 may contain no images of Chartres Cathedral on the specified date. Given sufficient information pertaining to Chartres Cathedral in accessible narrative or context data files 12C or 16B, however, such as images of Chartres Cathedral taken under equivalent light and weather conditions, the system 20 may extrapolate the weather and lighting conditions and construct an imaginary image of Chartres Cathedral that is significant to the author and audience and that meets the requirements of the narrative node 12A and its associated persons, such a the author, members of the audience or characters in the narrative.

Narrative and context data files 12C and 16B may further be modified according to the rules set forth, for example, in a narrative structure database 230 as illustrated in FIG. 10 to meet the stylistic requirements or preferences of the author. For example, since context data files 16B can be identified as such using the above described methods and mechanisms of the present invention, the author may stylistically modify selected context data files 16B under the rules set forth in a narrative structure database 230 to make the contextual content 16A less detailed, that is, by "cartooning" the contextual content 16A, to suit the tastes and responses of the author and audience.

Considering the process of modifying narrative or context data files 12C or 16B in further detail, the first step is to determine a narrative topic, such as a vacation in Paris. The author then determines mode of expression, the narrative nodes 12A of the narrative and the additional characters, if any. At this point, system 20 may be invoked by providing a topic, a location and time period and duration as well as a classification (personal, general, local or ubiquitous) that will cause narrative data files 12C to be displayed for the purposes of enhancing the memory and imagination of the author (or an author, performers and audience if the purpose of the work of communication is to provide a performance). The author may then select from the narrative data files 12C presented and place them in a narrative relation to one another, thus establishing the narrative nodes 12A that define the underlying narrative structure 14A.

As previously described, the narrative nodes 12A may be narrative data files 12C or narratives containing other narrative data files 12C or other narratives. For example, the narrative "Paris vacation" may contain a media object representing the Eiffel Tower or a narrative node 12A that is a narrative composed of multiple narrative data files 12C that communicate a sequence of events, objects, settings and characters relating to the Eiffel Tower. Once the author chooses a core set of narrative nodes 12A, the author can arrange those narrative nodes 12A in an appropriate sequence, such as a simple chronological order, a spatial order, an order related to the history of the location rather than the author, or any other schema deemed fit by the author.

In addition, the author will be asked to choose the output for the narrative, since the system will have to use different selection criteria and assemblage principles depending on whether the output will be, for example, print, human interactive performance, computer interactive performance, film, video, audio or any form currently in use or to be in use in the future. Note that this process is in contrast to the systems and methods of the prior art, which are typically designed and limited to assisting in the creation of work for a specific media. For example, a publishing program such as Quark Express will be used to create a print work while Adobe Premier might be used to create a video, Macromedia Director to create an interactive computer work, Soundforge to create an audio work and so forth.

As described herein above, the system and methods of the present invention are structured and operate to identify and manipulate the relationships of the narrative data files 12C and context data files 16B to the author, characters, performers and audience. Using these mechanisms, a system 20 is able to extrapolate principles of assemblage from the underlying relationships of the narrative data files 12C to the narrative, characters in the narrative, author, performers, audience and to other areas that may be germane to the work of communication that is the work, such as the venue where the work will be presented, the specific equipment for transmitting or executing the work, and all other environmental aspects that come in contact with the work 10. For these reasons, the author may be prompted by a system 20 to choose tools appropriate to the type of output selected and to choose the level of automation for such tools, ranging from completely manual to completely automatic. By tools are meant hardware and software useful in assembling a work 10, typically in the form of templates, editing, converting, assembling, correction software and hardware that will translate author intent into actions such as scanning, altering, and creating media.

Upon the choosing an output format or formats by the author, the system 20 will then analyze the narrative and narrative nodes 12A and extrapolate selection criteria for narrative data files 12C and 16B. In addition, depending upon the level of automation desired or premised into the design of the system, the system will be able to recommend additional narrative data files 12C or context data files 16B. As described, the system 20 may do so by determining the actual or potential significance relationships between the narrative, author, performers and audience and existing narrative nodes 12A and narrative data files 12C and other narrative data files 12C, thereby anticipating what additional narrative data files 12C may be potentially incorporated into the work 10.

For example, when placing the narrative nodes 12A in a basic sequence, the author may have left certain narrative nodes 12A unfilled except for, for example, a description. The system 30, knowing, for example, the date and location or other information pertaining to the unfilled narrative node 12A, may then interpret a simple description, such as "street mime", and generate an inference query 18A and search for a media object that fits the author's stated criteria. In other cases, and if required or requested by the author, the system 30 may interpret and extrapolate such information as knowledge pertaining, for example, to the author, characters, and performers and audience, the arc of the narrative and the form of output, and apply compositional rules for the medium in which the work 10 is to be executed to suggest additional narrative nodes 12A for the narrative.

It will be noted that in this mode of operation the system 20 not only "learns" from the author but also functions as a teaching aid to the author. For example, the system can determine that too many adjacent narrative nodes 12A feature art museums and may suggest the substitution therefore of narrative nodes 12A featuring restaurants and historic sites to maintain audience interest, especially if an audience profile indicates the audience spends more money on food than on art. In further example, the system 30 may suggest the addition of a character to the narrative, possibly in substitution for a previously existing character, to provide a better focus for audience identification. In another, related mode of operation, a system 20 may, for example, record the behavior and processes of one or more professional storytellers in assembling a work 10 and use the learning from one author for teaching or assistance to another.

Alternatively, the author may choose to be stimulated or guided by the narrative data files 12C found by searches keyed from but deviating from the original author selected narrative nodes 12A by some relative degree. In such instances, for example, the author could therefore choose to have the system assemble the narrative data files 12C from some other author's databases, from the database of a character in the work 10, or from the audience database, and may specify some degree of randomization to introduce an element of stimulating surprise.

In another alternative approach to generating a work 10, which may be referred to as author/system authoring, the author may choose to have the system 30 search for and suggest narrative nodes 12A or a sequence of narrative nodes 12A other than those provided by the author. For example, starting from one or more narrative topics or narrative nodes 12A suggested by the author, the system 30 may be allowed to generate inference queries 18A based on associations and patterns typical of well received narratives by other authors and suggest narrative nodes 12A and sequences of narrative nodes 12A and associated narrative data files 12C and context data files 16B from the results of such searches.

It must be understood with regard to author/system authoring system assisted authoring by a human author that a system 20's operations in searching out narrative nodes 12A and narrative and context data files 12C and 16B that will be of value to the author is based upon searching for patterns and associations in the context of the work 10 databases, as described above, and the rules of association and significance relationships defined for the system 20. It must be further understood that the searches performed by a system 20 and the results of the searches are essentially independent of the actual search mechanisms by which the searches are performed. That is, a system 20 embodied according to the present invention by the system 20 is agnostic with respect to search technology and the searches may be equally performed, for example, by artificial intelligence methods, pattern recognition methods, and systems that observe behavioral histories and extrapolate behavioral preferences, such as the past choices and preferences of the author or audience.

Considering the generation of a work 10 by author/system authoring in further detail, the author may suggest or prescribe one or more initial narrative nodes 12A or narrative topic, and the system 30 may then request further information defining the work 10. Such additional information may include, for example, a cost limit or other final output related information, such as whether is the output to be for personal or commercial use, the anticipated audience size and presentation venue, and whether the work to be considered proprietary intellectual property for commercial distribution of a work 10 that is to be free to a family or private circle, and so on.

Upon completing all the input choices, the system will present the selected narrative data files 12A in one or more narrative structure 14A arrangements appropriate to the request of the author and in a manner that allows the author to easily choose between the offered narrative structures 14A, the offered narrative data files 12C and context data files 16B that are offered.

In a further alternative form of author/system authoring, the author may define a set of criteria for the selection of, for example, narrative topics, narrative nodes 12A and narrative and context data files 12C and 16B. The system 20 may then select a range of elements, such as narrative topics, narrative nodes 12A and narrative and context data files 12C and 16B, that meet the criteria provided by the author. The system 20 may then arrange the selected elements according to a dynamic narrative structure 14A constructed by the system 30, whereupon the resulting work 10 would display all of the selected elements in succession according to the dynamic narrative structure 14A. That is, the resulting work 10 may constantly cycle through a range of narrative nodes 12A or narrative or context data files 12C or 16B in a manner to traverse between, for example, the author's preference, narrative or contextual data 12B or 16A that suggest a characters nature, performer preferences and the audience preferences while still adhering to the narrative of the work 10.

(ii) Exemplary Embodiment of the Method for Creation of a Work 10 (FIG. 20)

Having discussed certain of the possible modes for the creation of a work 10 available through the system and method of the present invention, the following will discuss the operation of an exemplary embodiment of the present invention in the creation of a work 10 with the aid of the flow chart of FIG. 20.

The method of the present invention for the creation of a work 10 as illustrated in FIG. 20 begins at the point, identified as step 450, at which the author is to provide personal narrative content 12B and is to explicitly define or allow the system to infer from the provided personal narrative content 12B one or more narrative nodes 12A of a narrative path 12P through the work 10. As described herein above, the system 20 will do so by constructing and executing inference queries 18A that returned narrative data files 12C useful for setting a context for each narrative node 12A and thereby defining possible contextual content 16A and context data files 16B for each narrative node 12A.

Therefore beginning with step 450, step 450 requires that the author select a type or class or category of work 10, such as a photo album.

Step 452 requests that the author choose to work with editing tools appropriate to this disclosure, or accept a final work 10 (step 454) composed of either the raw results 18R returned from inferential queries 18A generated from the author's personal narrative content or of a work 10 produced by unconditional acceptance of the work of a fully automated system.

If the author decides to use the editing tools, decision step 456 requires the author choose between manual editing tools or fully automated editing tools.

When the decision at step 456 is to use full automation tools, typically with the intention that editing will take place by the author selecting a final version from competing versions of each given narrative node 12A, either manually or in combination with the tools (step 458), decision step 460 is engaged.

Decision step 460 requires the choice between whether the system takes a rules based approached, to step 462, or a random approach, to step 464. It should be noted that implicit in the method of the present invention is the option to choose the degree to which a narrative node 12A reflects one or more of the system rules discussed above, principles of construction of a work 10, manual intervention and random construction.

Step 466 thereby reflects the ability of the author to choose which tools will be used to what degree as observed in the preceding paragraph.

If the decision to add more tools is made, the flow returns to step 456 and allows another tool to be added. The author then has the option to go to step 468 to have the system present the narrative node 12A contents according to a variety of sample layouts, as in step 470. The author may also decide in step 472 whether to have the system 20 provide in step 474 templates in the manner of conventional presentation preparation software. In step 476 the system 30 also offers the choice of whether to turn on system provided hints and suggestions in step 478.

Once the author has completed selecting the kind and mix of tools in step 466, the system 20 will display the narrative content 12B for the narrative node 12A and, in step 480, will allow the author to interact with the narrative content 12B. Typical interactions may include, for example, moving, deleting, and resizing the objects for layout purposes.

In addition, system 20 may offer the ability to alter the narrative content 12B of the narrative node 12A in accordance with decision step 482. In this regard, it should be noted that, according to the present invention and if the decision is made in step 484 to alter the narrative content 12B, the system 20 may provide suggestions regarding such modifications of narrative content 12B or contextual content 16A based upon, for example, significance relationships and the results 18R of inference queries 18A and combined inference queries 18AC.

It should be noted at this point that the author has the option, at any time, of producing a draft that captures the current changes made to the narrative node 12A, as in step 486, and in step 488 to compare that draft to other drafts.

Upon comparison of competing drafts, step 490 allows the author to declare the editing process complete and to therefore produce a final output, in step 492, or to return to step 480 with the intention of producing additional drafts.

For example, given a narrative path 12P transpiring in Paris, system 20 has compiled standard contextual images such as maps of Paris, the most well known works of art and architecture, famous music of Paris, histories of the Eiffel tower, factual imagery which shows the height and weight of the Tower, pictures taken from the top of the Eiffel tower, pictures of the then Mayor, picture of the President of Paris, images of major news occurrences happening in that region at that time, and so on. System 20 may also locate narrative data files 12C that are not of historic or personal interest but are of interest because of their ubiquity, such as billboards or commercials that were common in a particular locale at a particular time, styles of dress, matchbooks and cigarettes, a wine that was in season, automobiles, the characteristic gratings and wrought iron fences, food and popular music, and so on.

System 20 may then display such images with the author's personal images to, for example, create dramatic contrast, and such comparisons of general and personal context as seen by the characters within the narrative may reveal interesting associations that would otherwise not be discovered or noticed. In addition, the additional narrative and context data files 12C and 16B discovered and presented by system 20 may stimulate the author's memories mental or emotional associations, and the author may accordingly add new narrative nodes 12A or narrative or context data files 12C or 16B to the work 10.

It will be noted with respect to the above that the information residing in databases 200-240 and in narrative data files 12C allows system 20 to recommend context data files 16B that belong to the class of context data files 16B described herein above as "local" and that are not available to the author, either because not captured or subsequently lost, but which in retrospect add nuance and detail to the core narrative and which tie general context data files 16B to the personal narrative. It should also be noted that, as discussed above, if such "local" contextual content 16A is not available, the system 20 may be able to generate appropriate local contextual content 16A from such contextual content 16A as is available.

L. Display of Narrative Structure and Significance Relationships in a Virtual Perspective Space It has been described herein above that the method and system of the present invention incorporate the principles of significance relationships and perspective, in particular virtual perspective, in the organization and structure of the elements of a work 10, including the narrative structure 14A, the narrative nodes 12A, the narrative data files 12C, the context data files 16B and their narrative and contextual contents 12B and 16A, and the persons associated with the work 10. It will be understood and appreciated that the use of the system and method of the present invention to create a work 10 in the general manner described briefly herein above further requires the display of those relationships and perspectives or views in a manner useful to the user or author of the work 10. The following will next describe certain methods for representing and displaying those relationships and perspectives to a user or author, and will further illustrate and describe the principles of significance relationships and virtual perspective as implemented in the system and method of the present invention.

Referring for example to FIGS. 12E and 14A-14D, as described previously herein above the relationships between narrative nodes 12A and narrative data files 12C are advantageously displayed to a user of a system 20 in a virtual perspective space 243 implemented, in a presently preferred embodiment, as a multi-dimensional polar coordinate space wherein the coordinate origin of perspective space 243 is comprised of an origin point narrative node 12AO under consideration. Such methods of display of significance relationships may be advantageously extended to the display of relationships among narrative nodes 12A narrative data files 12C, context data files 16B and the persons associated with a work 10 and the narrative nodes 12A thereof.

For example, Referring briefly to FIG. 14B, therein is illustrated the concepts, principles and methods of display of virtual perspective and relative significance according to the present invention, as discussed and illustrated above with reference to FIG. 12E, in the context of a sequence of narrative nodes 12A as typically found in a work 10.

Referring next to FIG. 14C, therein is shown a diagrammatic illustration of a virtual perspective space 243 showing a variety of exemplary methods for representing and displaying relationships between narrative data files 12C and narrative nodes 12A in a narrative, such as to a user of a system or method for manipulating such elements and relationships As described with reference to FIGS. 14A and 14B, the objects are arranged by distance from the polar coordinate origin center to represent relative significance by proximity to the center. In addition, the absolute significance of the individual objects is represented, in this example, by assigning corresponding sizes to the icons and symbols representing the objects. The relationships between the narrative data files 12C and origin narrative node 12AO is graphically represented by different types of lines connecting the narrative data files 12C with the origin point narrative node 12A. For example, solid lines may represent direct relationships between narrative data files 12C and individuals, dotted lines may represent indirect relationships wherein, for example, one person influences but is not directly related to another, double lines may represent relationships to narrative or context data files 12C or 16B of places, and so on. In further example, the thickness of the lines connecting objects may represent the strength and nature of a relationship, such as the overall and relative significance of the relationship, the type of connection, and so on, using methods and representations well known to those versed in the art of computer interface design where customization of the presentation information on a computer screen is routinely done.

Referring next to FIG. 14F, therein is illustrated how the preceding virtual perspective 243 information illustrated in FIGS. 12E and 12F and in FIGS. 14A through 14E inclusive, which is referred to herein as the "radar screen display", could appear on a screen along with the most obvious controls 279 for navigating such a virtual perspective, such as up, down, right, left, 280 and in, out 281, along with navigation data useful in orienting within the narrative data file collection, such as "radar screen display" maps 282, where an iconic representation useful for orientation is provided as a visual metaphor for understanding the relationships of the representations of the narrative data files, vector degrees/distance/altitude coordinates 283 and pop-up screens 284 with information such as the absolute significance which is metaphorically represented as size metric, the relative significance which is metaphorically represented as a distance metric from the viewer, type-local, personal, general, iconic, as well as price, seller, links to seller and conditions of use if appropriate) about the narrative data files. It should be noted that a pop-up screen 284 may be an "involuntary" pop-up screen, by which is meant that the screen may appear in the display until some condition has been met. Typical uses of such involuntary pop-up screens include, for example, media objects for advertising, presentations catalogs of offerings and so on, but may be used in the sense intended herein as a screen that will prevent some action from being taken, such as a next step in a process, until some other action has been taken to meet a related requirement, such as the entry of required information.

An additional use for the display of alternating media objects in the same location is to resolve when multiple media objects of sufficiently identical characteristics, such as lying on the same vector, having the same "size" or the same distance, are collocated. In such a case the media objects may alternately be shown in the same location till a choice made, for this example we imagine a roll-over with a cursor stopping the succession media objects displayed and the a mouse click, voice command, key stroke or any useful input being the selector of that media object. Common usages such as shift and click may potentially be used to select a group of images or some non-sequential set of criteria meeting media objects. It should be noted that an alternative to temporally alternating media objects is have spatially and temporally alternating media objects.

The illustrated example of FIG. 14F suggests how narrative data files 12C viewed by a viewer positioned at the center node (distance of 0) on a vector of 220, polar coordinates with an altitude of 45 might see narrative data files 12C. It is understood that the user interface may benefit from a three dimensional rather than a two dimensional representation. In such instances, the altitude coordinate is provided to compensate for blocking views of the contents of narrative data files 12C or context data files 16B by images of intervening data files 12C or 16B. An altitude control, however, allows the viewer to look down upon the "landscape" with the data file 12C and 16B images being canted to face the viewer, so that the viewer is allowed a relatively clear view of all the data files 12C and 16B appearing in the virtual perspective 243. An associated zoom control would be useful to more closely examine an image and the use of a grow and shrink control 285 would allow the user to magnify the images to fill the screen or to reduce the images to the simple icons as in the preceding figures. Likewise, a transparency control 286 would be helpful in cases where the images block by allowing the user to "see through" the intervening images.

The user will typically also have a control to vary the field of view 287, thereby allowing greater or lesser inclusion of data files 12C and 16B pertinent to the inquiry. As noted with respect to FIG. 14A, varying the field of view could render the exemplary display in this figure in an apparently hyperbolic space. It should also be noted that narrowing the field of view while increasing the magnification may allow objects that appear to be occupying an identical locations to be seen to be occupying different locations in the virtual perspective.

In addition, the use of a logarithmic scale 288 with indicators 289 as to the relative positions of the data files 12C and 16B in the virtual perspective 243 scale, wherein both virtual distance as well as horizontal displacement are shown in the field of view by length of the line 289 on the scale 288, would be of value to provide a more precise sense of the relative positions of the data files 12C and 16B.

Media content type indicators 290 may also be of value to clearly indicate audio, video and other time based content that may not be otherwise self-apparent and, as noted in FIGS. 14B-14D, arrow and lines 277 could continue to be useful to provide visual indicators of relationships.

Finally, a home control 292 would prove useful to reset settings to a default state and point of view along with typical controls such as backtrack commands, control customization and movement and manipulation of the images allowing the user of the interface to correct system estimates of the significance of the data files 12C and 16B familiar to anyone using a computer operating system.

Figure 22A:
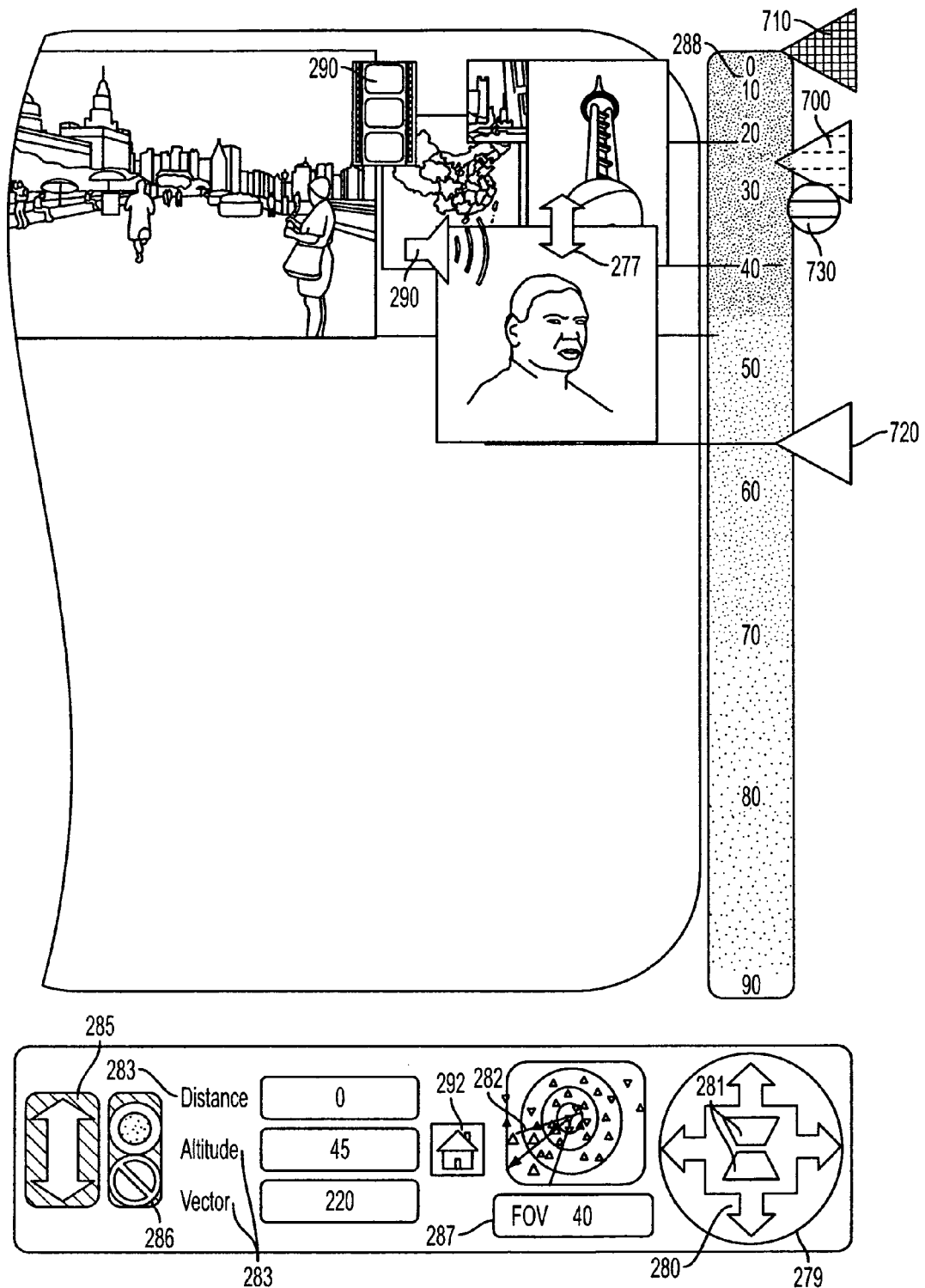
FIG. 22A illustrates additional controls for a graphical user interface appropriate to using a virtual perspective.

Referring next to FIG. 22A, therein is illustrated additional controls for a graphical user interface appropriate to using a virtual perspective, thereby resulting in the display of and navigation through a virtual landscape.

Such additional controls are a means of controlling what objects are to be selected and shown and may include, for example, the "sliders" represented in FIG. 22A, where such sliders can be used to select a point on the vector of personal significance 249 and to select the size of a region on that line. In this illustration, the sliders are placed the scale 288 to directly control the virtual perspective being produced. The first (gray) relative significance slider 700 is placed on the relative significance amount 73 it being understood that any metric that ranges from indicating the highest relative significance (in this case 100) to the lowest relative significance (in this case 0) will be equally useful regardless of the direction of the numbering. The black slider defines the upper range of relative significance 710 on the scale 288 while the white slider defines the lower range of relative significance 720 on the same scale. The light green button is a range locking control 730. When the control is activated, the range selected by the sliders 700, 710 and 720 is made the overall range for the display.

Figure 22B:
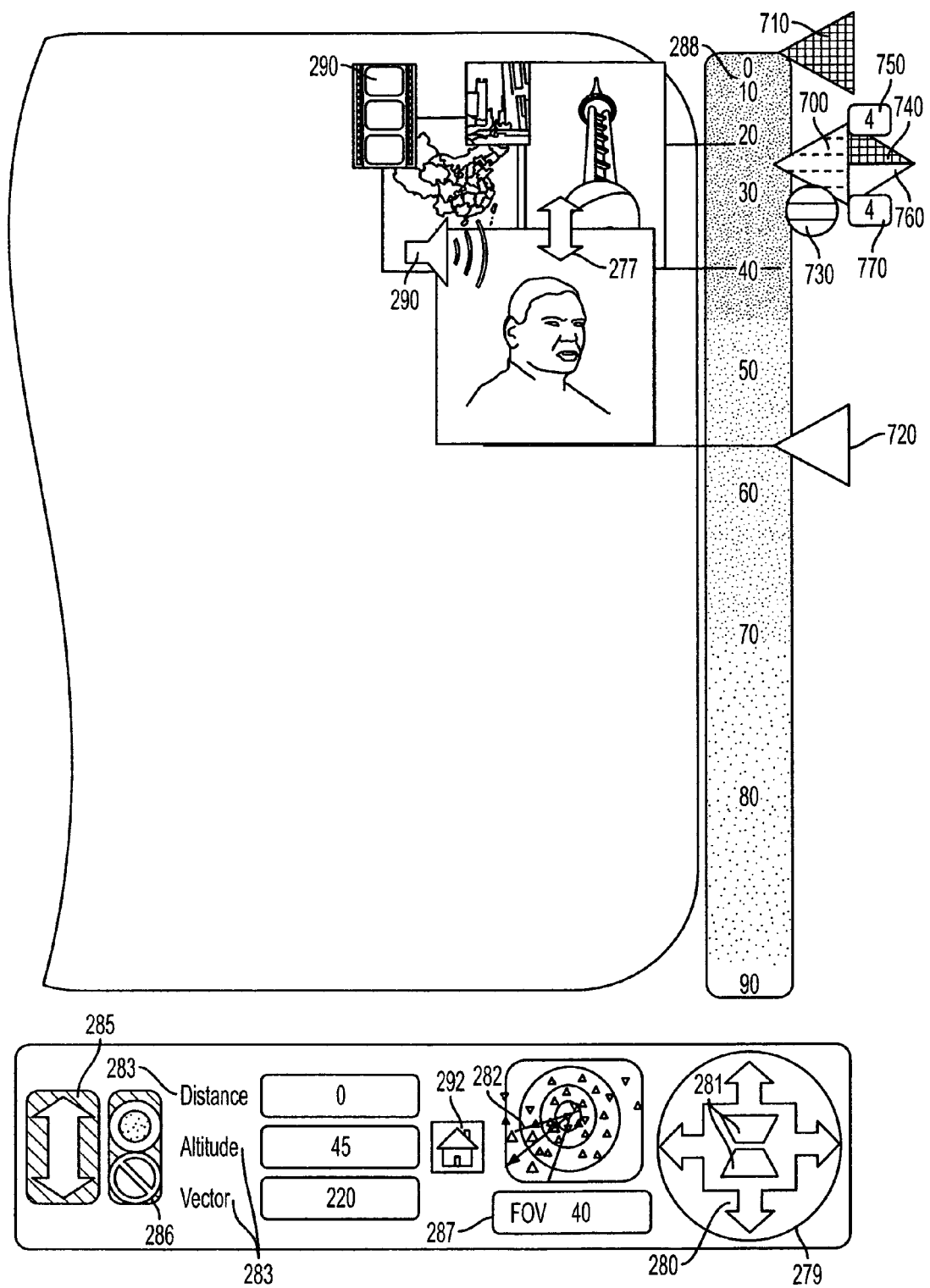
FIG. 22B illustrates the presentation and selection of objects on the basis of absolute and opposed to relative significance.

FIG. 22B illustrates the presentation and selection of objects on the basis of absolute and opposed to relative significance wherein, in the illustrated example of such controls, an additional upper bound control area 740 is suggested to set an upper bound on the objects of absolute significance with a upper bound readout 750 being useful to give a sense of what upper bound has been selected. A corresponding lower bound control area 760 with a similar lower bound readout 770 may also be provided and the metrics used in these readouts may be arbitrary as long as they suggest a useful range (such as 0 to 10 or 0 to 100). In the illustrated example it is assumed that the metric has a range of 0 to 10 with 10 implying the upper bound with the upper bound being set low in the illustrated example to thereby eliminate some of the "larger" objects. Had the upper bound and lower bounds been set high, the remaining objects represented would have comprised the larger objects and the smaller objects would have been removed.

Figure 22C:
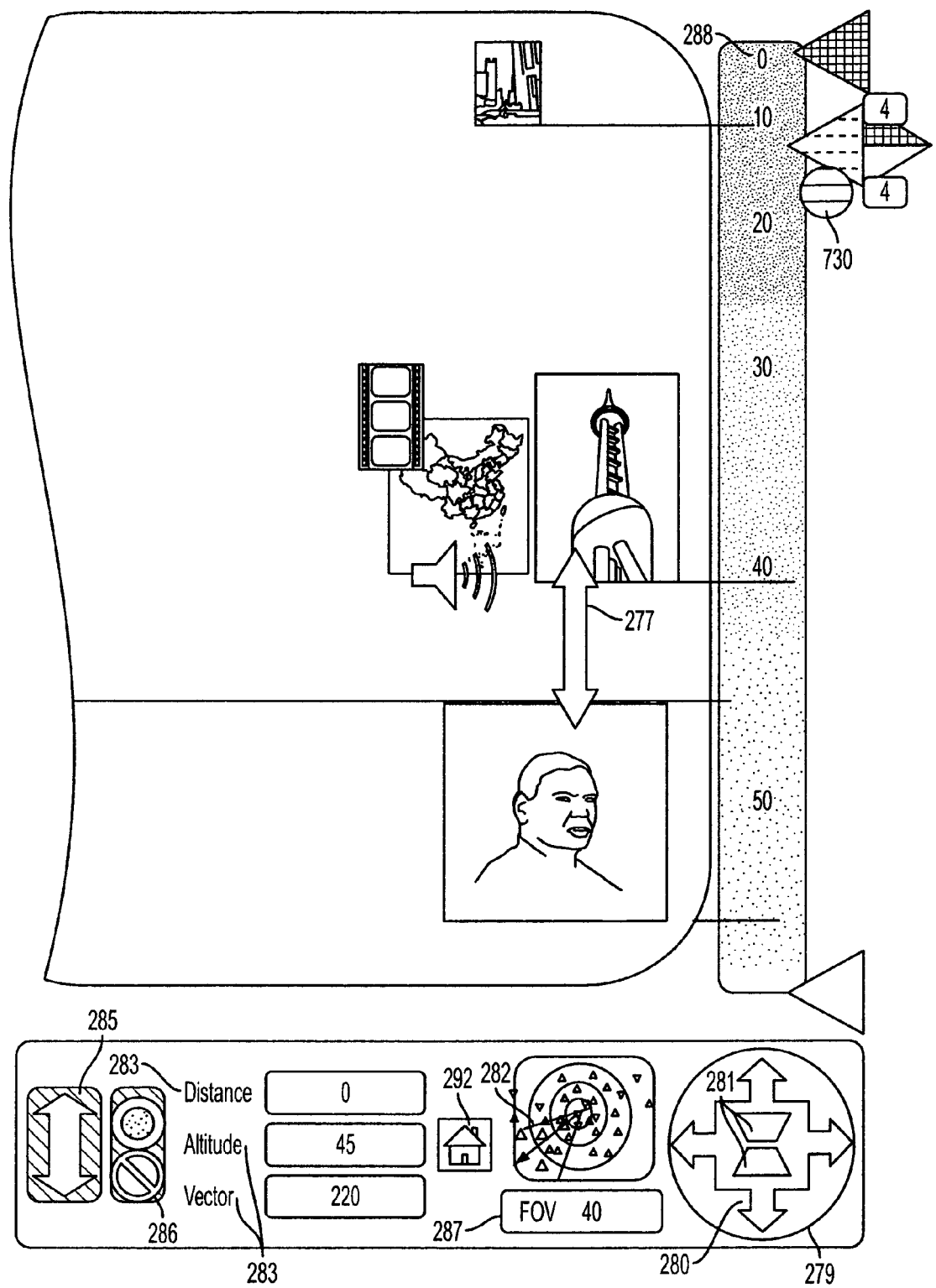
FIG. 22C illustrates a potential effect of use of a range locking control 730.

FIG. 22C illustrates a potential effect of use of a range locking control 730. Upon use of a range locking control, the scale 288 reads from 0 to 55 rather than from 0 to 100 and the high and low bounds sliders 720 and 730 move to the ends of the scale to further indicate that the scale 288 is now constrained to a selected range and the media object representations move to the new locations appropriate to the changed scale.

Figure 23A:
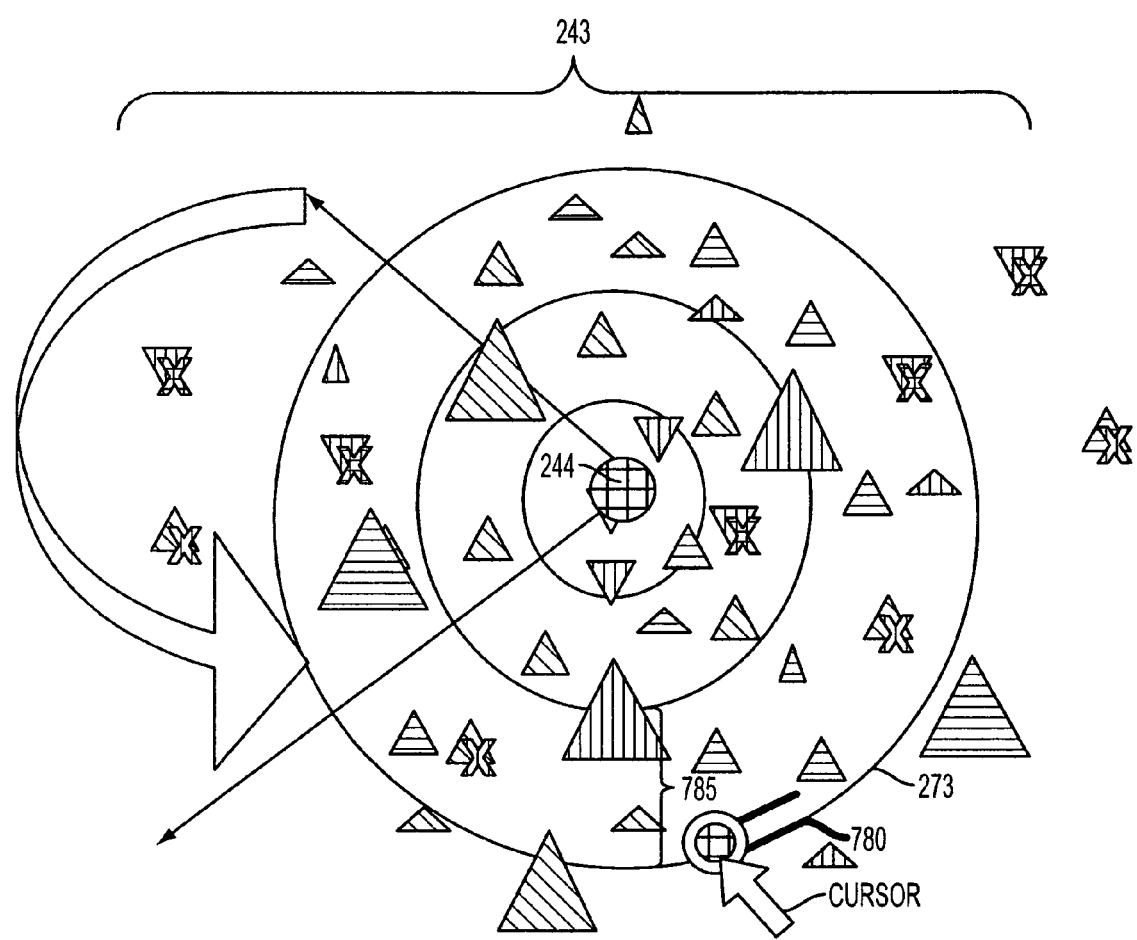
FIG. 23A illustrates the use of a "radar screen display" graphical user interface for moving node to node and between nodes.

FIG. 23A illustrates the use of a "radar screen display" 282 similar to that illustrated in FIGS. 22A-22C to adjust what objects are to be selected and displayed. In this instance the cursor C can be positioned on the displayed elements and the system can respond with a graphical tool 780 that allows manipulation of the display elements-in this case the circumference of the ring 273. For example, when the cursor is placed on the boundary ring 273, noting that the position and number of rings 273 can be used to indicate broad areas of personal, local or general significance or to indicate specific degrees of relative significance along the vector of personal significance, as desired by the user. In this implementation the rings 273 can be moved as in the scale control in FIG. 22B, that is, the rings 273 can be moved radially inward or outward, thus making the diameter of the disc or width of the circle 785 contained by the ring smaller or larger. The ring 273 can also be moved relative to the center, so the rings 273 include more or less material along a particular vector of significance.

Figure 23B:
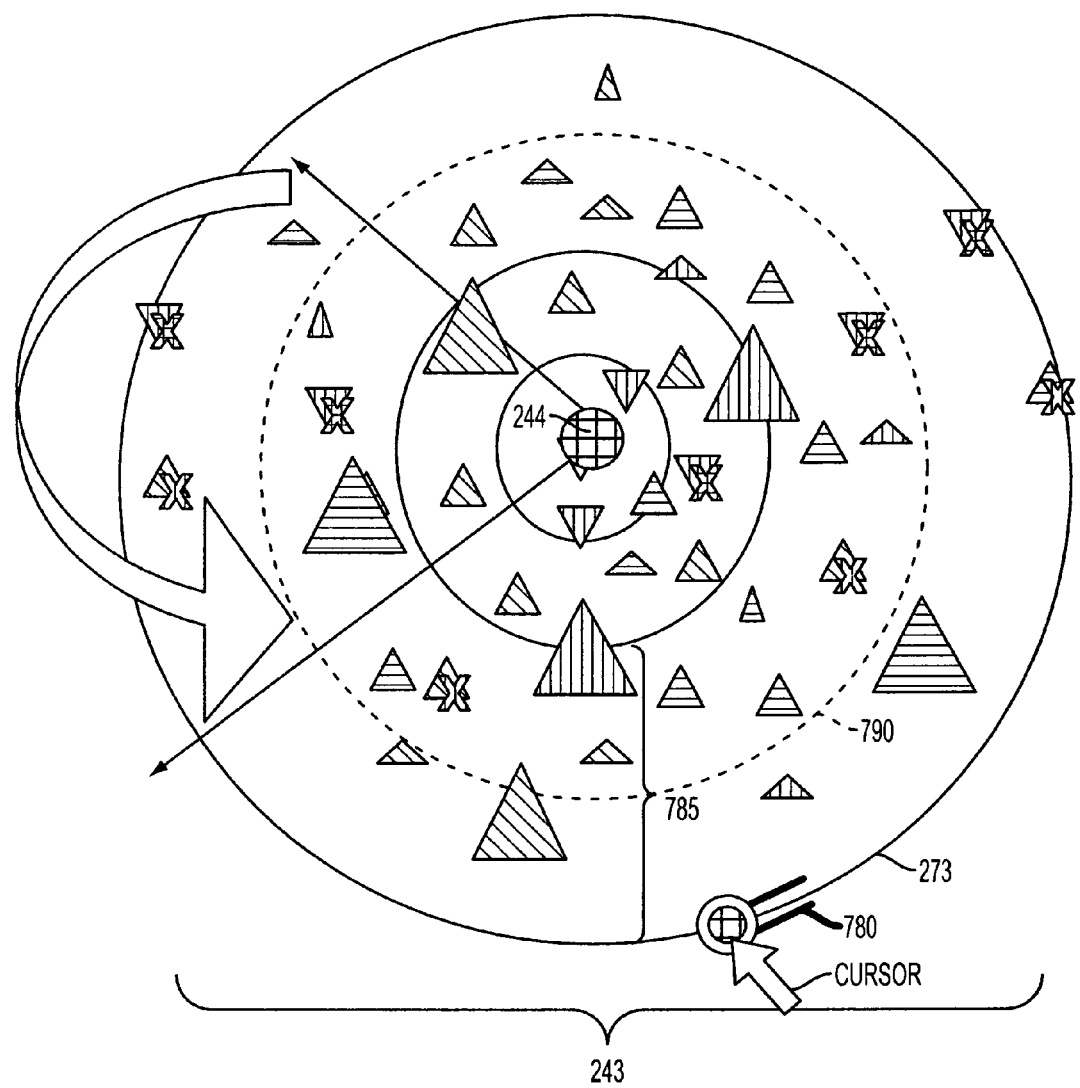
FIG. 23B illustrates the use of a cursor C in cooperation with the radar screen display.

FIG. 23B illustrates the use of a cursor C that can be moved after being placed on a boundary ring 273 so that the overall circumference of the ring 273 is changed from the old circumference 790 to a new circumference of greater width 785 so that new material that was previously deemed by the system default to have been relatively insignificant has now been included in the display.

Figure 23C:
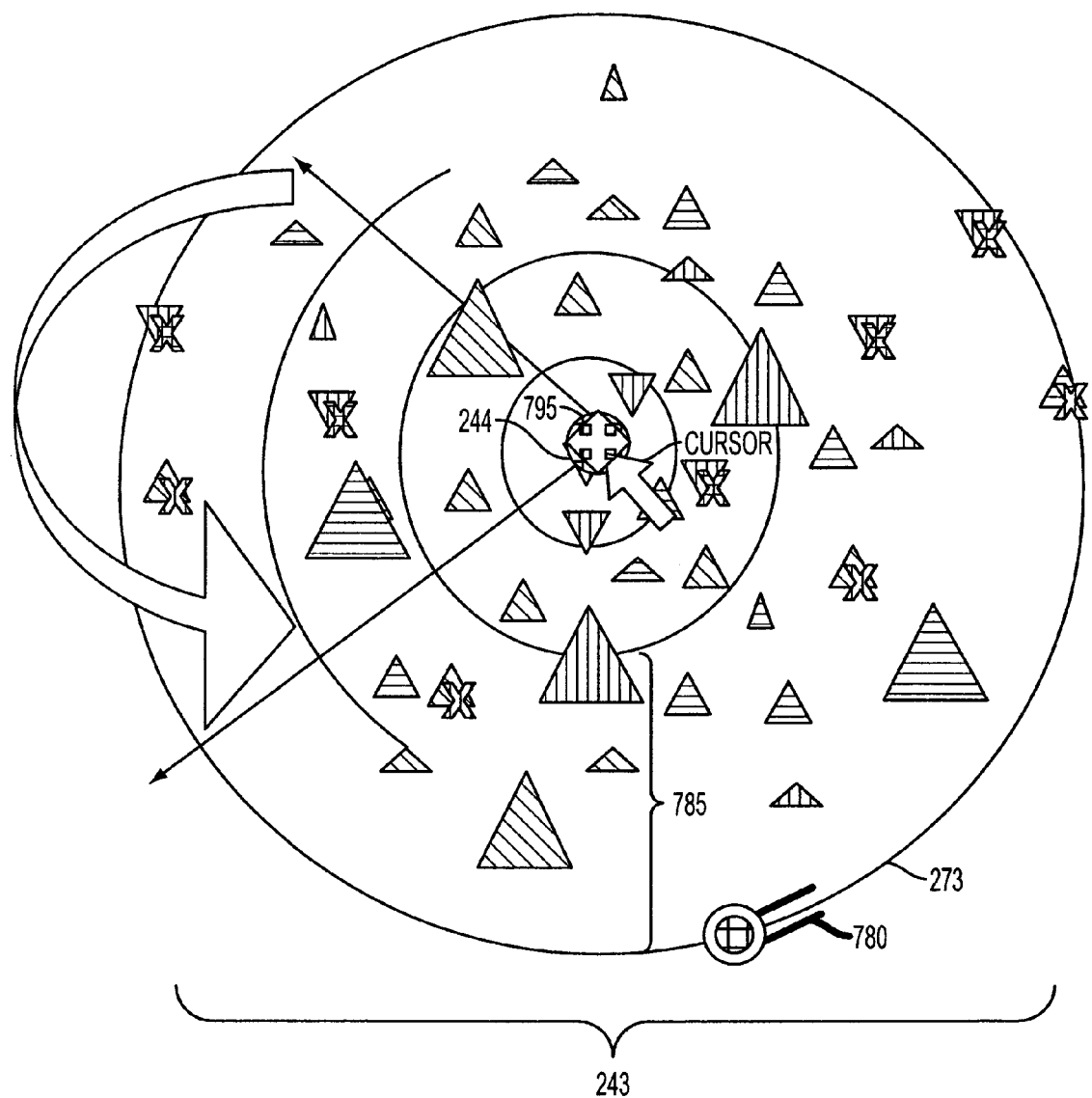
FIG. 23C illustrates a graphical tool 795 for controlling a point of view.

FIG. 23C illustrates a graphical tool 795 for controlling a point of view, here indicated with a cross but which can be any appropriate graphical indicator, where the narrative node 12A to be the origin of the point of view is selected with cursor C and a keystroke, mouse click or similar action.

Figure 23D:
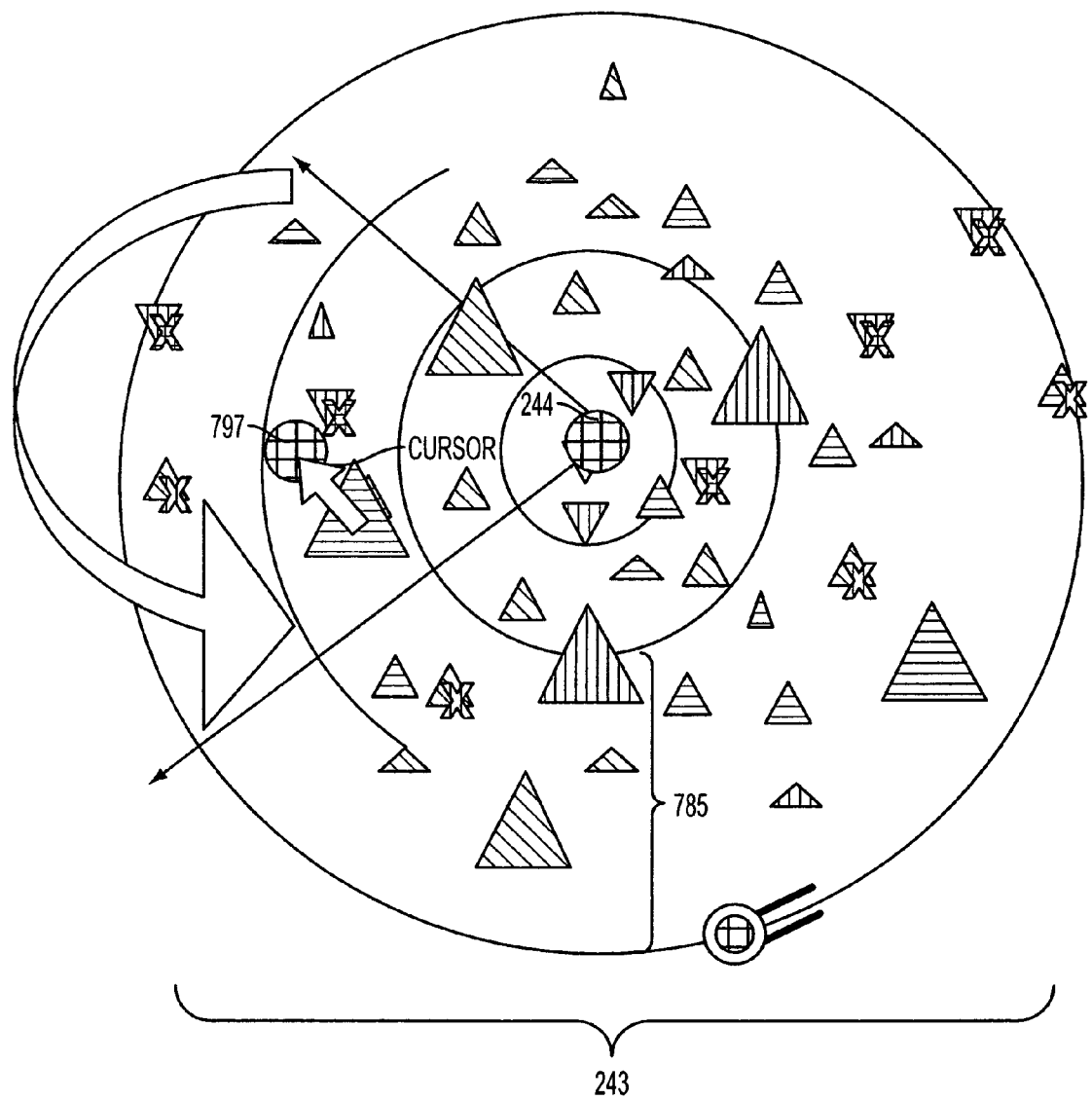
FIG. 23D illustrates the use of the cursor C as moved by the user to in turn move a "copy" 797 of the node to different position in the virtual landscape.

FIG. 23D illustrates the use of the cursor C as moved by the user to in turn move a "copy" 797 of the node to different position in the virtual landscape to afford a different point of view into, for example, the date, while retaining the linking and relational organization of the media objects to the actual narrative node 12C. This movement could be of value to better understand the context by viewing it from alternate points of view.

Lastly, FIG. 24 illustrates a graphical user interface that includes motion and selection to create a virtual landscape. Motion is indicated with motion lines 800 that also give a sense of significance by suggesting which narrative or content data files 12C or 16B are closer and which are farther as the lines 800 are occluded or in turn occlude a media object or icon. When a "falling object" 810 is selected with the cursor C and a selection action, such as a mouse click, key click, and so on, the object is selected and an indicator of this selection is provided, in this case of the lock icon 820, with the icon remaining in the display at least until the narrative or content data files 12C or 16B has been integrated into the landscape. It should be noted that in this example the point of view altitude 283 relative to the plane of the virtual landscape has been diminished, thus causing the media objects to be more likely to occlude one another and the scale 288 to be shortened.

Further with regard to virtual landscapes incorporating motion and selection, it must be realized that the concept of motion in virtual perspective can be a significant feature in the display of the relative significance of elements in a work 10. That is, distance and vector from the point of view are meaningful coordinates, so that the appearance of motion caused by changing the classifications and relative significance of the elements of a work 10 may reflect changes in the underlying information. For example, a media object or icon for a media object may move closer or farther away depending on the systems' changing evaluation of relative significance as new information is acquired that changes the results of the calculation for relative significance.

In the case of a planar representation, then the media objects or icons for media objects can be introduced into the display in a gradual manner, that is, by "raining down" upon the plane from "above;" unless the vertical dimension has been deemed by the user to be "meaningful" dimension, that is, has been assigned to represent a particular aspect of the media objects. If, for example, the vertical vector is to be used to suggest a meaningful aspect of the media object and the polar vectors are designated to be equivalent to north, south, east and west, then in a useful consistent Euclidean convention the vertical vector would be used for suggesting altitude or depth relative to the narrative node 12A point of view. This representation in turn allows an "on the fly" selection of narrative or content data files 12C or 16B. For example, a narrative or context data file 12C or 16B may be selected for inclusion in the virtual landscape by clicking on a falling image or icon representing the narrative or context data file 12C or 16B. Not selecting the narrative or context data file 12C or 16B by clicking on the icon or image would allow the icon or image to "fall through" the ground level and disappear. It is understood that the opposite effect can be selected as a default, that is, that the narrative or context data file 12C or 16B rest upon the ground surface unless they are selected by being clicked.

The motion of the narrative or context data file 12C or 16B icons or images as they fall, such as rate of fall, changes to the rate of fall, and path of fall, that is, an angular or wobbling and so on, may also serve as useful indicators of characteristics of the content of the narrative or context data file 12C or 16B.

Motion is equally applicable to cases where the representation is three dimensional in the sense that media objects or icons of objects are arranged in a virtual space that lacks a surface to orient to, thus allowing a greater number of pseudo spatial vectors to be used for organization of the media objects. This embodiment essentially "floats" the point of view in a cloud of objects and icons, with those objects moving relative to each other, such as orbiting each other in a hierarchical or non-hierarchical manner.

It should be noted that the point of view can be moved, and specifically the point of view can be rotated at some speed chosen by the user, thus imparting motion to all objects and thereby allowing all objects and icons along all vectors to be viewed over time.

Finally the icons or images representing the objects and icons can themselves include moving aspects. For example, they may pulse or show some additional identifying motion such as vibrating, spinning or rotating, folding along one or more axes as well as being animated in their own right, that is, appearing to wave arms or legs, move lips etc. in addition to changing qualities such as shape, hue, intensity, saturation, and transparency.

Figure 25:
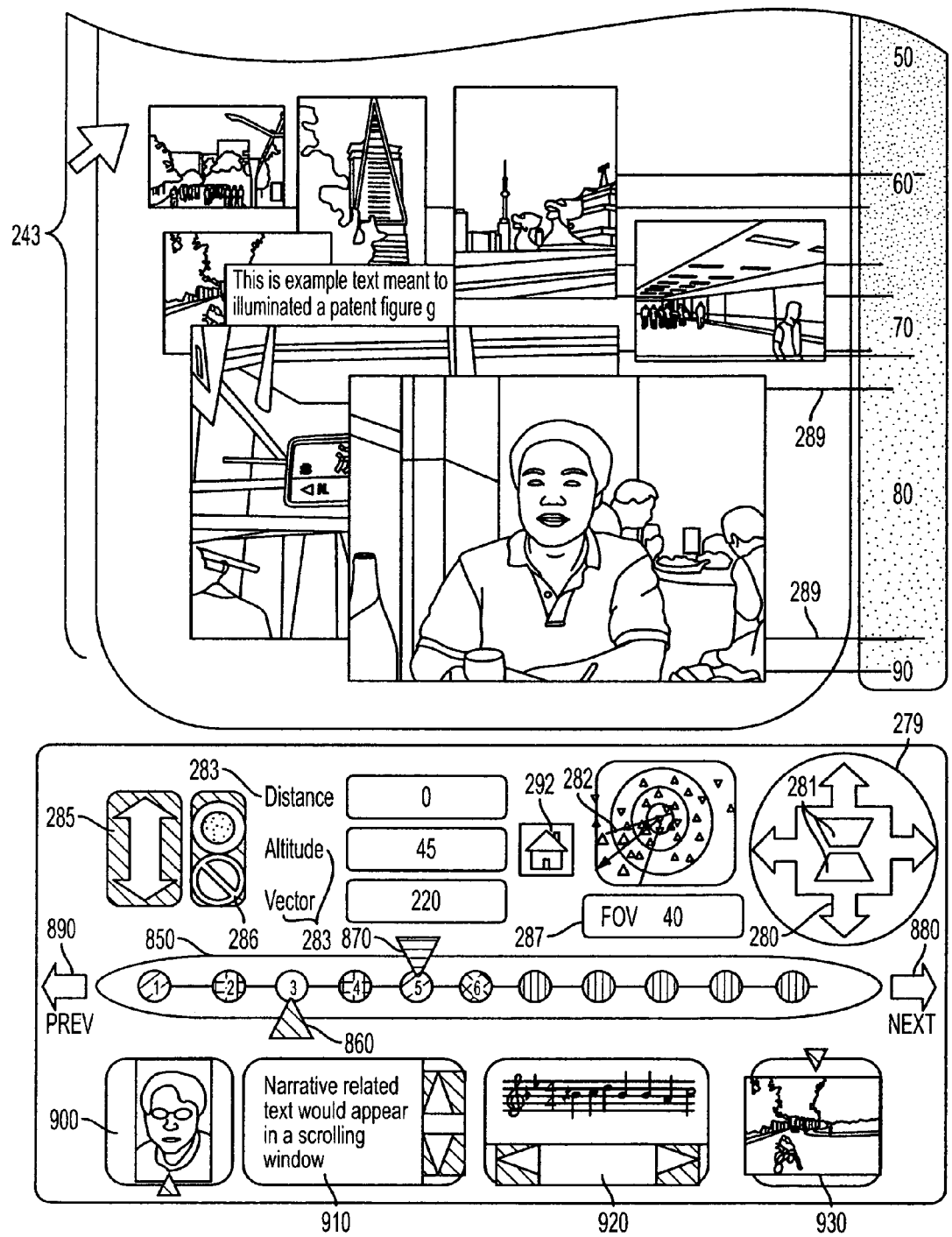
FIG. 25 illustrates a graphical user interface for controlling different amounts of different kinds of contextual information.

FIG. 25 illustrates a graphical user interface for moving from the virtual landscape 243 around narrative node 12C to virtual landscape 362 based on a different node. A node display 850 presents the narrative nodes 12A in sequence, typically along a narrative path 12P like stations on a railway track, with a current node indicator 860 showing which narrative node 12A's virtual landscape is currently displayed. Additionally, a preview node indicator 870 may be used to search for narrative nodes 12A whose virtual landscapes are to be displayed next.

This node display 850 is a useful navigation display but it is known that in some cases a simple control to move to the next node 880 or a control to move to the previous node 890 is also desirable. In addition, it is desirable in certain instances to have controls for seeking a narrative node 12A. For example, when a preview node is selected with a control 870 or when both current and preview controls 860 and 870 are on the same narrative node 12A, basic information about the node may be presented. It should be remembered that the virtual landscape is constructed around a core narrative node 12A and an additional window 900 may be provided to display the current core narrative node 12A and its context data file 16B and/or the core narrative data files 12C in other media. For example, it is illustrated that text material constituting the narrative node 12C is displayed window 910 while musical material is displayed in a window 920 and the visual icon for the narrative node 12A to be display or previewed is display in a window 930. It is understood that additional preview windows for textual and musical material may likewise be provided as well as additional windows for scripted actions. It is further understood that there is no conceptual limit to the number windows possible for each media and that there may be more than one text, one visual, one audio, one scripting window for the core narrative node 12A, in the same manner as in Macromedia Director.

It should be noted that the movement between narrative nodes 12A can be suggested or ignored; that is, changes can be instantaneous or the objects that are new can fall or fade into the viewing frame as the media objects that are no longer appropriate sink out of sight or fade away. It is understood that moving between narrative nodes 12A may be abrupt or may appear as continuous interpolation of the positions of the narrative or context data files 12C or 16B.

Likewise, the radar view display may allow the narrative node 12A that indicates the anchor location of the point of view to stay in the center of the display but the surrounding objects to stream or fade in or out of frame, depending on whether they are connected to the narrative node 12A towards which the user is directing his attention. It is understood that movement can be towards a previous node, a following node, a node that branches from the current narrative line as well as having the option of skipping intervening nodes viewing the point of view from a specific node is desired.

A graphical user interface may also allow the point of view to move moving into a media object and display the internal components of the object in, for example, sub-regions of the object. Such subordinate components of an object may comprise, for example, an image of a particular person, place or thing in a still or motion image, a particular passage, paragraph, sentence or phrase in a written or spoken communication, or a theme or movement in a piece of music. It may also include a constellation of equal components when the object itself has a narrative structure 14A, such as a book, film or musical work, or is a collection of objects of equal value per the current search and display criteria.

It is also advantageous that a display include the links between data narrative nodes 12A and narrative and context data files 12C and 16B, and to have "pop-up boxes" to display information about a narrative node 12A or narrative or context data file 12C or 16B when indicated by the cursor. In a like manner, information about a narrative node 12A or narrative or context data file 12C or 16B may be conveyed by changes in the appearance of the icon or image representing the a narrative node 12A or narrative or context data file 12C or 16B, such as the color of the object, distortion of the object, movement of the object, or other visual and audio characteristics such as changing hue, saturation and intensity.

The invention has been described in detail with particular reference to certain preferred embodiments thereof, but it will be understood that variations and modifications can be effected within the spirit and scope of the invention.

What is claimed is:

1. A method of displaying in a virtual landscape the significance relationships between the narrative content objects associated with a narrative node of a narrative, comprising;

selecting a particular narrative node in the narrative for which the significance relationships are to be displayed;

associating the selected narrative node with a position in a virtual landscape;

determining levels of significance of a first type for each of the narrative content objects associated with the node;

determining levels of significance of a second type, different from the first type, for each of the narrative content objects associated with the node;

associating each narrative content object with an icon;

adapting the visual appearance of each icon to indicate its level of the first type of significance;

adapting the location of each icon relevant to the coordinate origin to indicate its level of the second type of significance; and displaying the icons in the virtual landscape wherein the visual appearance and location of the icons indicates their significance relationships to the narrative node.

2. The method of claim 1, wherein the narrative content objects include narrative content or contextual content.

3. The method of claim 2, wherein the narrative content or contextual content comprises multimedia objects.

4. The method of claim 1, wherein adapting the visual appearance of the icons includes the size, shape, color, or line style that optionally connects the icon to the selected narrative node.

5. The method of claim 1, wherein the range of levels displayed in the virtual landscape can be modified.

6. The method of claim 1, further including selecting a particular field of view by which to display the significance relationships.

7. The method of claim 1, further including traversing the nodes of the narrative in a specified sequence that expresses a technical or scientific process, a fictional story or a description of historical events.

8. A method of displaying in a virtual landscape the significance relationships between the narrative content objects associated with a narrative node of a narrative, comprising;

associating the narrative node with a position in a virtual landscape;

determining levels of significance of a first type for each of the narrative content objects associated with the node;

determining levels of significance of a second type, different from the first type, for each of the narrative content objects associated with the node;

associating each narrative content object with an icon;

adapting the visual appearance of each icon to indicate its level of the first type of significance;

adapting the location of each icon relevant to the coordinate origin to indicate its level of the second type of significance;

selecting icons that are in motion and displaying the selected icons in the virtual landscape wherein the visual appearance and location of the icons indicates their significance relationships to the narrative node.

* * * * *